(12) United States Patent
Hobson et al.

(10) Patent No.: US 10,527,265 B2
(45) Date of Patent: Jan. 7, 2020

(54) MOUNTING ASSEMBLY FOR LIGHT FIXTURE

(71) Applicant: IDEAL Industries Lighting LLC, Durham, NC (US)

(72) Inventors: Charles O. Hobson, Waterford, WI (US); Ethan Creasman, Morrisville, NC (US); David P. Goelz, Milwaukee, WI (US)

(73) Assignee: IDEAL Industries Lighting LLC, Durham, NC (US)

( * ) Notice: Subject to any disclaimer, the term of this patent is extended or adjusted under 35 U.S.C. 154(b) by 719 days.

(21) Appl. No.: 14/252,388

(22) Filed: Apr. 14, 2014

(65) Prior Publication Data

US 2014/0218944 A1 Aug. 7, 2014

Related U.S. Application Data

(63) Continuation-in-part of application No. 13/838,479, filed on Mar. 15, 2013.

(60) Provisional application No. 61/624,211, filed on Apr. 13, 2012.

(51) Int. Cl.
| | |
|---|---|
| *F21V 21/14* | (2006.01) |
| *F16B 2/06* | (2006.01) |
| *F16B 2/10* | (2006.01) |

(52) U.S. Cl.
CPC ............... *F21V 21/14* (2013.01); *F16B 2/10* (2013.01); *F16B 2/06* (2013.01)

(58) Field of Classification Search
CPC ......... F21S 8/085; F21S 8/086; F21V 21/116; F21V 21/26; F21V 21/30; F21V 21/088; F21V 21/0885; F21V 21/14; F16B 2/06; F16B 2/065; F16B 2/10; F16B 2/12

USPC ......... 248/230.6, 230.1, 230.4, 230.5, 218.4, 248/219.3, 230.8; 362/431, 418, 154, 362/427, 430, 432; 403/289, 359.1, 359.5

See application file for complete search history.

(56) References Cited

U.S. PATENT DOCUMENTS

| | | |
|---|---|---|
| D49,999 S | 12/1916 | Moritz |
| 1,225,301 A | 5/1917 | Wolfe |
| 1,928,316 A * | 9/1933 | Muto .................... F16L 21/06 24/517 |

(Continued)

OTHER PUBLICATIONS

Excerpt from Ruud Lighting catalog. Date: 1998.
Philips Roadway Lighting. Product Brochure. Date: Copyright 2010. 12 pages.

*Primary Examiner* — Ingrid M Weinhold
(74) *Attorney, Agent, or Firm* — Jansson Munger McKinley & Kirby Ltd.

(57) ABSTRACT

A mounting assembly for securing a light fixture to a static structure. The mounting assembly includes a bar and a securing member which has a bar-gripping portion and an arm portion extending from the bar-gripping portion and attachable to the static structure. The bar is secured with respect to a main body portion of the light fixture. The bar has an axis. The arm portion has an arm axis which is substantially orthogonal to the bar axis. In another aspect of this invention, the mounting assembly includes a fixture-holding portion and an arm portion secured to the fixture-holding portion. The fixture-holding portion is secured with respect to the light fixture. The arm portion configured for selective attachment to a substantially cylindrical static structure and a substantially planar surface.

18 Claims, 52 Drawing Sheets

(56) References Cited

U.S. PATENT DOCUMENTS

| | | | | |
|---|---|---|---|---|
| 2,254,790 | A | 9/1941 | Benton | |
| 2,345,393 | A | 3/1944 | Heyermans | |
| D155,488 | S | 10/1949 | Crockett | |
| D162,639 | S | 3/1951 | Fiori | |
| 2,612,600 | A | 9/1952 | Yonkers | |
| D173,139 | S | 10/1954 | Black | |
| 2,886,699 | A | 5/1959 | Harling | |
| 2,974,219 | A | 3/1961 | Husby | |
| 3,071,683 | A | 1/1963 | Queale | |
| 3,184,199 | A | 5/1965 | Clark et al. | |
| 3,233,094 | A | 2/1966 | Foulds | |
| 3,478,200 | A | 11/1969 | Hewson | |
| 3,489,384 | A | 1/1970 | Perbal | |
| 3,586,280 | A * | 6/1971 | Parduhn | F21V 21/116 248/214 |
| 3,652,047 | A | 3/1972 | Starr | |
| 3,660,651 | A | 5/1972 | Miles, Jr. | |
| 3,685,858 | A | 8/1972 | Wandler | |
| 3,764,099 | A * | 10/1973 | Parduhn | G08G 1/095 248/214 |
| D234,712 | S | 4/1975 | Kennedy et al. | |
| 3,917,205 | A * | 11/1975 | Meadors | F21V 21/116 248/229.17 |
| 4,029,276 | A * | 6/1977 | Zielie | F16L 3/10 248/74.1 |
| 4,167,033 | A | 9/1979 | Fletcher | |
| 4,228,489 | A | 10/1980 | Martin | |
| 4,264,946 | A | 4/1981 | Faux, Sr. et al. | |
| 4,317,164 | A | 2/1982 | Karaktin | |
| 4,319,314 | A * | 3/1982 | Morton | F21S 8/033 248/282.1 |
| 4,398,239 | A | 8/1983 | de Vos et al. | |
| 4,410,933 | A | 10/1983 | Blake et al. | |
| 4,426,676 | A | 1/1984 | Taylor | |
| 4,460,142 | A * | 7/1984 | O'Rorke | F16B 2/08 248/214 |
| 4,489,910 | A * | 12/1984 | Ferguson | F21V 21/116 248/219.4 |
| 4,543,007 | A | 9/1985 | Quiogue | |
| 4,659,046 | A * | 4/1987 | Parduhn | F21V 21/108 248/214 |
| 4,729,073 | A | 3/1988 | Klaus | |
| 4,787,019 | A | 11/1988 | van den Broeke | |
| 4,793,581 | A | 12/1988 | Bilson et al. | |
| 4,892,276 | A * | 1/1990 | Alessio | F16L 3/1008 16/231 |
| 4,915,418 | A * | 4/1990 | Palatchy | F16L 17/04 24/284 |
| 4,931,917 | A | 6/1990 | Scherf et al. | |
| 5,018,768 | A * | 5/1991 | Palatchy | F16L 17/04 24/284 |
| D319,702 | S | 9/1991 | Kane | |
| 5,136,493 | A | 8/1992 | Straus et al. | |
| 5,258,898 | A * | 11/1993 | Thornton | F21V 21/108 362/147 |
| 5,340,069 | A * | 8/1994 | Niemeyer | F21V 21/116 248/214 |
| 5,357,414 | A | 10/1994 | Dane et al. | |
| D354,558 | S | 1/1995 | Marvin et al. | |
| D355,722 | S | 2/1995 | Roos et al. | |
| 5,398,177 | A | 3/1995 | Harwood | |
| 5,510,970 | A * | 4/1996 | Hollenbach | F21L 14/00 248/278.1 |
| 5,593,225 | A | 1/1997 | Safyan | |
| D397,468 | S | 8/1998 | Zeller | |
| 5,833,358 | A | 11/1998 | Patik | |
| 5,896,288 | A | 4/1999 | Lecheler et al. | |
| 6,045,239 | A | 4/2000 | Waldmann | |
| 6,056,254 | A | 5/2000 | Albright et al. | |
| 6,155,701 | A | 12/2000 | Leen | |
| D442,313 | S | 5/2001 | Wojtkowiak | |
| D449,126 | S | 10/2001 | Zeller | |
| 6,357,709 | B1 * | 3/2002 | Parduhn | F21V 21/116 248/214 |
| 6,357,895 | B1 | 3/2002 | Kierulf et al. | |
| 6,367,870 | B1 * | 4/2002 | Muehlpforte | B60S 1/04 15/250.16 |
| 6,464,268 | B1 * | 10/2002 | Hough | F16L 23/08 285/367 |
| 6,467,928 | B2 | 10/2002 | Crelin | |
| 6,502,967 | B2 | 1/2003 | Mullen | |
| D482,956 | S * | 12/2003 | Pyron | D8/382 |
| D488,248 | S | 4/2004 | Toyoaki | |
| 6,814,473 | B2 | 11/2004 | Chen | |
| D505,220 | S | 5/2005 | Stekelenburg | |
| RE38,767 | E | 8/2005 | Wedell et al. | |
| 6,959,996 | B2 | 11/2005 | Ip | |
| 7,063,451 | B2 | 6/2006 | Shen | |
| D536,816 | S | 2/2007 | Mier-Langner et al. | |
| D536,817 | S | 2/2007 | Mier-Langner et al. | |
| D537,972 | S | 3/2007 | Mier-Langner et al. | |
| D537,973 | S | 3/2007 | Mier-Langner et al. | |
| D538,459 | S | 3/2007 | Rose | |
| D538,961 | S | 3/2007 | Mier-Langner et al. | |
| D539,460 | S | 3/2007 | Mier-Langner et al. | |
| D539,956 | S | 4/2007 | Rose | |
| 7,197,776 | B2 * | 4/2007 | Tsai | E03C 1/06 248/230.1 |
| D543,657 | S | 5/2007 | Lehman | |
| D550,885 | S | 9/2007 | Crosby | |
| D563,013 | S | 2/2008 | Levine | |
| D563,580 | S | 3/2008 | Prazoff | |
| D563,582 | S | 3/2008 | Levine | |
| D564,117 | S | 3/2008 | Lippert | |
| D570,535 | S | 6/2008 | Kinnune et al. | |
| D571,032 | S | 6/2008 | Chen | |
| D573,741 | S | 7/2008 | Lou | |
| D576,330 | S | 9/2008 | Ruud et al. | |
| D577,455 | S | 9/2008 | Zheng et al. | |
| D580,082 | S | 11/2008 | Zemar | |
| D581,080 | S | 11/2008 | Mier-Langner | |
| D599,494 | S | 9/2009 | Levine | |
| D600,400 | S | 9/2009 | Friedman | |
| 7,611,110 | B2 * | 11/2009 | Franchini | F16C 11/10 248/227.4 |
| 7,665,699 | B2 | 2/2010 | Oddsen, Jr. et al. | |
| 7,703,939 | B2 | 4/2010 | Wilcox et al. | |
| D619,291 | S | 7/2010 | Thevenot | |
| D621,988 | S | 8/2010 | Zheng et al. | |
| D626,264 | S | 10/2010 | Liu | |
| D630,790 | S | 1/2011 | Josefowicz et al. | |
| D634,873 | S | 3/2011 | Guercio | |
| D636,920 | S | 4/2011 | Boissevain | |
| D638,566 | S | 5/2011 | Goelz et al. | |
| D641,908 | S | 7/2011 | McKee | |
| 8,021,026 | B2 | 9/2011 | Liu et al. | |
| 8,083,192 | B2 * | 12/2011 | Wells | G09F 15/00 248/218.4 |
| 8,104,933 | B2 | 1/2012 | Liu et al. | |
| D660,496 | S | 5/2012 | Akdag et al. | |
| D668,370 | S | 10/2012 | Guercio et al. | |
| 8,336,837 | B2 * | 12/2012 | Gephart | F16B 2/12 248/218.4 |
| D681,869 | S | 5/2013 | Goelz et al. | |
| D694,452 | S | 11/2013 | Goelz et al. | |
| 8,925,884 | B2 | 1/2015 | Schultz et al. | |
| 9,132,796 | B1 * | 9/2015 | Matthews | B60R 19/54 |
| 9,222,602 | B2 * | 12/2015 | Dworak, Jr. | F16L 3/1075 |
| 2004/0061032 | A1 * | 4/2004 | Bradford | F21V 23/06 248/218.4 |
| 2005/0045786 | A1 * | 3/2005 | Tupper | A01G 9/12 248/229.2 |
| 2008/0253138 | A1 * | 10/2008 | Katz | F21V 21/30 362/427 |
| 2009/0314909 | A1 * | 12/2009 | Lien | B62J 9/003 248/230.6 |
| 2011/0004157 | A1 | 1/2011 | Dewaele et al. | |
| 2011/0147554 | A1 * | 6/2011 | Liao | F16B 2/12 248/226.11 |
| 2011/0222284 | A1 | 9/2011 | Kong et al. | |

(56) References Cited

U.S. PATENT DOCUMENTS

| | | | |
|---|---|---|---|
| 2012/0287643 A1* | 11/2012 | Wang | F21S 8/086 362/294 |
| 2012/0300480 A1 | 11/2012 | Kim et al. | |
| 2013/0093236 A1 | 4/2013 | Marshall et al. | |

* cited by examiner

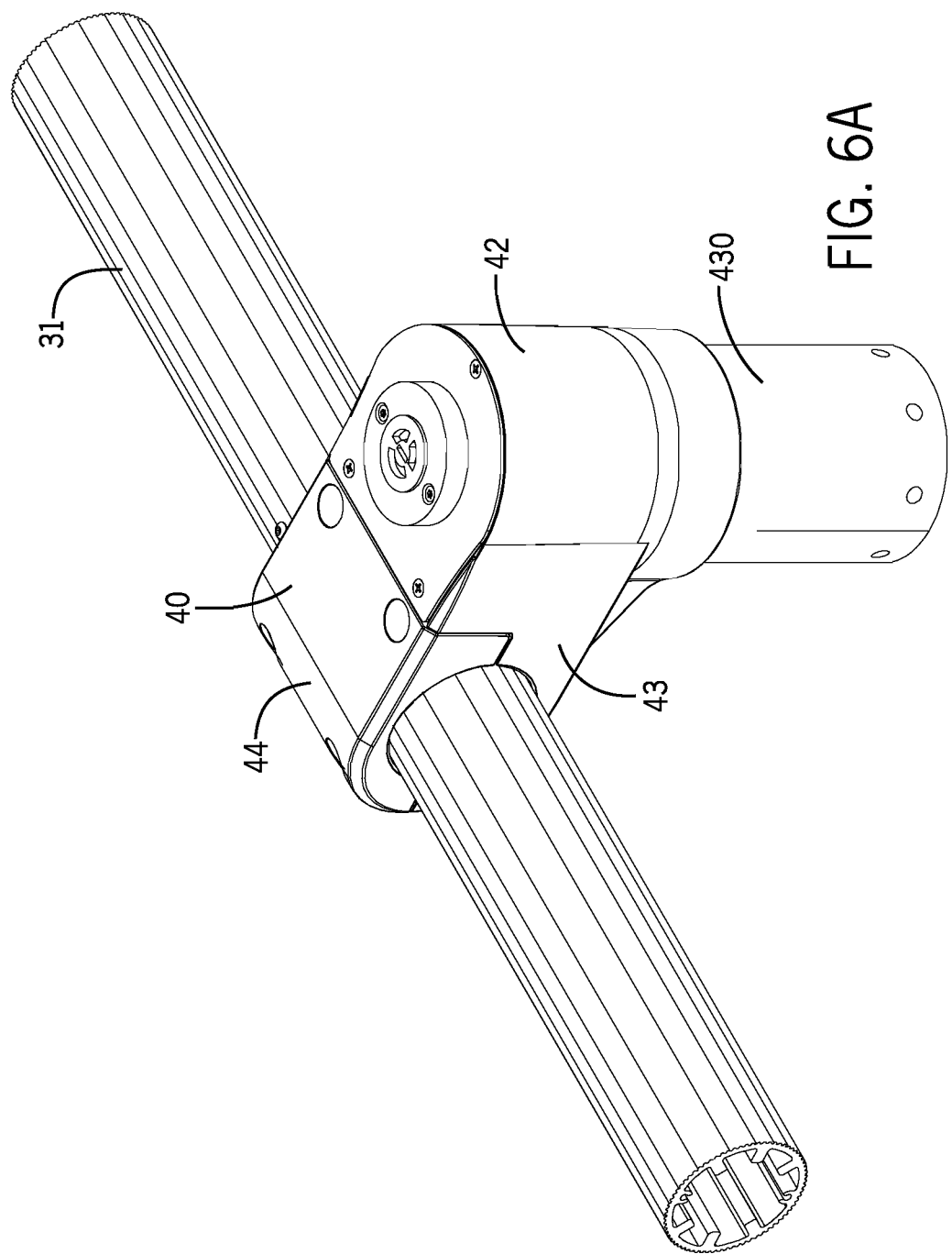

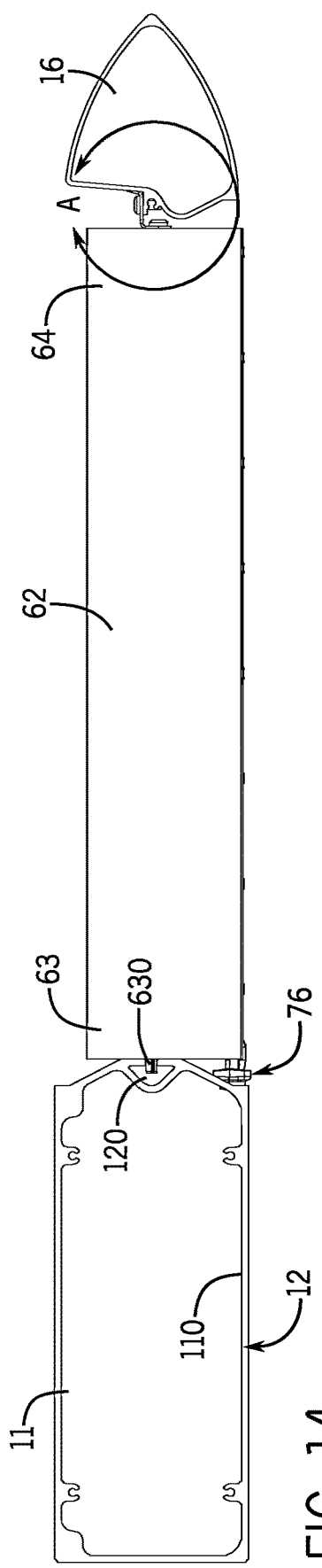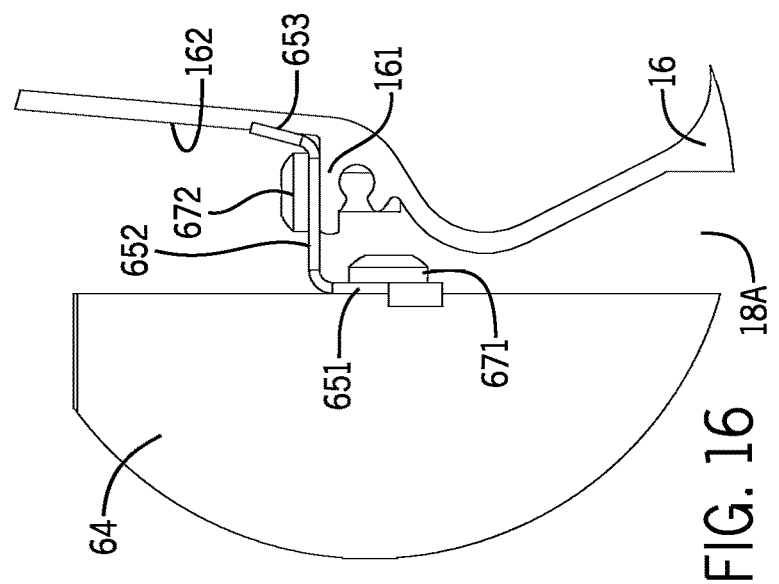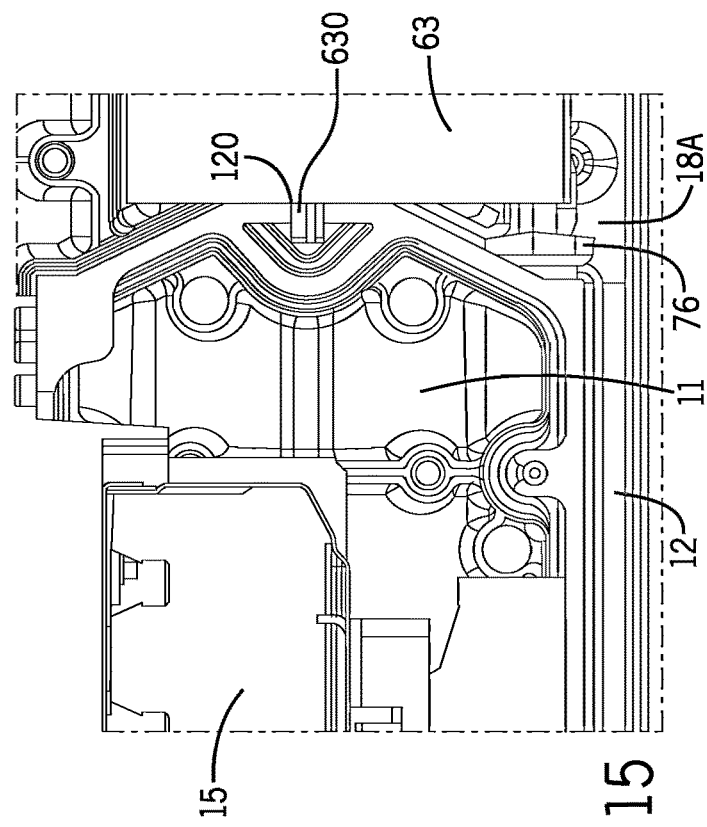
FIG. 14
FIG. 16
FIG. 15

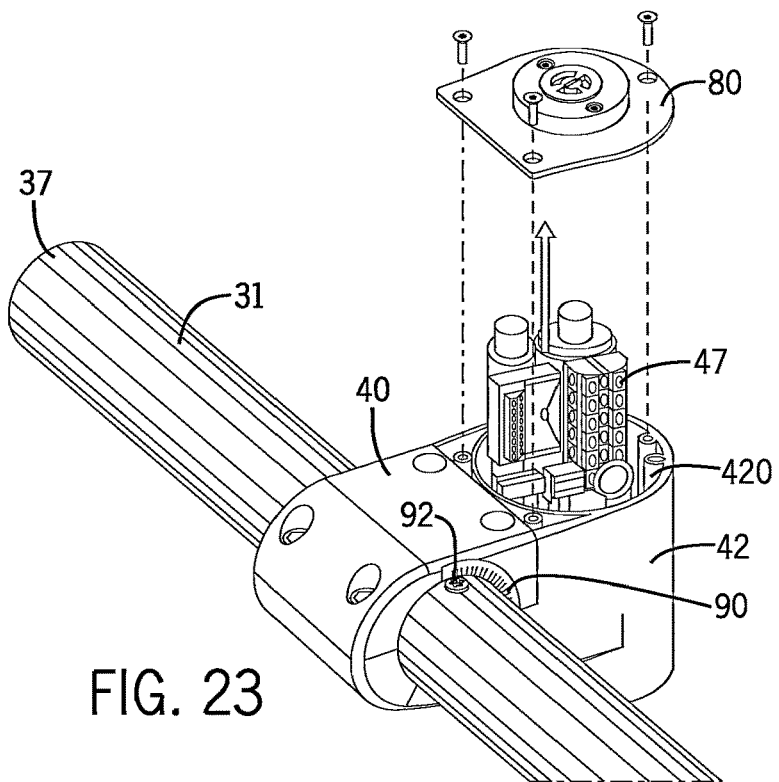
FIG. 23
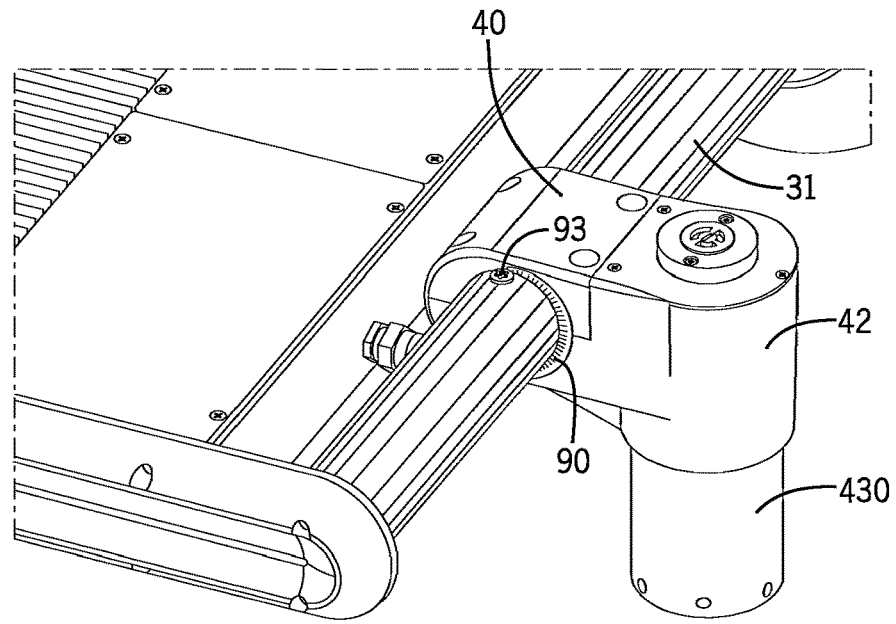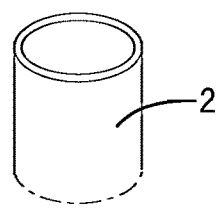
FIG. 24

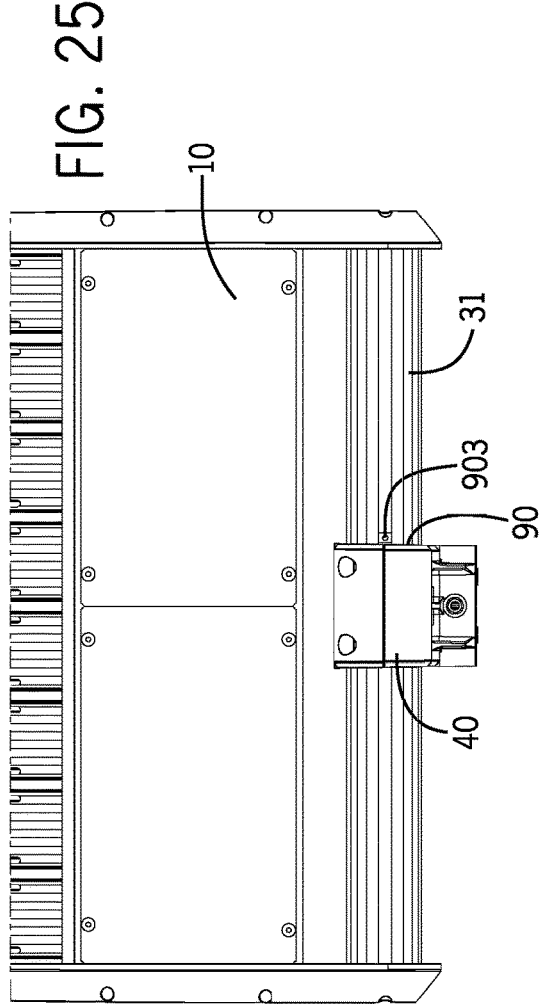
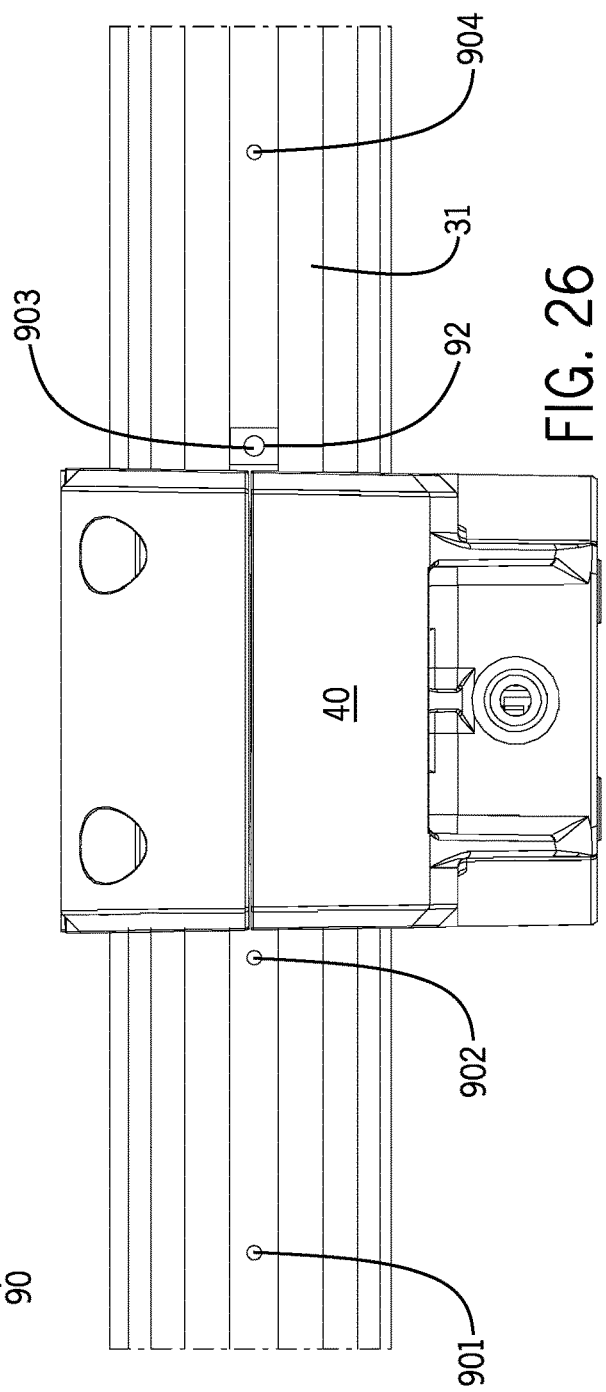

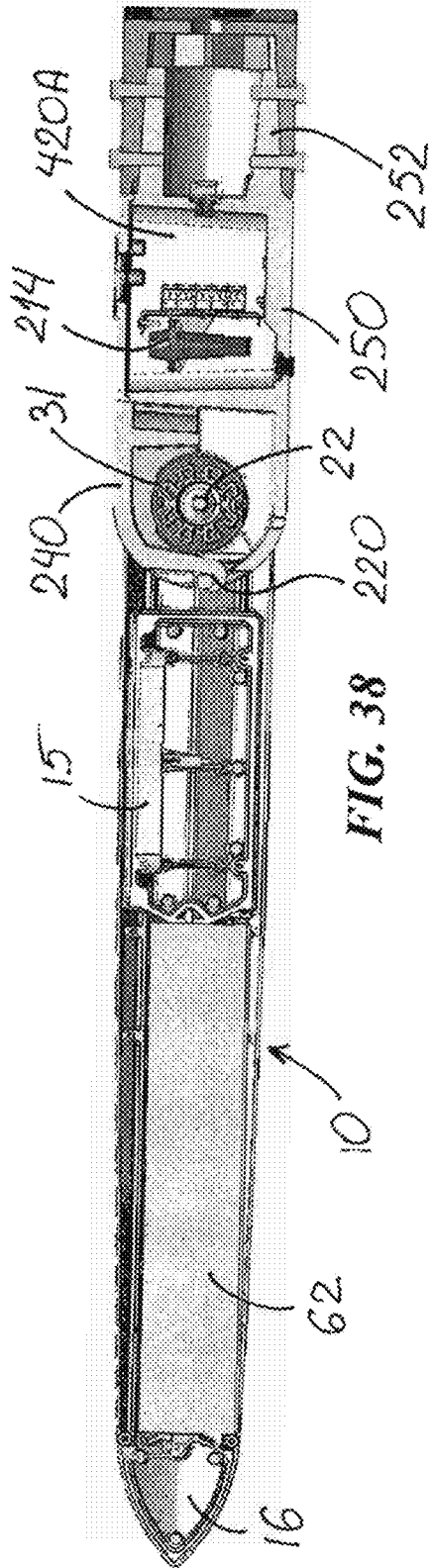
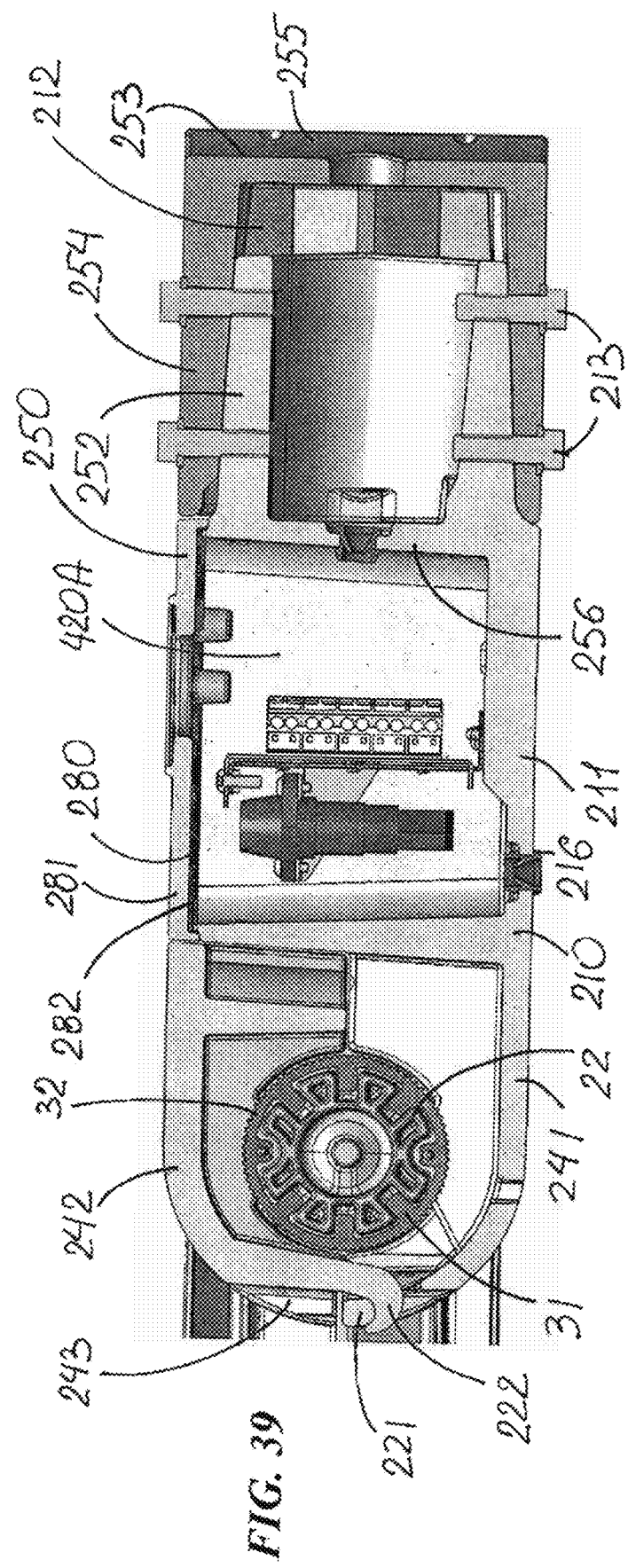
FIG. 38
FIG. 39

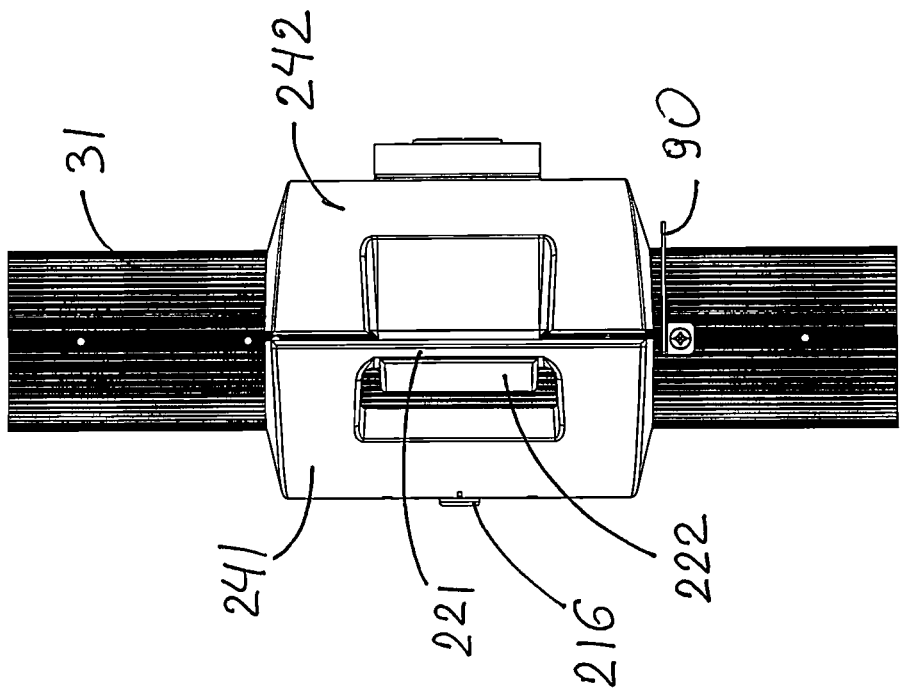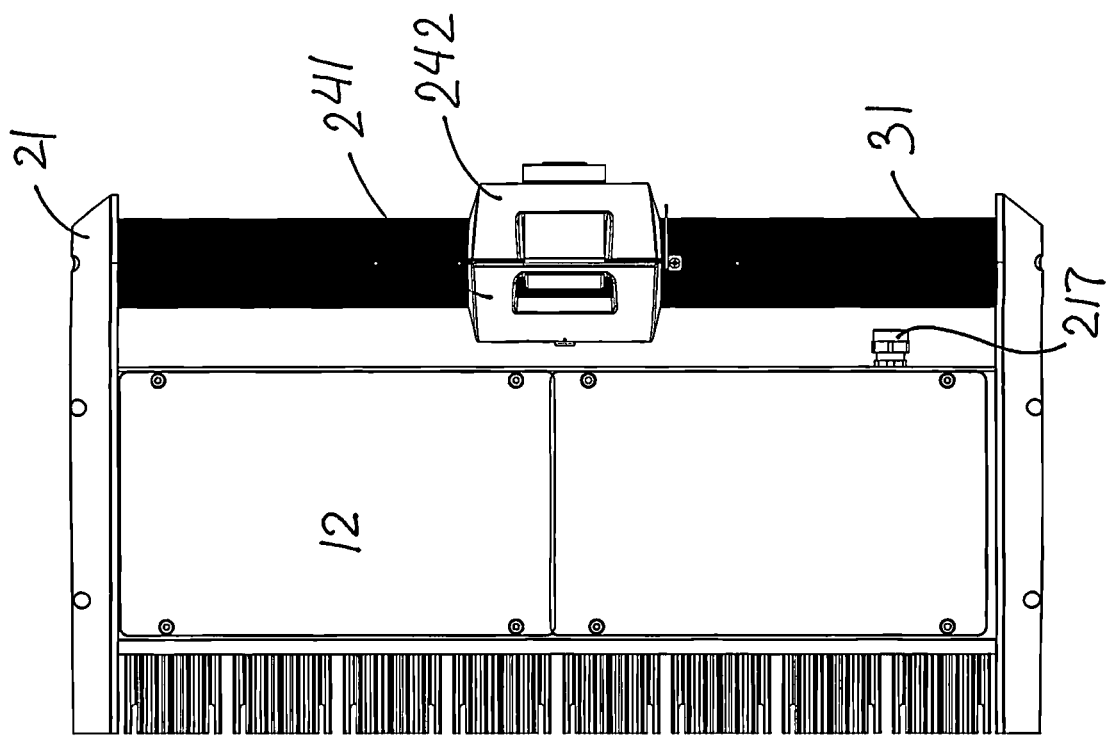

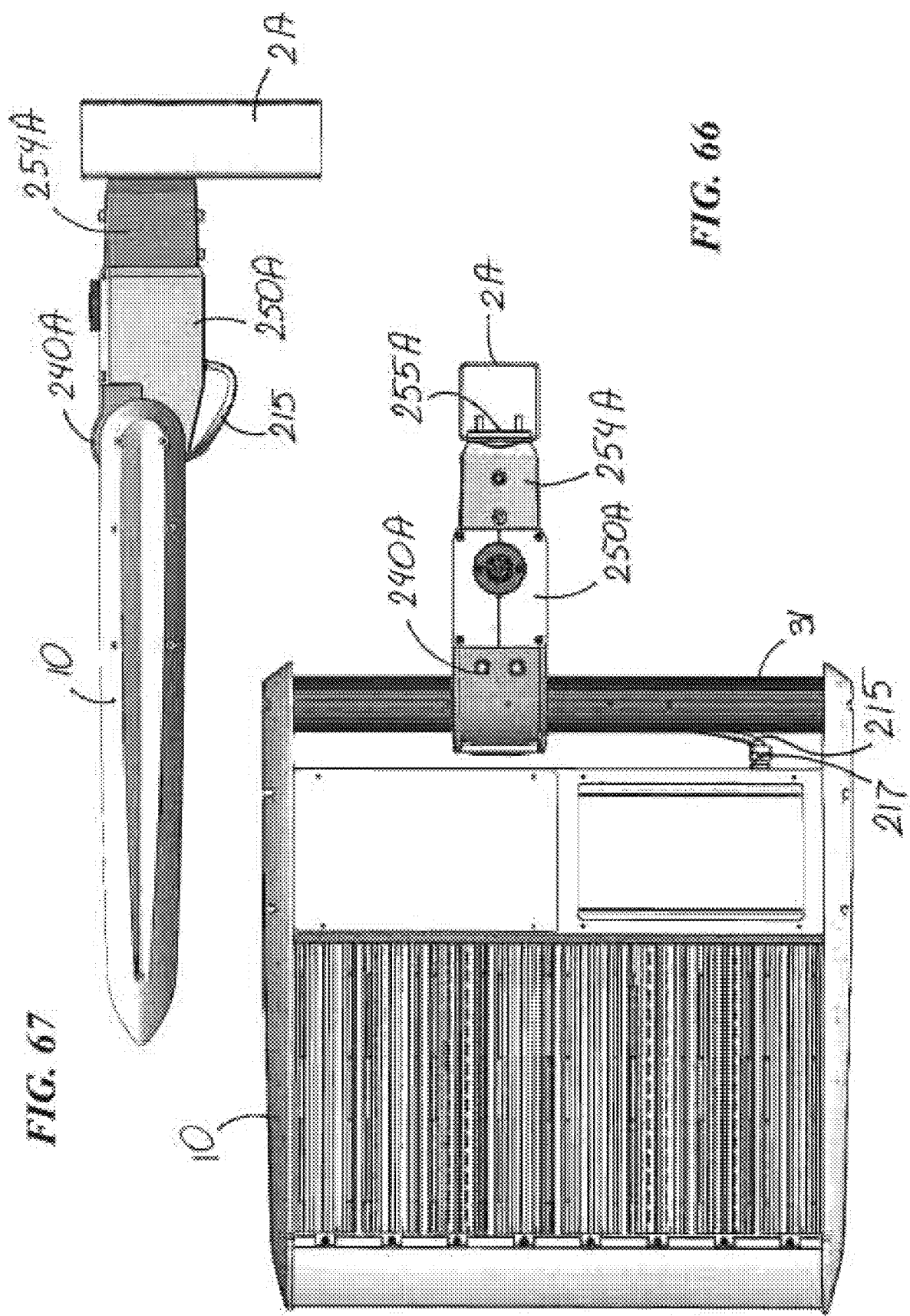

MOUNTING ASSEMBLY FOR LIGHT FIXTURE

RELATED APPLICATION

This application is a continuation-in-part of patent application Ser. No. 13/838,479, filed Mar. 15, 2013, which in turn is based in part on U.S. Provisional Application Ser. No. 61/624,211, filed Apr. 13, 2012. The contents of application Ser. Nos. 13/838,479 and 61/624,211 are incorporated herein by reference.

FIELD OF THE INVENTION

This invention relates to lighting fixtures and, more particularly, to mounting assemblies for securing light fixtures with respect to static structures.

BACKGROUND OF THE INVENTION

Light fixtures such as floodlights are often used for illumination of a selected area or object and typically need to be adjusted into a desired orientation for maximal effect. Adjustable light fixtures are popular with architects, lighting designers and building owners as a way to visually "highlight" certain building and landscape features and improve the nighttime appearance of buildings and grounds.

Large properties may require, e.g., a dozen or even several dozen well-placed floodlights for the intended illumination purpose. Architects and lighting designers are justifiably concerned that each floodlight be capable of being precisely directed toward the particular feature to be illuminated. This means that the floodlight should have a mounting arrangement that permits a wide range of aiming angles.

In recent years, light fixtures increasingly use LEDs as light sources, and these present particularly challenging problems in fixture development. A new LED light fixture which responds to the needs of architects, lighting designers and contractors and which provides certain manufacturing economies would be an important advance in the art.

There is a need in the lighting industry for improved light fixtures using LED light sources—fixtures that are adaptable for a wide variety of mounting angles and situations, and that satisfy the other issues associated with high-illumination LED light fixtures.

SUMMARY OF THE INVENTION

The present invention relates to an improved mounting assembly for securing a light fixture to a static structure.

In one aspect of the present invention, the mounting assembly includes a fixture-holding portion and an arm portion secured to the fixture-holding portion and attachable to the static structure. The fixture-holding portion is secured with respect to the light fixture. The arm portion is configured for selective attachment to a substantially cylindrical static structure and a substantially planar surface.

In some embodiments, the arm portion has a distal end surface shaped for abutting attachment to the exterior surface of a cylindrical static structure. The distal end surface may alternatively or in addition be shaped for abutting attachment to a substantially planar surface. In some of such embodiments, the arm portion has a mounting plate positioned against a static-structure surface opposite the planar surface such that the static-structure wall is sandwiched between the mounting plate and the distal end surface of the fitter.

In some embodiments, the arm portion comprises includes a sleeve dimensioned for receiving a lesser-diameter cylindrical static structure therewithin. The arm portion may also have a fitter at least partially enclosing the sleeve. In such embodiments, the fitter has the distal end surface.

Certain versions of such embodiments of the mounting assembly are configured for adjustment of the light fixture to a selected one of a plurality of possible orientations. Such versions of the inventive mounting assembly facilitate adjustment of the light fixture during installation.

In certain embodiments, the mounting assembly includes a bar and a securing member. The bar is secured with respect to a main body portion of the light fixture. The bar has an axis. The securing member includes a bar-gripping portion and an arm portion extending from the bar-gripping portion. The arm portion is attachable to the static structure. In some embodiments, the arm portion has an arm axis that is substantially orthogonal to the bar axis. The bar-gripping portion may adjustably hold the bar such that the light fixture is positionable to a selected one of a plurality of possible orientations.

In certain embodiments, the arm portion is shaped for attachment to substantially cylindrical static structures. In some of such embodiments, the arm portion has a sleeve dimensioned for receiving a lesser-diameter cylindrical static structure therewithin. Such lesser-diameter cylindrical static structure may be at any angle between horizontal and vertical. After attachment to such static structure, the inventive mounting assembly permits adjustment of the fixture to the desired orientation.

In certain embodiments, the arm portion has a distal end surface shaped for abutting attachment to the exterior surface of a cylindrical static structure. The distal end surface may alternatively, or at the same time, be shaped for abutting attachment to a substantially planar surface.

In some of such embodiments, the arm portion includes a fitter at least partially enclosing the sleeve. The fitter has the distal end surface.

In the embodiments with the distal end surface of the fitter shaped for abutting attachment to a substantially planar surface of a static-structure wall, the arm portion has a mounting plate positioned against a static-structure surface opposite the planar surface such that the static-structure wall is sandwiched between the mounting plate and the distal end surface of the fitter.

In some embodiments, the bar-gripping portion includes first and second bar-grippers facing one another with the bar therebetween. The first bar-gripper and the sleeve may be parts of a single-piece structure, the second bar-gripper being removably attached to the first bar-gripper. In some of such embodiments, the fitter is a separate piece forming a fitter cavity receiving the sleeve and secured thereto with fasteners extending through the fitter into the sleeve.

In certain embodiments, the arm portion has an enclosure wall defining an enclosure for electrical elements and wiring for electrical connection of light fixtures. The enclosure may be accessible through an enclosure opening. In such embodiments, the arm portion may have a cover assembly sealing the enclosure opening with a cover plate pressing a gasket against the enclosure wall. The enclosure wall may be part of the single-piece structure with the sleeve extending from the enclosure wall along the arm axis away from the first bar-gripper.

In some embodiments, the bar-gripping portion has a retaining feature holding the second bar-gripper with respect to the securing member when the second bar-gripper is moved from facing the first bar-gripper. The bar-gripping portion has a front region opposite the arm portion. In some embodiments, the front region forms the retaining feature. The retaining feature may include a cross member and a hook hingedly engaging the cross member. Each of the cross member and the hook are formed by one of the first and second bar-grippers. The retaining feature permits forward rotation of the second bar-gripper about the front region of the second bar-gripper for securing-member engagement with/disengagement from the bar.

The bar-gripping portion has an arm-adjacent region which may define mounting cavities in one of the first and second bar-grippers. The mounting cavities may be configured for accepting fasteners which extend through the other of the first and second bar-grippers, thereby securing the bar-grippers together.

In certain embodiments, the bar has a gripping region engaged by the bar-grippers. The gripping region and the bar-grippers may have anti-rotational features complementary to one another.

In some embodiments, the bar is substantially cylindrical. In some of such embodiments, each of the bar-grippers has a semi-cylindrical bar-engaging surface, the semi-cylindrical bar-grippers surfaces together encircling and engaging the bar. The anti-rotational interlocking features may include parallel inter-engaged flutes and grooves along the gripping region of the bar and the gripper. The bar may be formed by extrusion.

In certain embodiments, the mounting assembly is not adjustable. In some of such embodiments, the bar may have a cross-sectional shape which is gripped by the bar-gripping portion such that the fixture is held in only one or a limited number of orientations. Such cross-sectional shape of the bar may include cylindrical, as well as rectangular (including square) shapes, and various other polygonal shapes.

In one particular aspect of this invention, the inventive mounting assembly includes a bar having a gripping region and a gripper which grips the gripping region such that the light fixture is held with respect to the static structure. The bar has a first end secured with respect to one of the static structure and a main body portion of the light fixture. The gripper is attachable to the other of the static structure and the main body portion of the light fixture.

In some of such embodiments, the gripper grips the gripping region such that the light fixture is held in a selected one of the plurality of possible orientations.

In some embodiments, the first end of the bar is secured with respect to the main body portion of the light fixture. In such embodiments, the gripper is attachable to the static structure.

In certain embodiments of the adjustable mounting assembly, the gripper and the bar may be configured for a finite number of the orientations. The mounting assembly of some of such embodiments further includes a guide indicating the angle for each of the orientations of the light fixture with respect to the static structure.

The guide may be a bracket removably secured with respect to the bar at a plurality of positions therealong. In some embodiments, the bracket is shaped to follow the outer shape of the bar and includes angle markings, and the gripper has a reference line which points to a particular one of the angle markings indicating the angle of the light fixture with respect to the static structure.

The bar also has a second end opposite the first end. In some embodiments, the second end may also be secured with respect to the main body portion; in such embodiments, the gripping region is between the first and second ends and is spaced from the main body portion. In some such embodiments, the gripper-bar orientations include a number of positions of the gripper along the bar.

In some embodiments, the bar defines a plurality of positions for securing the bracket therealong.

The mounting assembly of the present invention may further include at least one bar support that projects from the main body portion. In such embodiments, the first end of the bar is supported by the bar support such that the gripping region is along and spaced from the main body portion. The bar support may include a bar-support portion engaged with the first end of the bar. In some embodiments, the bar is hollow. In such embodiments, the bar-support portion is inserted into the first end of the bar. The bar interior and the bar-support portion are preferably shaped to prevent relative rotation.

In certain embodiments, the gripper includes first and second bar-engaging portions facing one another with the bar therebetween. The bar is preferably substantially cylindrical. In such embodiments, each of the bar-engaging portions has a semi-cylindrical bar-engaging surface. The semi-cylindrical bar-engaging portions together encircle and engage the bar.

The gripper and the bar are configured for a finite number of orientations. The gripping region and the gripper preferably have anti-rotational interlocking features complementary to one another such that, when the anti-rotational interlocking features of the bar-engaging portions are interlocked with the interlocking features of the bar, the light fixture is held in a selected one of a finite plurality of orientations. The anti-rotational interlocking features may include parallel inter-engaged flutes and grooves along the gripping region of the bar and the gripper. The bar may be made by extrusion, e.g., of a suitable metal such as aluminum or tough, rigid, structural polymeric material.

The first bar-engaging portion may be configured for securement with respect to the static structure and the second bar-engagement portion be configured for attachment to the first bar-engagement portion with the bar sandwiched therebetween. In some versions, the first bar-engaging portion is configured for attachment atop a light pole.

Another aspect of the present invention is a light fixture including the main body portion and the mounting assembly for adjustable securement to a static structure such that, when the anti-rotational interlocking features of the bar-engaging portions are interlocked with the interlocking features of the bar, the light fixture is held in a selected one of a finite plurality of orientations.

BRIEF DESCRIPTION OF THE DRAWINGS

FIG. 6A is a top perspective view of a mounting assembly in accordance with the present invention.

FIG. 14 is a sectional side view of the mounting of LED heat sinks, as shown in FIG. 11.

FIG. 15 is a fragmentary sectional side view of the mounting engagement of the other end of the LED heat sinks, as shown in FIGS. 11 and 14.

FIG. 16 is a fragmentary sectional side view of the mounting clip holding the end of the LED heat sink, as shown in FIG. 14.

FIG. 23 is a perspective view of the mounting assembly of the light fixture of FIG. 21 with removed cover assembly and showing a terminal block being inserted into a pole-connector enclosure.

FIG. 24 is a fragmentary perspective view of the LED light fixture as in FIG. 21 in a position for installation atop a round tenon.

FIG. 25 is a fragmentary top plan view of the LED light fixture of FIG. 21.

FIG. 26 is an enlarged portion of FIG. 25 showing details of the bar.

FIG. 38 is a cross-sectional view of the light fixture with the mounting assembly of FIGS. 33-37 taken along section lines 38-38 shown in FIG. 36.

FIG. 39 is a fragment of the cross-sectional view of FIG. 38 better showing the details of the mounting assembly.

FIG. 46 is a fragmentary top view of the light fixture with the mounting assembly of FIG. 28 showing details of a retaining feature of the securing-member bar-gripping portion.

FIG. 47 is a fragmentary view of the top view of FIG. 46 showing details of the retaining feature.

FIG. 66 is a top plan view of the light fixture with an alternative version of the second embodiment of the mounting assembly shown in abutting attachment to a vertical rectangular pole and showing wiring to the fixture.

FIG. 67 is a side elevation of the fixture and the mounting assembly of FIG. 66.

DETAILED DESCRIPTION OF PREFERRED EMBODIMENTS

Figure 1:
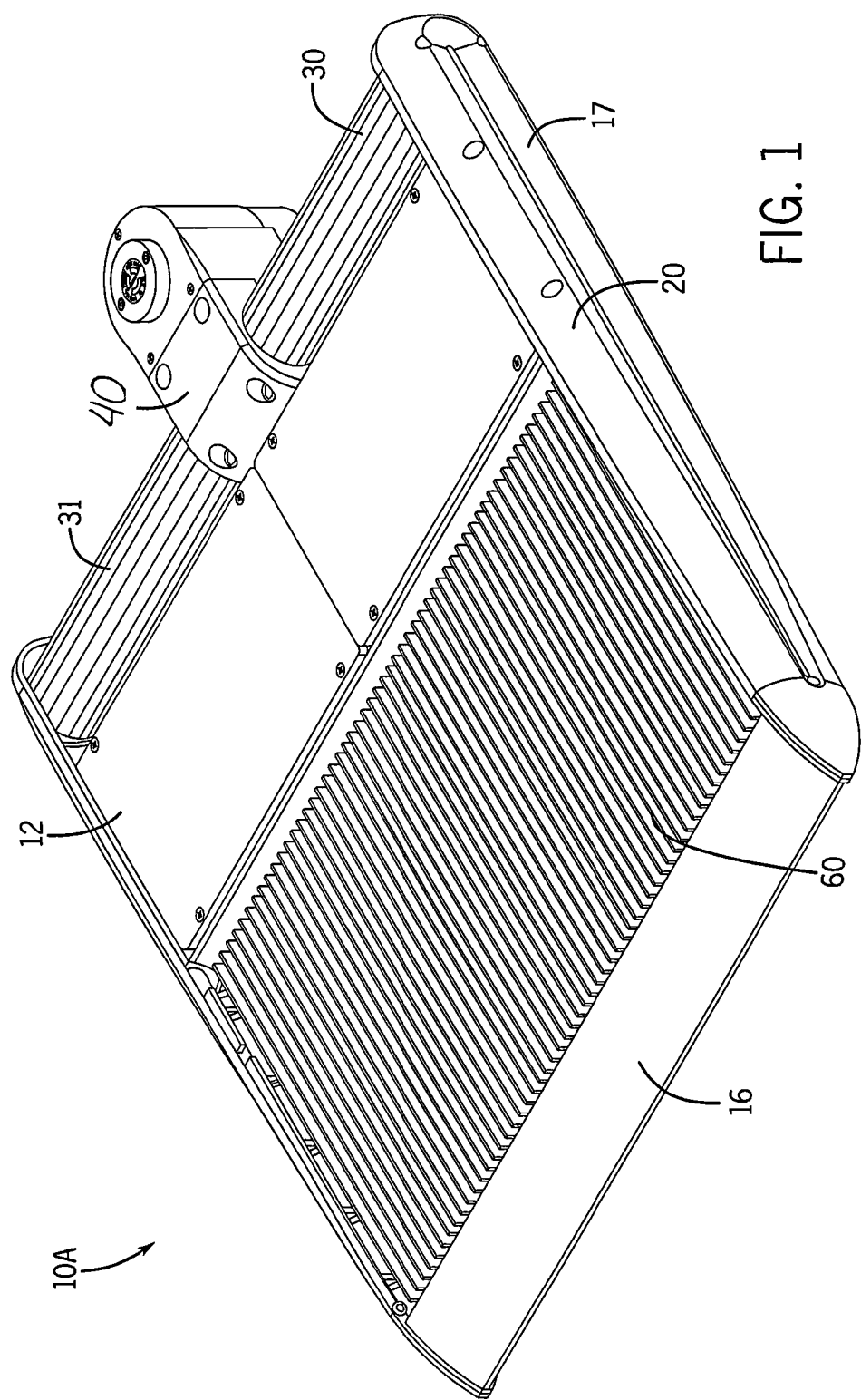
FIG. 1 is a top perspective view of one embodiment of an LED light fixture in accordance with this invention.

FIGS. 1-11 illustrate LED light fixtures 10A and 10B (the latter in FIG. 2 only) in accordance with this invention. Common or similar parts are given the same numbers in the drawings of both embodiments, and the light fixtures are often referred to by the numeral 10, without the A or B lettering used in the drawings, and in the singular for convenience.

Figure 2:
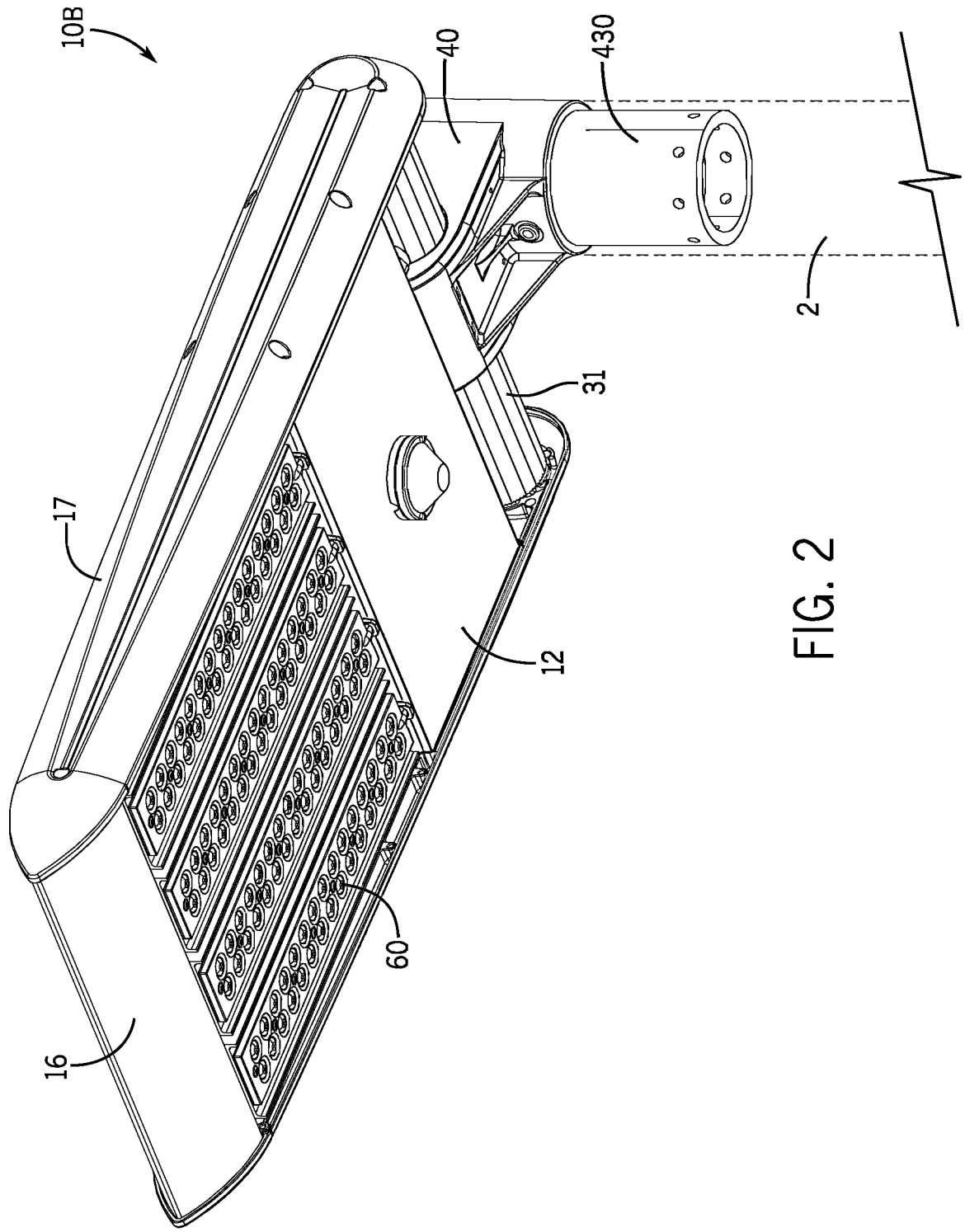
FIG. 2 is a bottom perspective view of another embodiment of an LED light fixture in accordance with this invention, and including fewer LED modules than the embodiment of FIG. 1.

Light fixture 10 includes a main body portion 20 and a mounting assembly 30 for adjustable securement to a static structure. An exemplary static structure is shown in FIG. 2 as a pole 2 atop which fixture 10 may be installed. It should be understood, of course, that the inventive light fixture 10 may be mounted with respect to other static structures such as walls, ceilings, along-ground mounts, free-standing advertising frames and the like.

Figure 3:
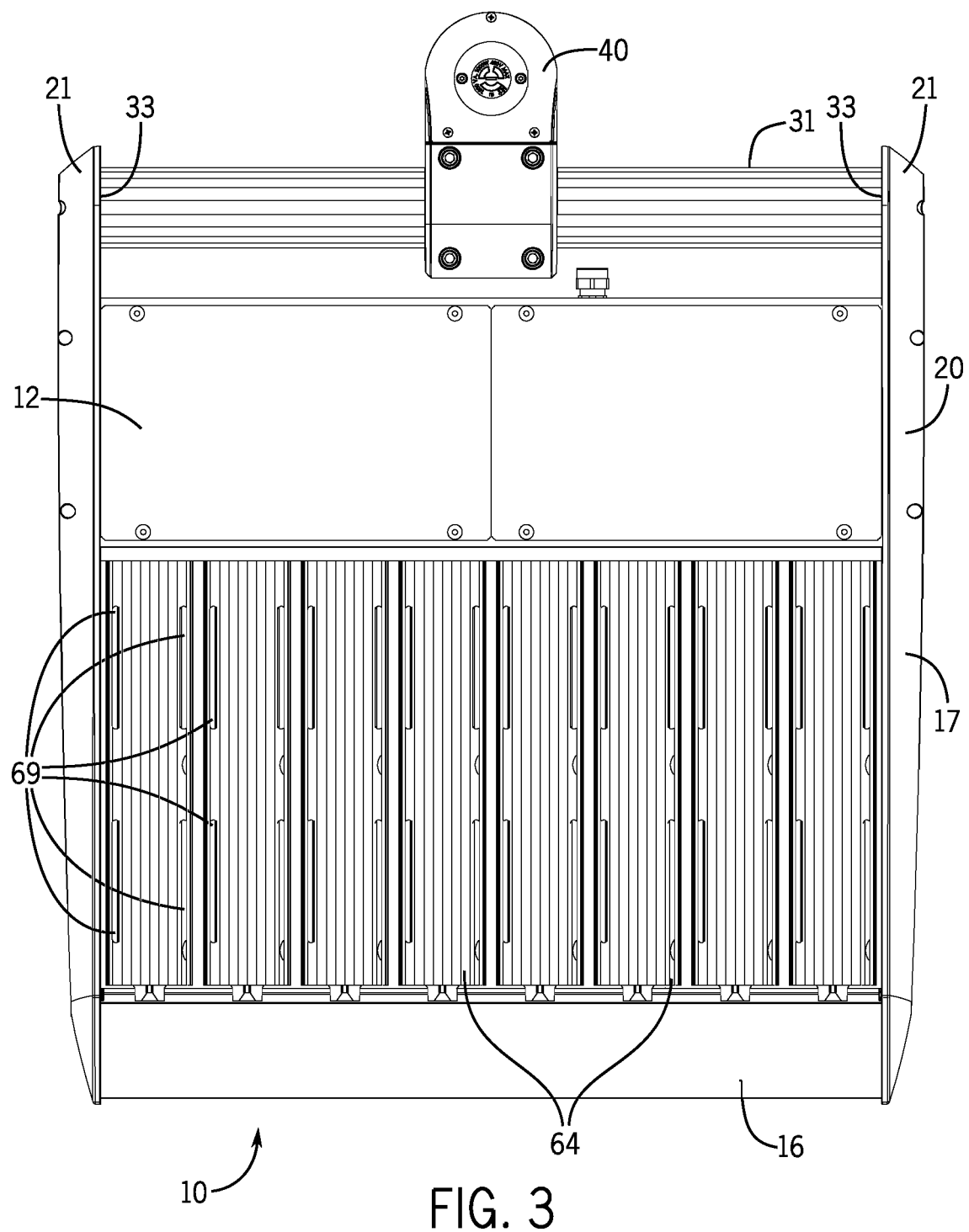
FIG. 3 is a top plan view of the LED light fixture of FIG. 1.
Figure 4:
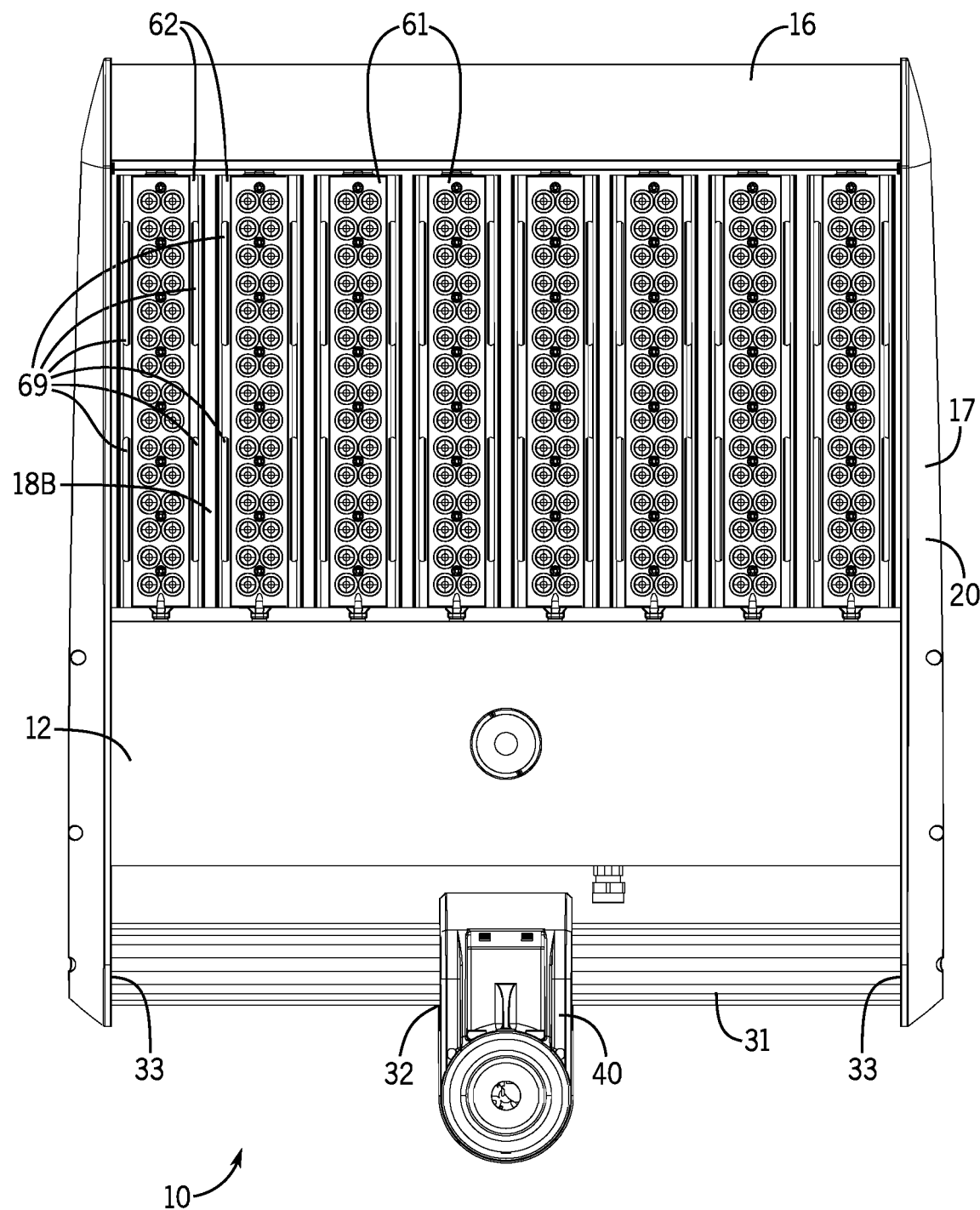
FIG. 4 is a bottom plan view of the LED light fixture of FIG. 1.
Figure 6B:
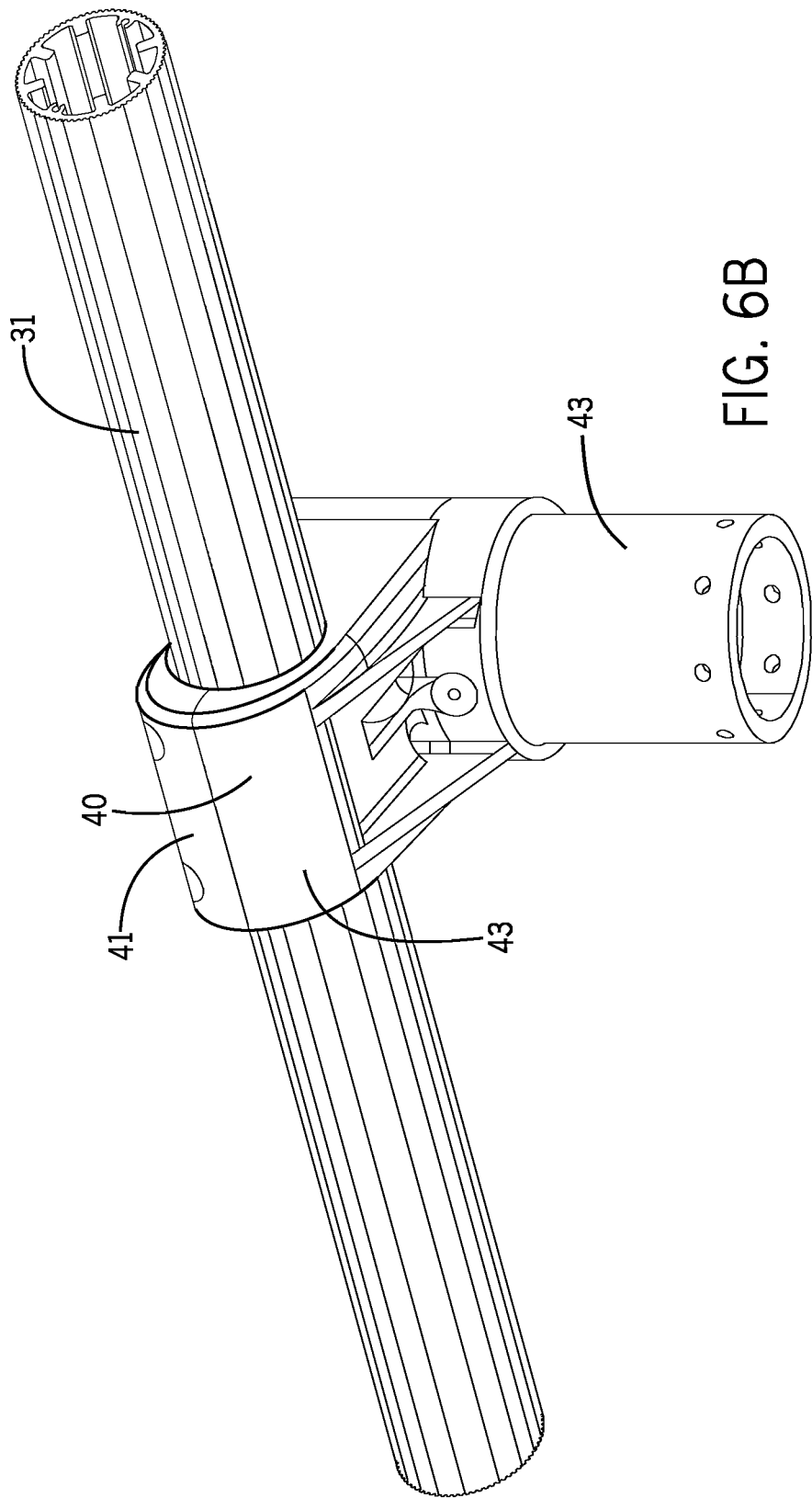
FIG. 6B is a bottom perspective view of the mounting assembly of FIG. 6A.
Figure 7:
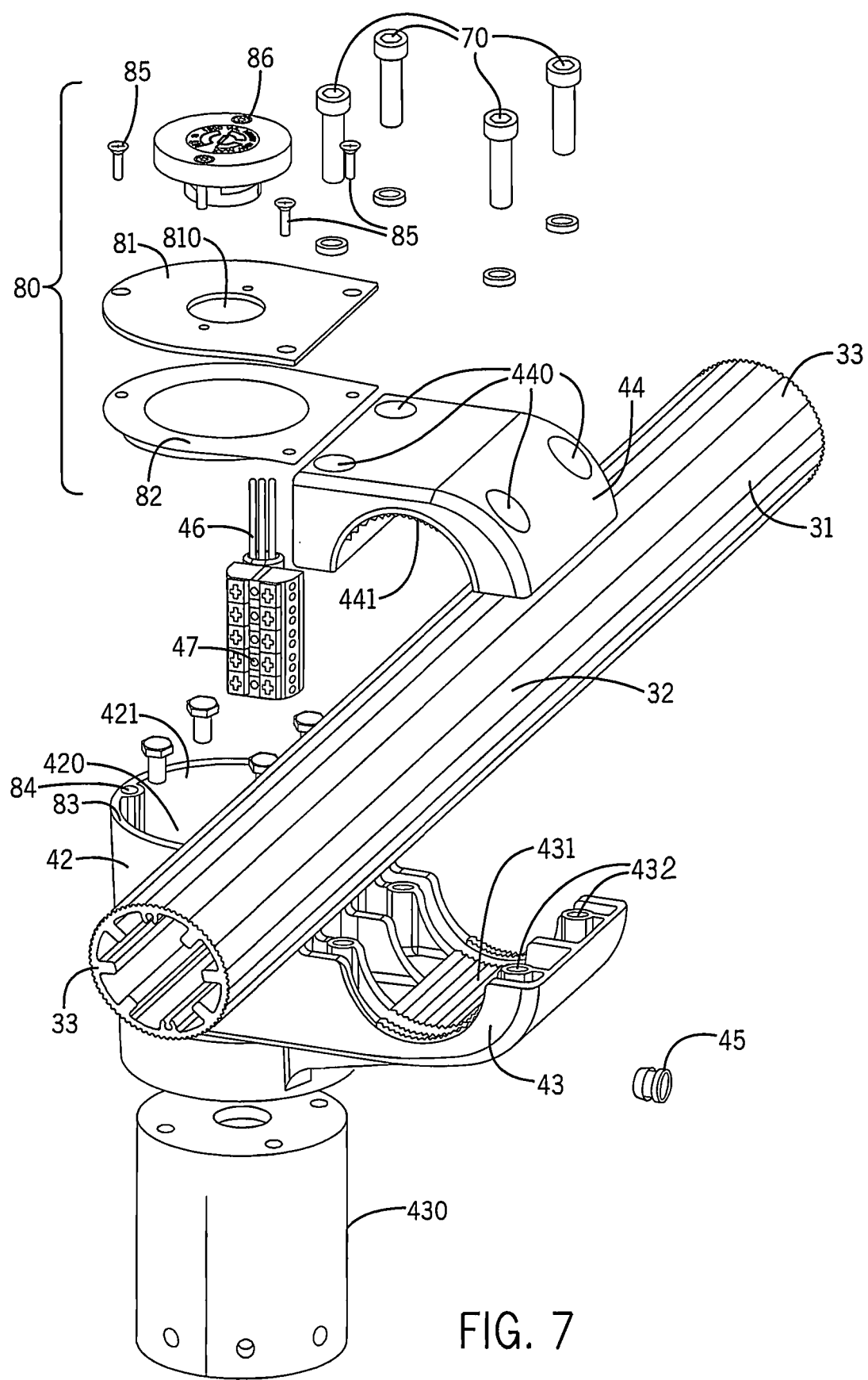
FIG. 7 is an exploded perspective view of the mounting assembly of FIG. 6A.

Mounting assembly 30 illustrated in FIGS. 1-10 includes a bar 31 having a gripping region 32 and a gripper 40 attachable to pole 2. As best seen in FIGS. 6-7, gripper 40 grips gripping region 32 such that light fixture 10 is held in a selected one of a plurality of orientations. In the illustrated embodiment, bar 31 has first and second opposite ends 33 secured with respect to main body portion 20 of light fixture 10. FIGS. 3 and 4 best show gripping region 32 being between first and second ends 33 and spaced from main body portion 20.

Figure 10:
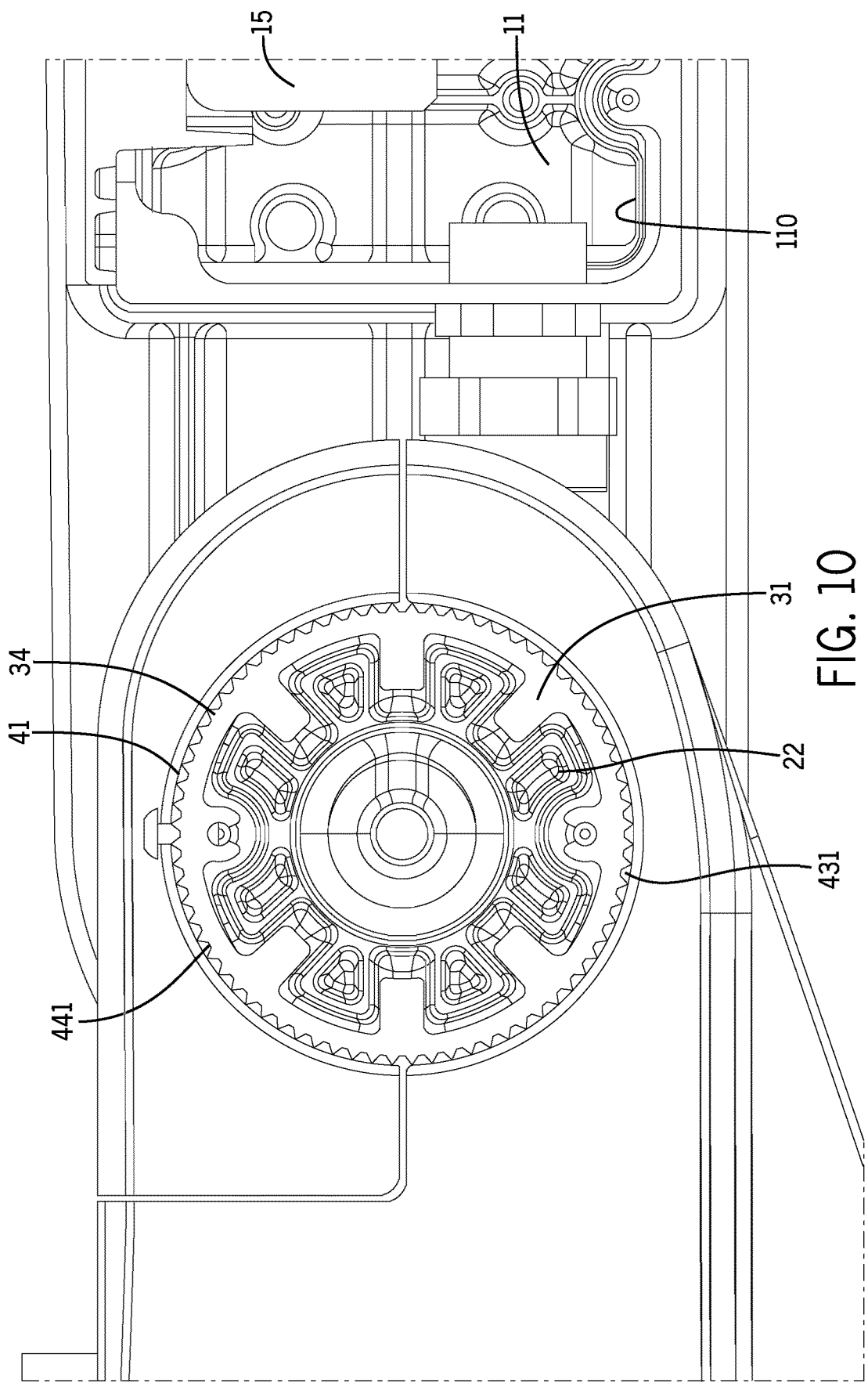
FIG. 10 is a fragmentary sectional view showing the bar-support portion inside the bar interior and illustrating their engagement preventing relative rotation.

In FIGS. 1-5, a fixture-holding portion includes a pair of bar supports 21 shown projecting from main body portion 20. FIGS. 3 and 4 best illustrate that first and ends 33 of bar 31 are each supported by one of the bar supports 21 such that gripping region 32 is along and spaced from main body portion 20. FIGS. 5 and 8-10 show each bar support 21 including a bar-support portion 22 engaged with end 33 of bar 31. In FIGS. 5-8, bar 31 is shown hollow. FIG. 10 best illustrates bar-support portion 22 inserted into end 33 of bar 31. As further seen in FIGS. 8-10, bar interior 36 and bar-support portion 22 are each shaped to prevent relative rotation.

Figure 8:
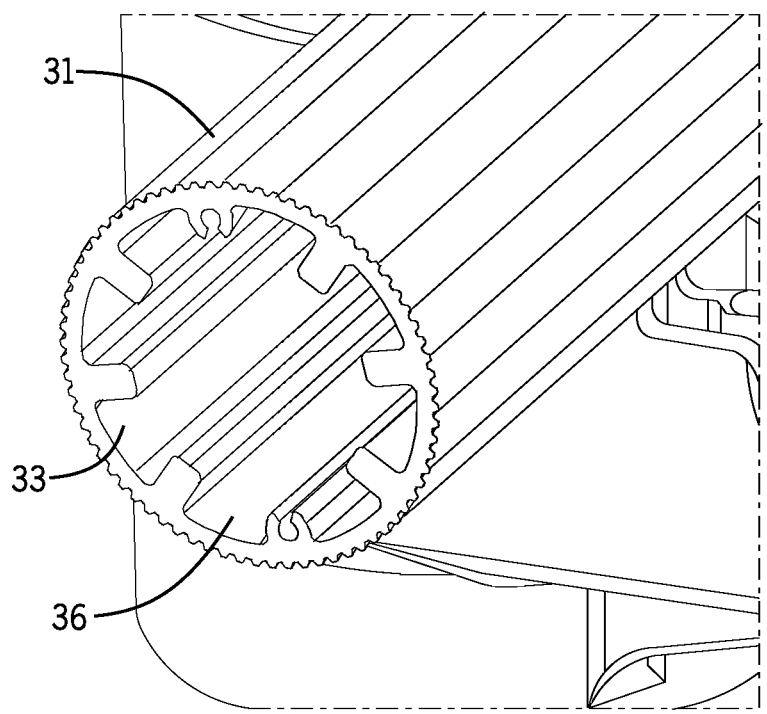
FIG. 8 is a fragmentary view of a bar and illustrating the bar interior.
Figure 9:
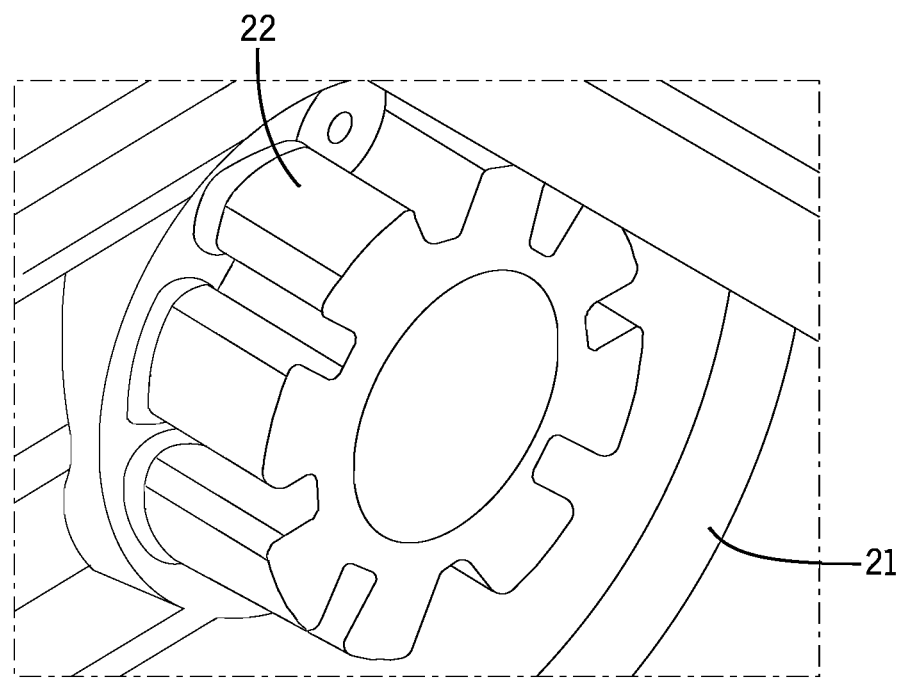
FIG. 9 is a fragmentary view of a bar-support portion shaped for insertion into the bar interior.

In FIGS. 6-8, bar 31 is shown as substantially cylindrical extruded piece.

FIGS. 6A and 6B best illustrate gripper 40 including a first bar-engaging portion 43 and a second bar-engaging portion 44 facing one another with bar 31 sandwiched therebetween. FIG. 7 best shows that each of bar-engaging portions 43 and 44 has a semi-cylindrical bar-engaging surface 431 and 441, respectively. Semi-cylindrical bar-engaging portions 43 and 44 together encircle and engage bar 31.

Bar-engaging surfaces 431 and 441 of gripper 40 and gripping region 32 of bar 31 are configured for a finite number of the orientations. As seen in FIGS. 7 and 10, gripping region 32 of bar 31 has parallel inter-engaged flutes and grooves 34 which are complementary to flutes and grooves 41 along bar-engaging surfaces 431 and 441 of gripper 40. These complementary flutes and grooves 34 and 41 also serve as anti-rotational interlocking features between bar 31 and gripper 40 which when interlocked hold light fixture 10 in a selected one of the finite plurality of orientations.

Figure 22:
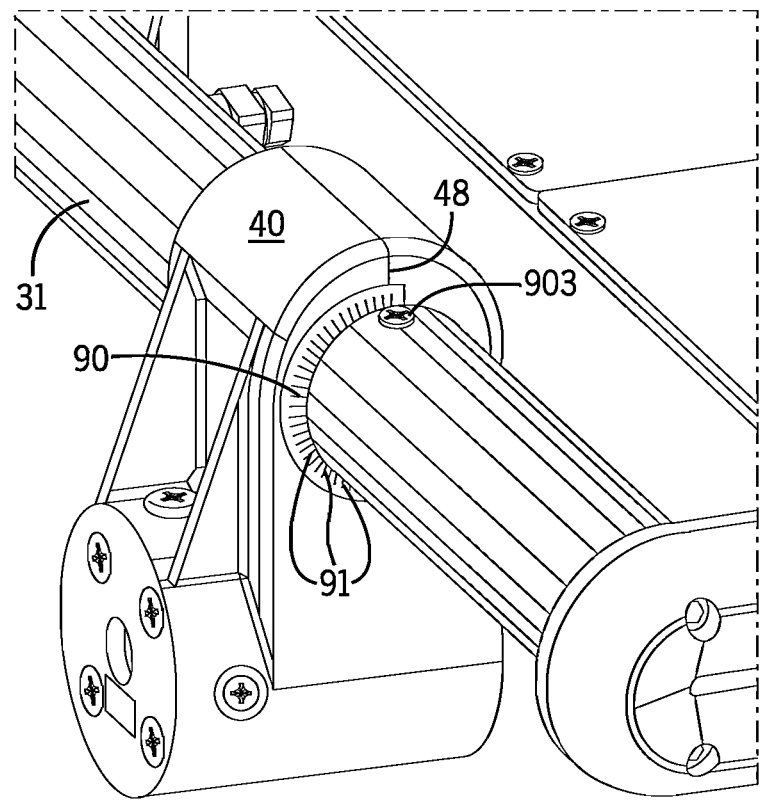
FIG. 22 is an enlarged portion of FIG. 21 showing details of the bracket.

FIGS. 21-26 illustrate mounting assembly 30 including a guide which indicates the angle for each of the orientations of light fixture 10 with respect to the static structure. These figures show the guide in the form of a bracket 90 which is removably secured with respect to bar 31. FIGS. 25 and 26 show positions 901, 902, 903 and 904 along the bar at which bracket 90 may be secured. FIG. 26 shows these positions in the form of apertures defined by bar 31. It is also seen in FIGS. 25 and 26 that bracket 90 includes a flange 92 for each of the apertures. Flange 92 defines a hole aligned with the corresponding aperture and receives a fastener therethrough for securing bracket 90 to bar 31. In FIGS. 25 and 26, bracket 90 is secured at position 903. In FIGS. 23 and 24, bracket 90 is secured at position 902. As seen in FIGS. 21-24, bracket 90 is shaped to follow outer shape 37 of bar 31 and includes angle markings 91. It is best seen in FIG. 22 that gripper 40 has a reference line 48 which points to a particular one of angle markings 91 indicating the angle of light fixture 10 with respect to the static structure such as round tenon 3 or square pole 2A.

FIGS. 2 and 7 show first bar-engaging portion 43 including a pole-engaging portion 430 configured for securement with respect to pole 2. Second bar-engagement portion 44 is shown configured for attachment to first bar-engagement portion 43 with bar 31 sandwiched therebetween. FIG. 7 shows that first bar-engaging portion 43 defines mounting cavities 432 accepting fasteners 70 which extend through apertures 440 formed through second bar-engagement portion 44.

Figure 5:
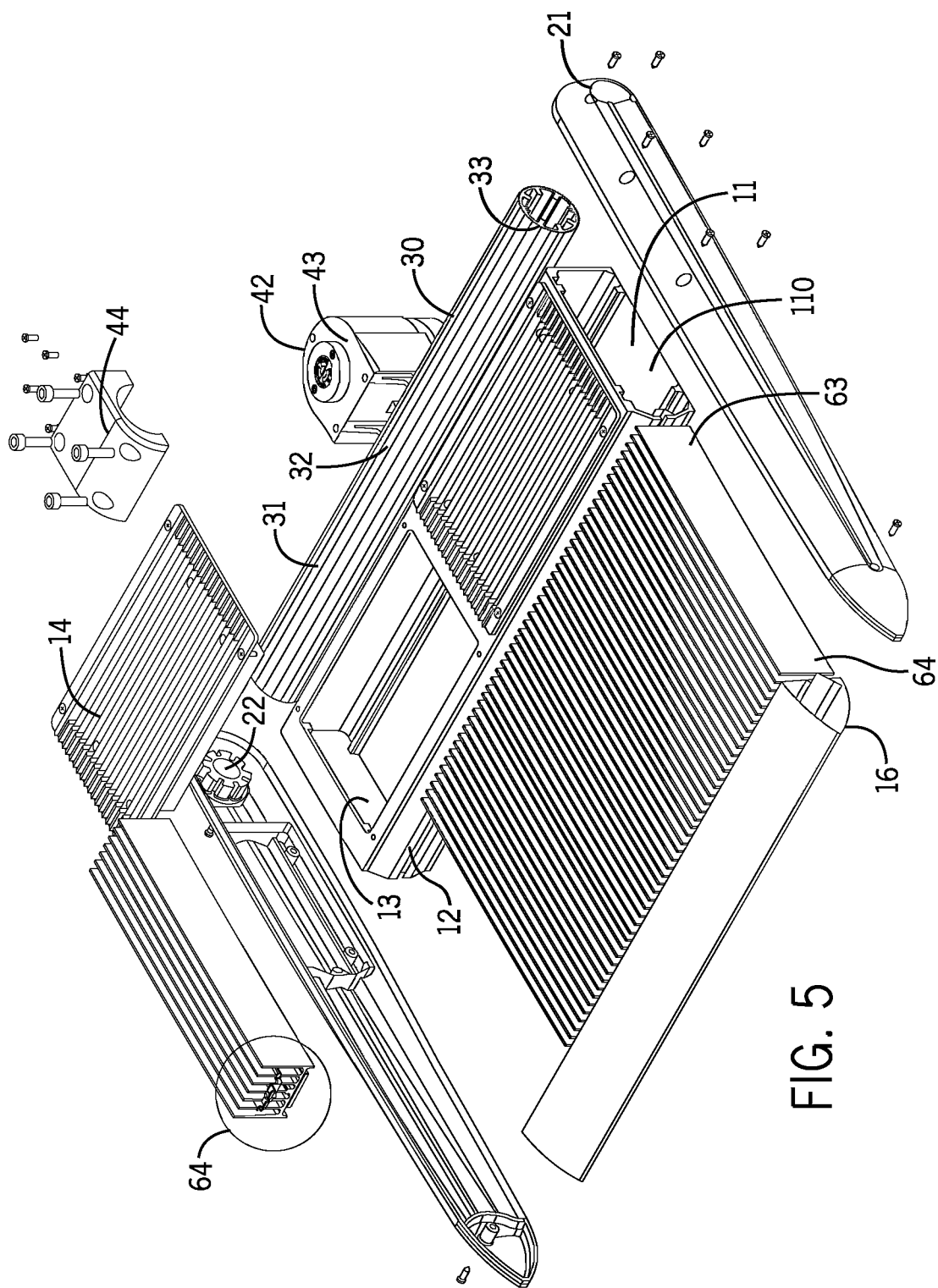
FIG. 5 is an exploded top perspective view of the LED light fixture of FIG. 1.

FIGS. 1-5, 11 and 14 show light fixture 10 further including a closed chamber 11 defined by a driver housing 12 shown in FIG. 5 as an extruded piece. It is further best seen in FIG. 5 that chamber 11 has an access opening 13 and a driver door 14 for placement of an LED driver 15 into chamber 11. In FIGS. 10 and 15, an electronic LED driver 15 is seen enclosed within chamber 11.

Figure 19:
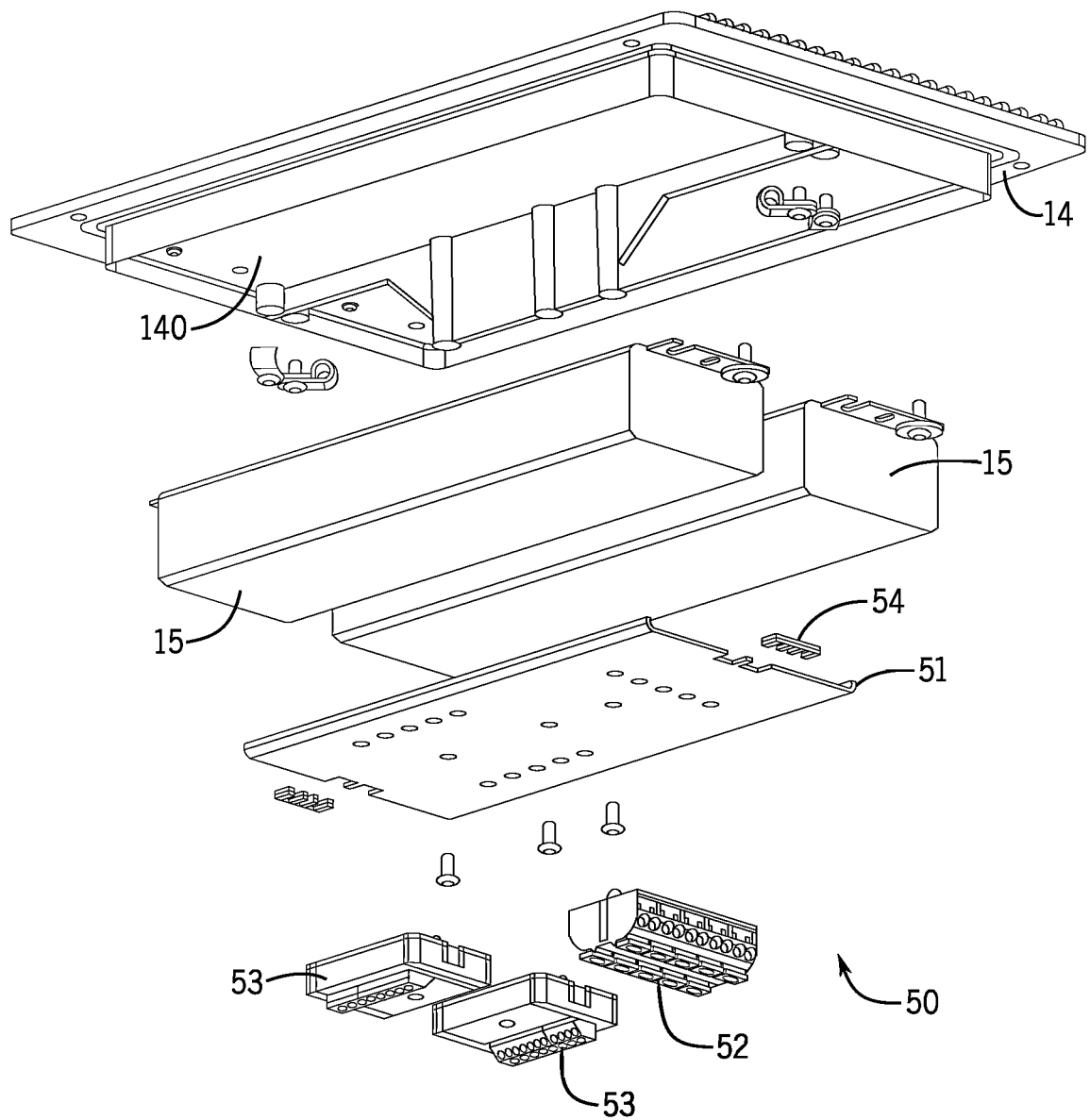
FIG. 19 is an exploded perspective view of an LED driver module of the light fixture of FIG. 1.
Figure 20:
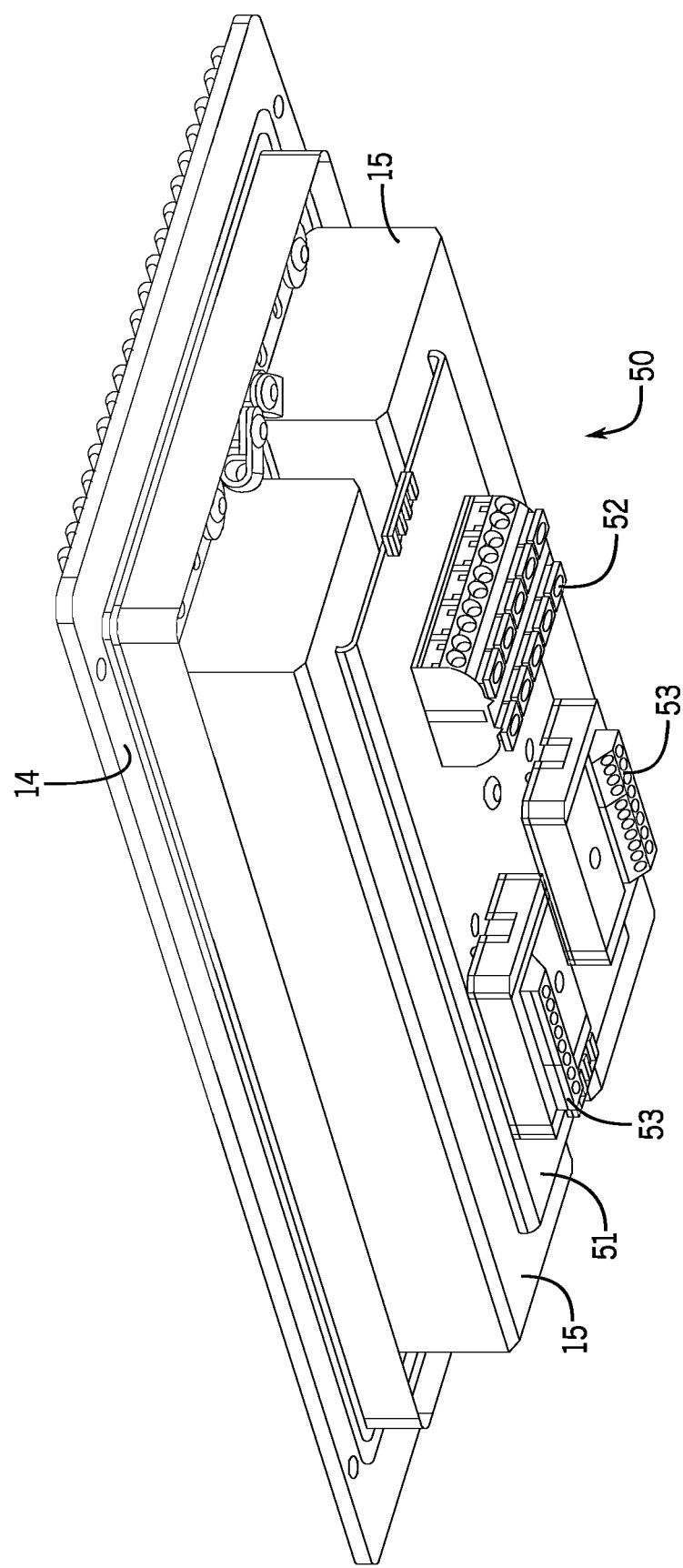
FIG. 20 is a perspective view of the LED driver module of FIG. 19.
Figure 21:
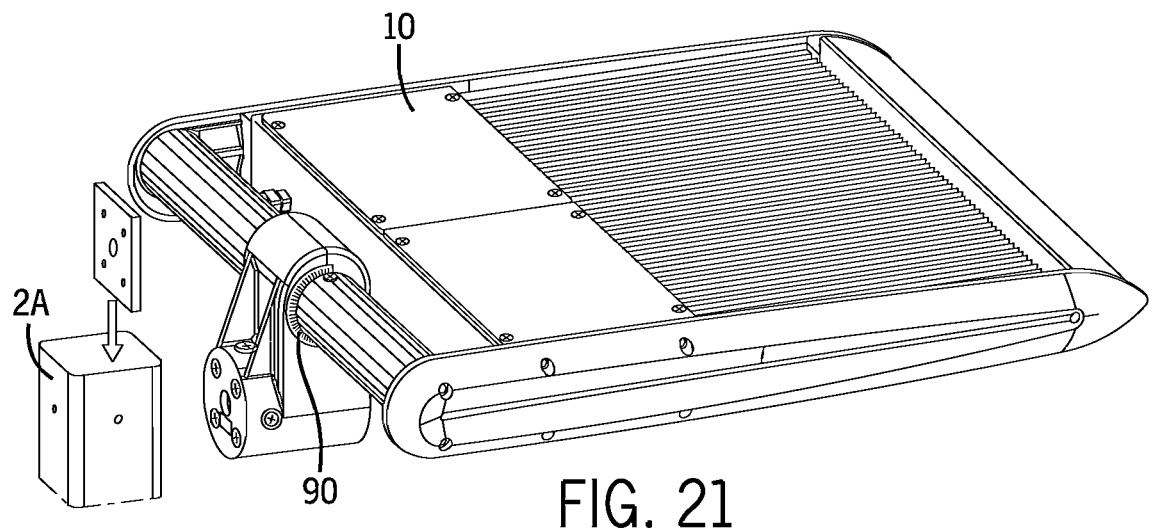
FIG. 21 is a perspective view of the LED light fixture in a position for installation to a square pole, the mounting assembly including a bracket indicating an angle of the light fixture with respect to the pole.

FIGS. 19 and 20 illustrate a driver module 50 including two LED drivers 15 attached to driver door 14 and secured with a mounting plate 51 which supports a terminal block 52, secondary-surge elements 53 and wire guards 54. Driver door 14 is shown as a cast piece configured to support LED driver module 50 thereagainst. As seen in FIG. 5, driver module 50 is positioned such that driver-supporting surface 140 of driver door 14 is oriented substantially down such that driver 15 is spaced above bottom 110 of chamber 11 and is away from any water that might access chamber 11 and accumulate along its bottom 110.

FIG. 5 also shows mounting arrangement 30 positioned adjacent driver housing 11 with bar 31 extending along driver housing 11 and spaced therefrom (also shown in FIGS. 3 and 4).

FIG. 7 shows that first bar-engaging portion 43 further includes a pole-connecting section 42 enclosing wiring 46 and electrical elements such as a terminal block 47 and having a weather-proof wire access 45 thereto for electrical connection of light fixture 10. As seen in FIGS. 6-7, pole-connecting section 42 forms an enclosure 420 accessible through an opening 421 with a cover assembly 80 including a cover plate 81 and a gasket 82. Edge 83 defines fastener receiving cavities 84 accepting fasteners 85 which press cover plate 81 against an edge 83 of opening 421 with gasket 82 sandwiched therebetween. Cover plate 81 defines an aperture 810 which is closeable with a lock-closure 86.

FIGS. 1-4 further show that light fixture 10 includes an LED assembly 60 which is open to air/water flow thereover. As seen in FIGS. 2 and 4, LED assembly 60 has a plurality of LED-array modules 61 each secured to an individual LED heat sink 62 (best seen in FIG. 3) which has first and second heat-sink ends 63 and 64 best seen in FIG. 5. It is further seen in FIGS. 1-4 that LED assembly 60 is bordered by driver housing 12 and a nose structure 16 each along one of opposite heat-sink ends 63 and 64, and that driver housing 12 and nose structure 16 are secured with respect to one another by a frame portion 17 extending alongside LED assembly 60.

Figure 11:
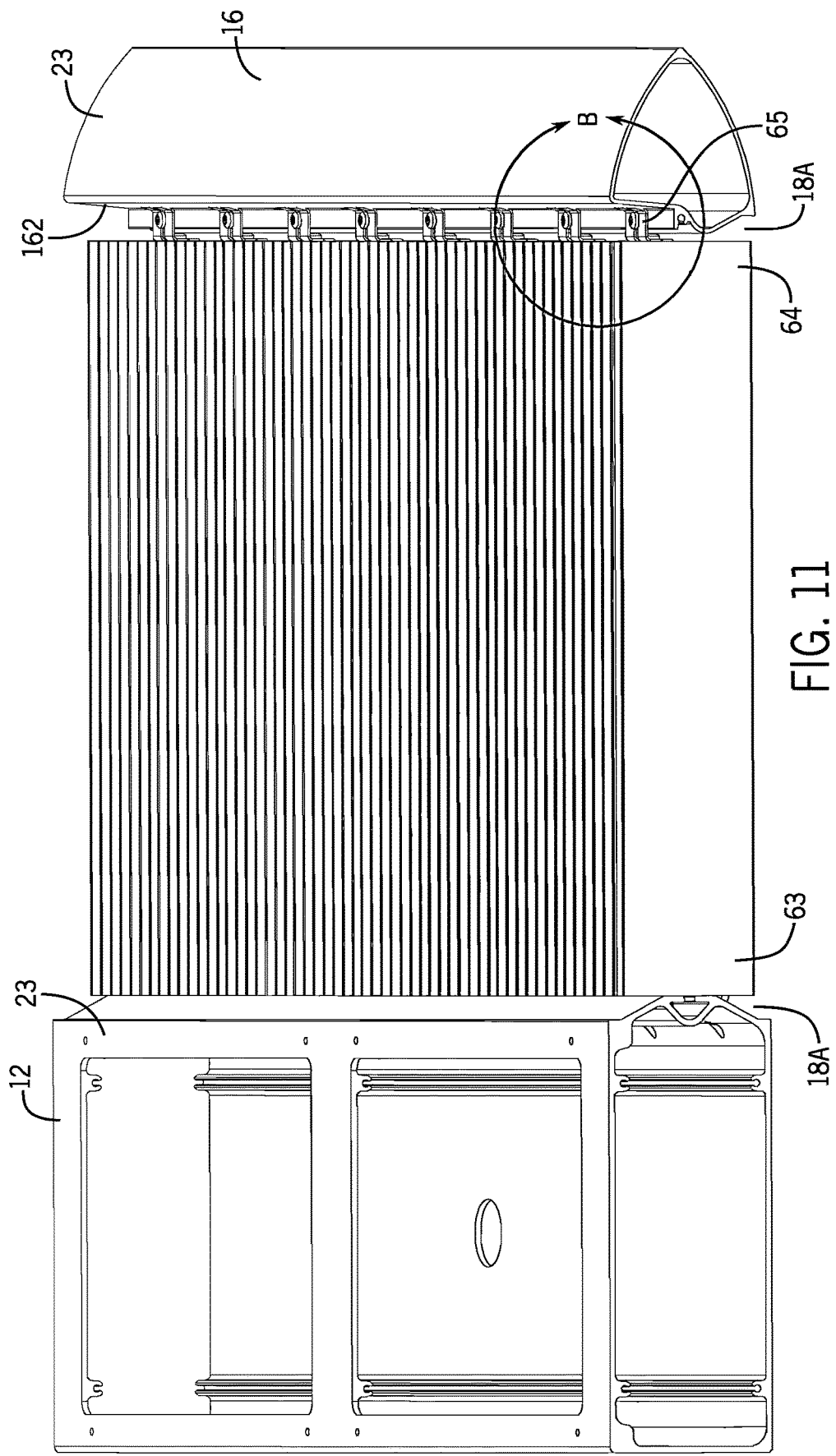
FIG. 11 is a fragmentary sectional perspective view illustrating mounting of LED heat sinks of the LED assembly of the light fixture of FIG. 1.
Figure 12:
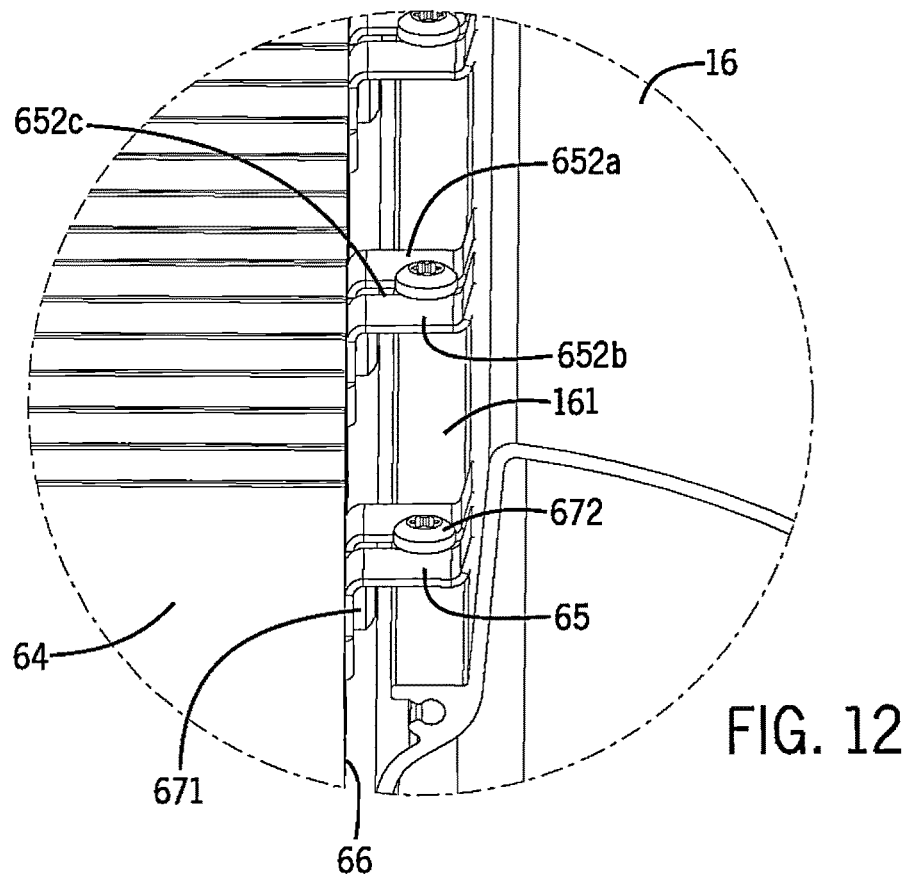
FIG. 12 is a fragmentary perspective view of the mounting engagement of one end of the LED heat sinks, as shown in FIG. 11.
Figure 13:
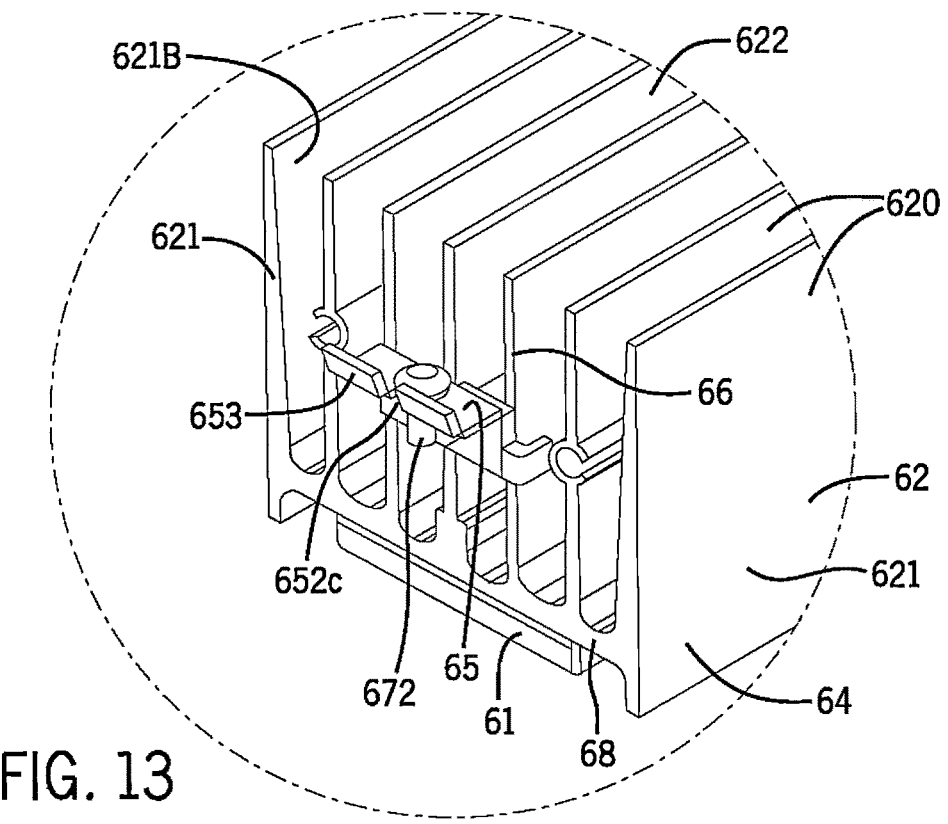
FIG. 13 is a fragmentary perspective view of one LED heat sink illustrating a mounting clip shown in FIG. 12 and seen in FIG. 5.

FIGS. 11-16 illustrate an engagement of first heat-sink end 63 with driver housing 12 and a securement of second heat-sink end 64 to nose structure 16. It is best seen in FIGS. 14 and 15 that first heat-sink end 63 includes a pin 630 extending therefrom and inserted into a slot 120 formed along driver housing 12. FIGS. 11-14 and 16 show second heat-sink end 64 secured with respect to nose structure 16 with a spring clip 65. FIGS. 12, 13 and 16 show clip 65 formed from a sheet metal bent into first, second and third clip portions 651, 652 and 653. First clip portion 651 is attached to a substantially vertical fin edge 66 of second heat-sink end 64 with a fastener 671. Second clip portion 652 is substantially orthogonal to first clip portion 651 and has two subportions 652a and 652b with an opening 652c therebetween. Second clip portion 652 is attached to a substantially horizontal shelf 161 formed along nose structure 16 with a fastener 672 extending through opening 652c and pressing second clip subportions 652a and 652b against shelf 161. Third clip portion 653 extends from second clip portion 652 toward a surface 162 of nose structure 16 and extending transversely to shelf 161. Third clip portion 653 presses against surface 162 and by its spring action pushes pin 630 of first heat-sink end 63 into slot 102 for secure holding of heat sink 62 within fixture 10 and provides a positive seal on a light-module grommet 760. FIGS. 11 and 12 further show that each of the plurality of heat sinks 62 is individually secured with respect to driver housing 12 and nose structure 16 in the above-described manner.

Figure 17:
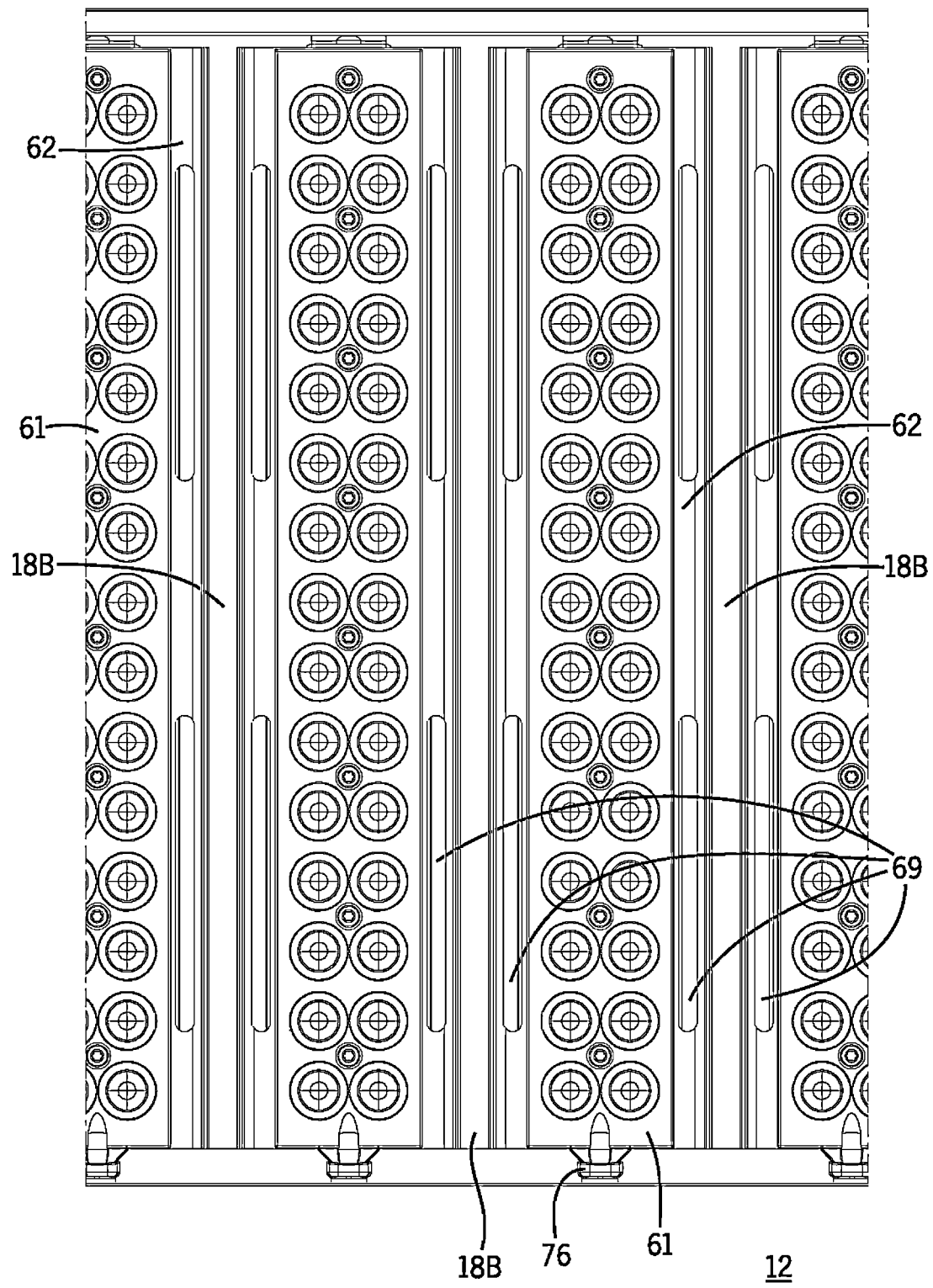
FIG. 17 is a fragmentary bottom plan view of the LED assembly shown in FIG. 4 and illustrating in more detail air-flow channels facilitating heat dissipation from LEDs.

FIGS. 11 and 14 further show fixture 10 having air gaps 18A along first and second heat sink ends 63 and 64 permitting air/water-flow to and from heat sinks 62 through heat sink ends 63 and 64. FIGS. 3, 4 and 17 show fixture 10 further having air gaps 18B defined between adjacent pairs of heat sinks 62 to provide heat removal along entire length of each heat sink 62 by cool air drawn from below LED assembly 60 through air gaps 18B by rising heated air. It is seen in FIG. 13 that side fins 621 are thicker than middle fins 622 to conduct heat through a heat-sink base 68 away from LED-array module 61 for heat removal facilitated with air-flow through air gaps 18B along side fins 621.

It is further seen in FIG. 17 that each heat sink 62 has venting apertures 69 formed therethrough to provide cool-air ingress to and along heat-dissipating fins 620 by upward flow of heated air therefrom. FIGS. 3, 4 and 17 show venting apertures 69 formed along sides of heat sinks 62 with LED-array module 61 positioned between venting apertures 69. FIG. 13 shows that heat-sink base 68 has thickness which is the thinnest along the middle of heat sink 62 and is the greatest along sides of LED module 61, thus conducting heat away from LED module 61 toward venting apertures 69.

Figure 18:
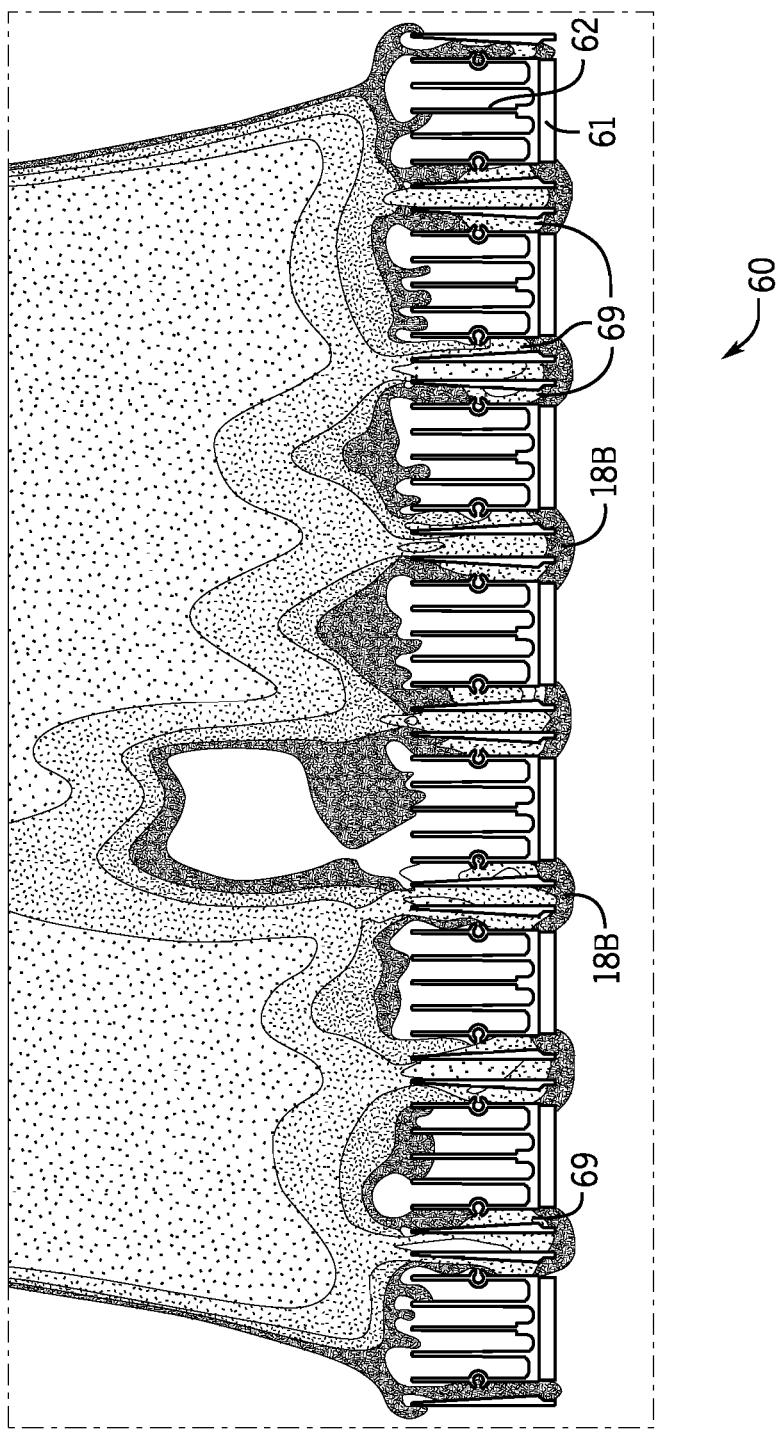
FIG. 18 is a fragmentary sectional view across the LED assembly of FIG. 17 illustrating simulated air-flow velocity through the channels.

FIG. 18 shows simulated velocity of air flow along LED assembly 60. The darker areas between heat sinks 62 and through venting apertures 69 illustrates increased air flow which facilitates heat removal from LED assembly 60.

Figure 27:
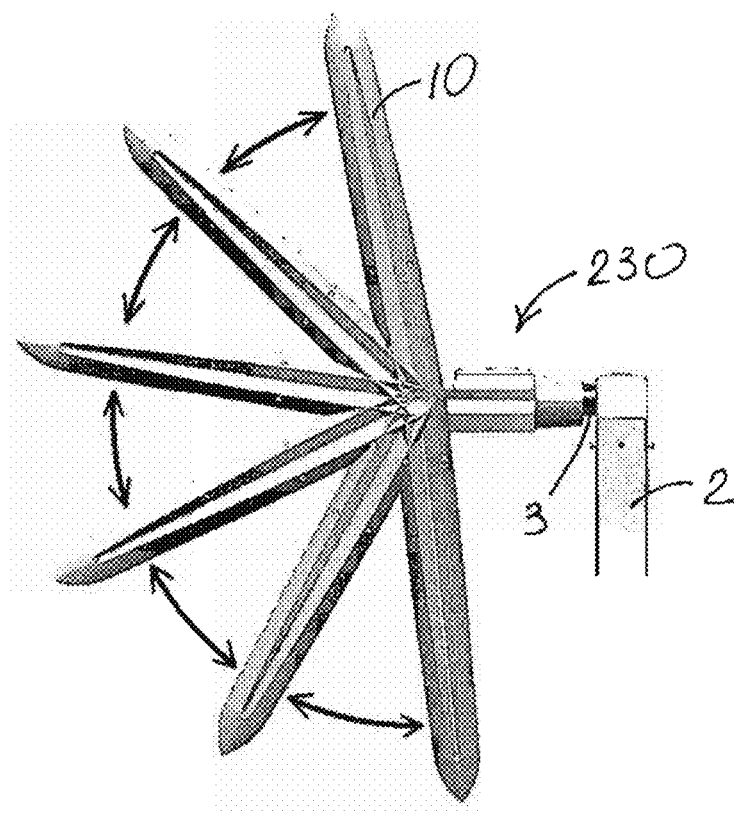
FIG. 27 is a side view of a light fixture secured to a second embodiment of the mounting assembly in accordance with the present invention, schematically showing some of the plurality of possible fixture orientations.
Figure 35:
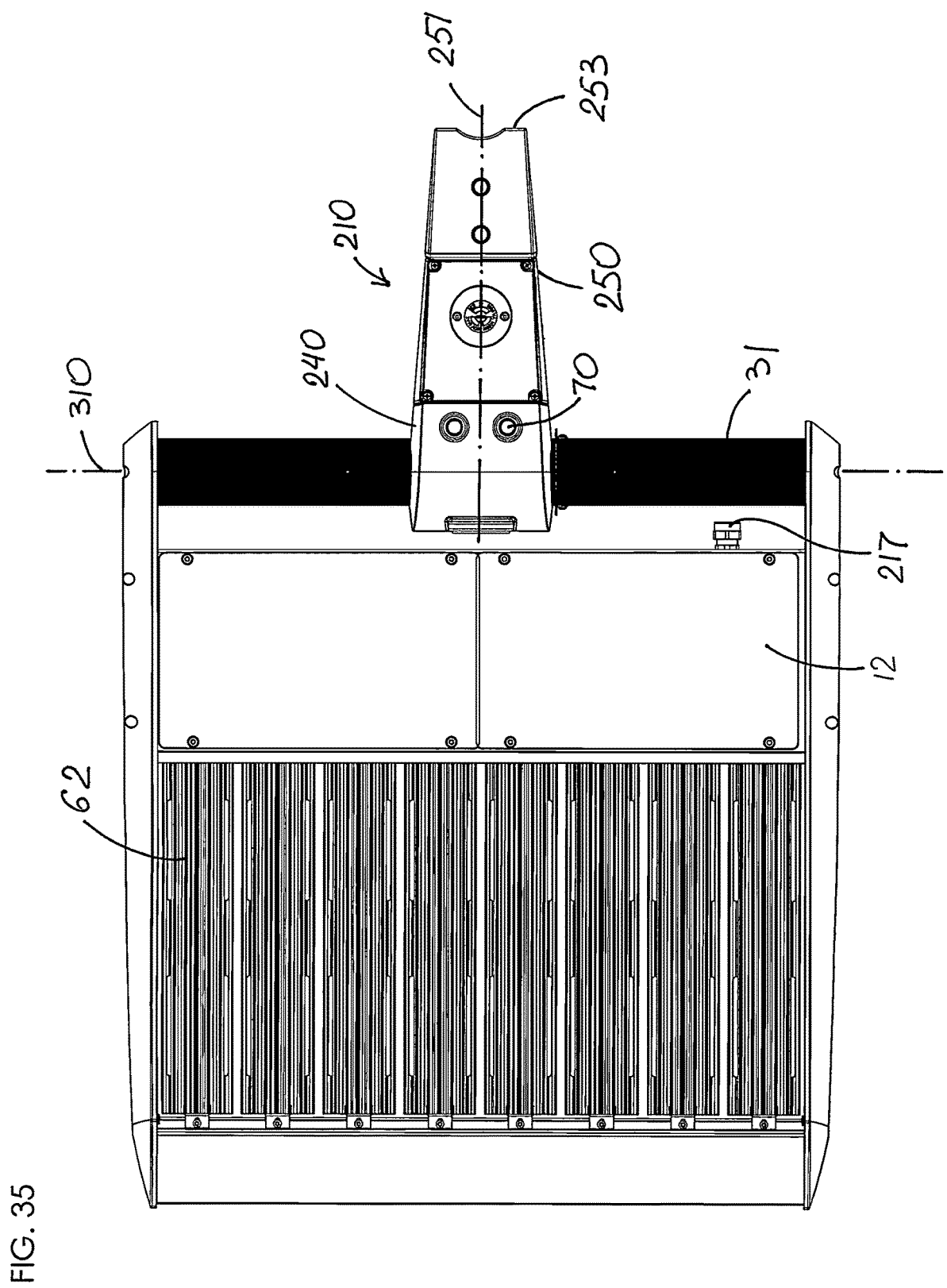
FIG. 35 is a top plan view of the LED light fixture with the mounting assembly of FIG. 33.
Figure 36:
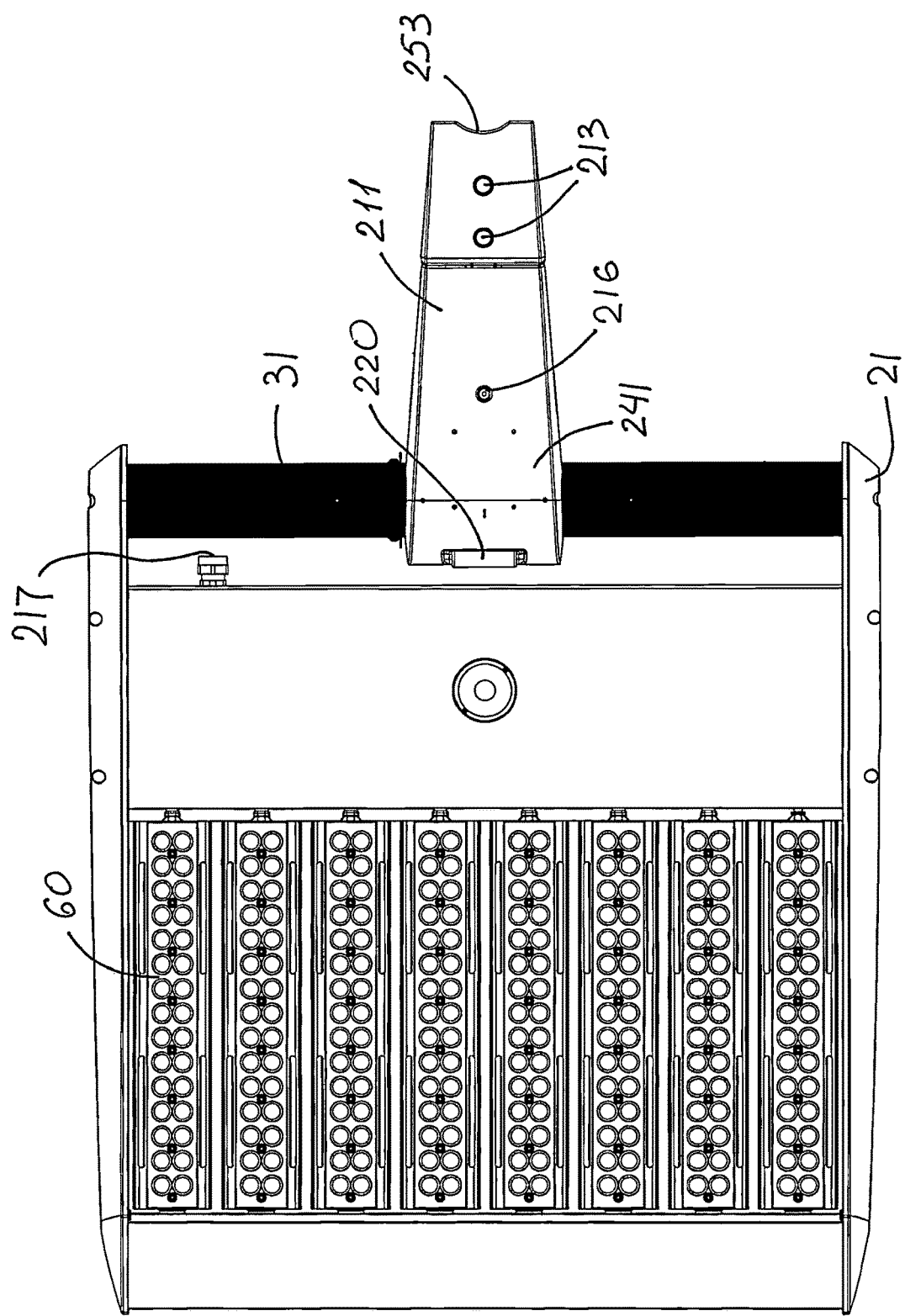
FIG. 36 is a bottom plan view of the LED light fixture with the mounting assembly of FIG. 33.
Figure 37:
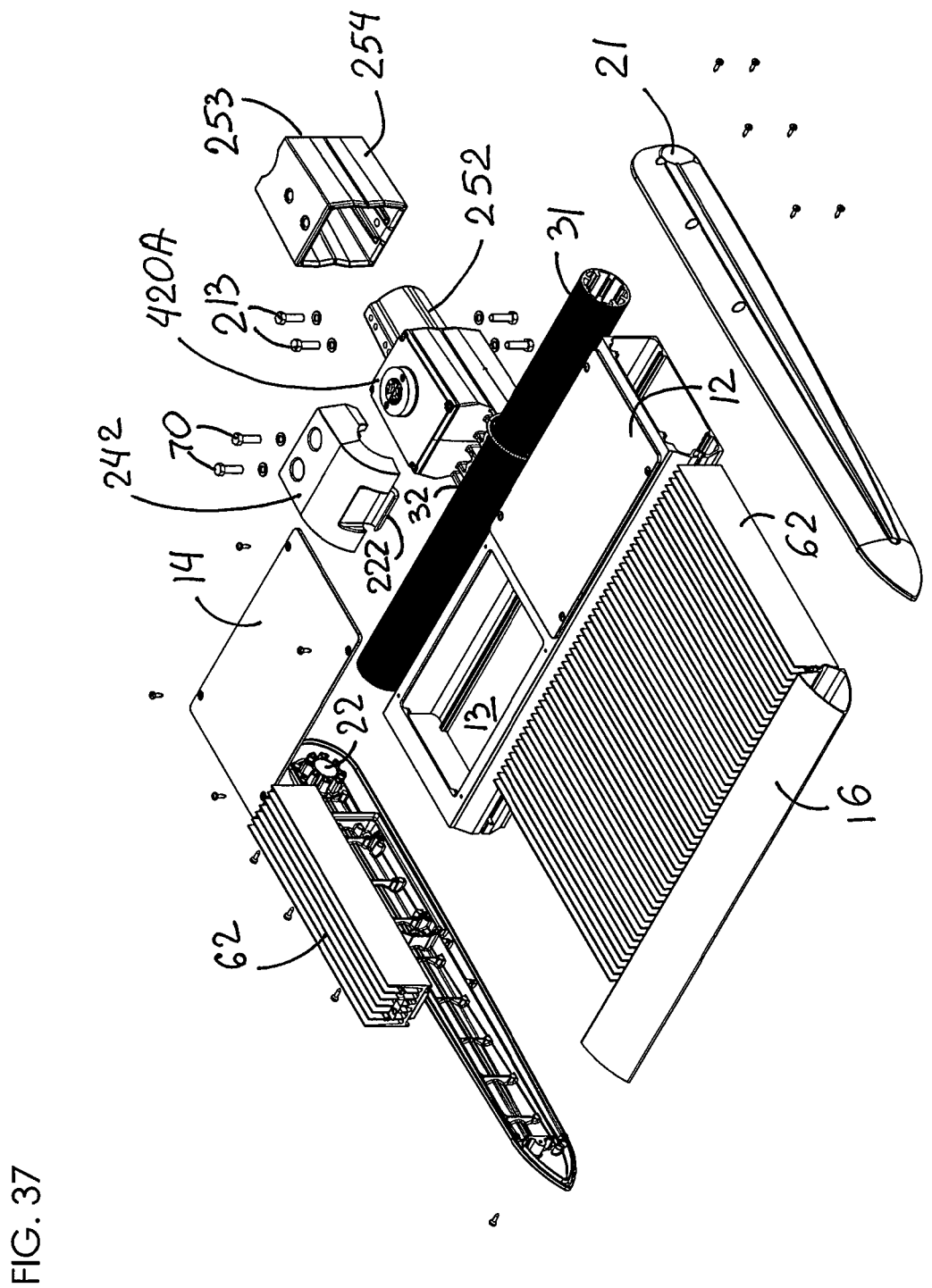
FIG. 37 is an exploded top perspective view of the LED light fixture with the mounting assembly of FIG. 33.

FIGS. 27-65 illustrate a second embodiment of mounting assembly 230 comprising a bar 31 and a securing member 210. Bar 31 is secured with respect to a main body portion 20 of light fixture 10. Bar has an axis 310 shown in FIG. 35. Securing member 210 includes a bar-gripping portion 240 and an arm portion 250 extending from bar-gripping portion 240. As further shown in FIG. 35, the entire arm portion 250 is on an arm axis 251 which is substantially orthogonal to bar axis 310. FIGS. 28-31 and 48-65 show arm portion 250 being attachable to static structures such as pole 2. FIG. 27 best illustrates bar-gripping portion 240 adjustably holding bar 31 such that light fixture 10 is positionable to a selected one of a plurality of possible orientations.

Figure 28:
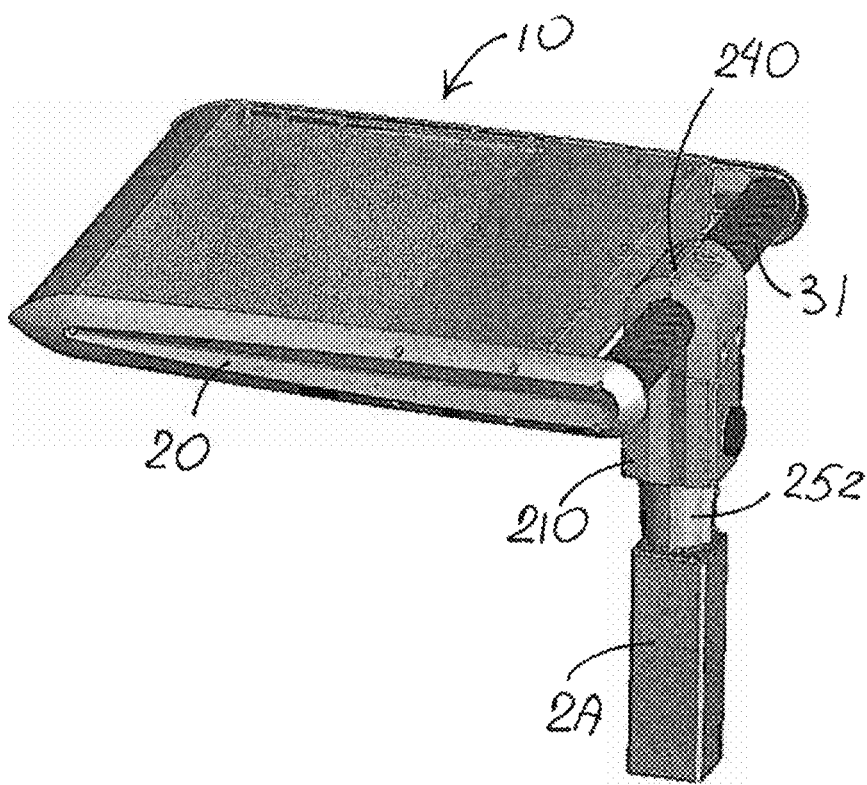
FIG. 28 is a top perspective view of the horizontally-oriented light fixture secured to the mounting assembly of FIG. 27 having a sleeve secured atop a vertical pole.
Figure 29:
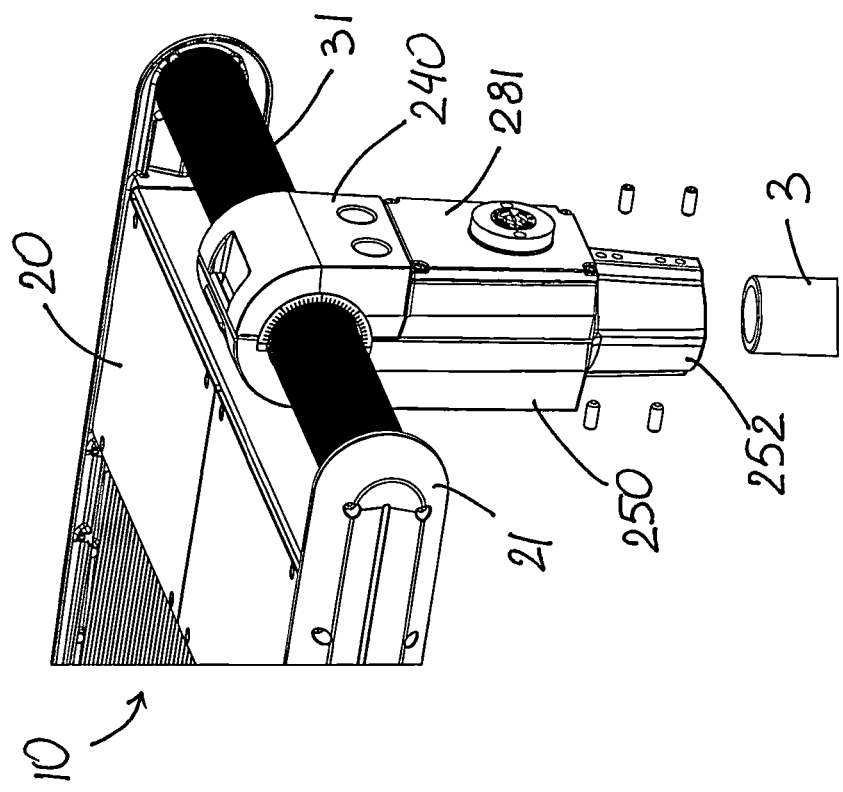
FIG. 29 is a fragmentary exploded view showing securement of mounting assembly atop a vertical pole as seen in FIG. 28.
Figure 30:
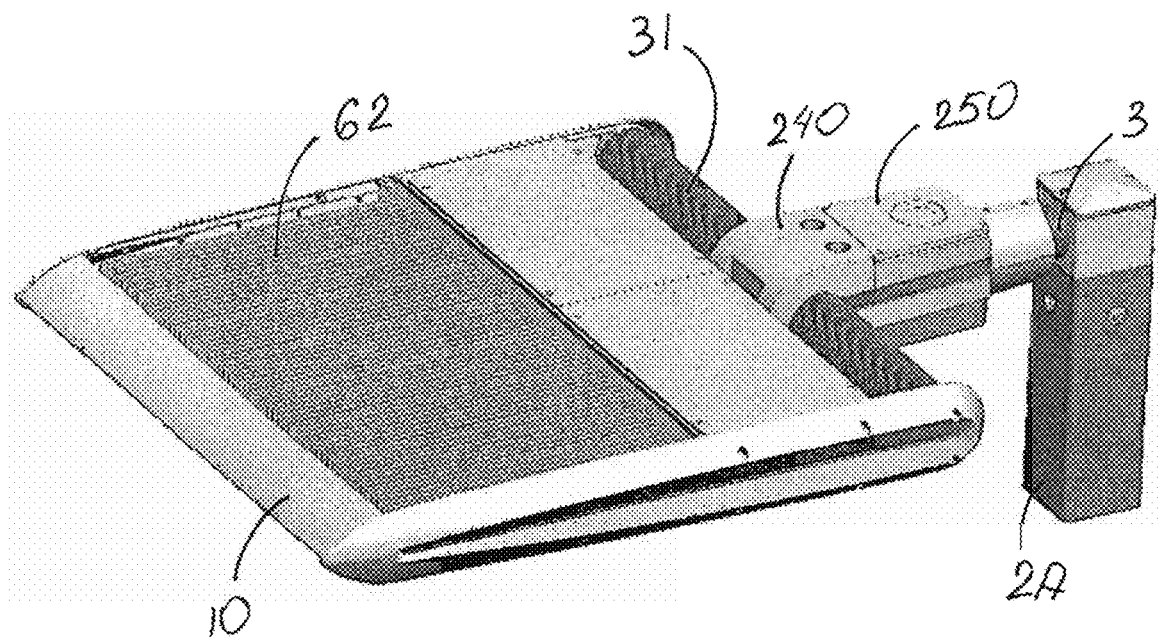
FIG. 30 is a top perspective view of the horizontally-oriented light fixture with the mounting assembly of FIG. 27 secured to a horizontal arm of a pole, the light fixture being positioned for downward illumination.
Figure 31:
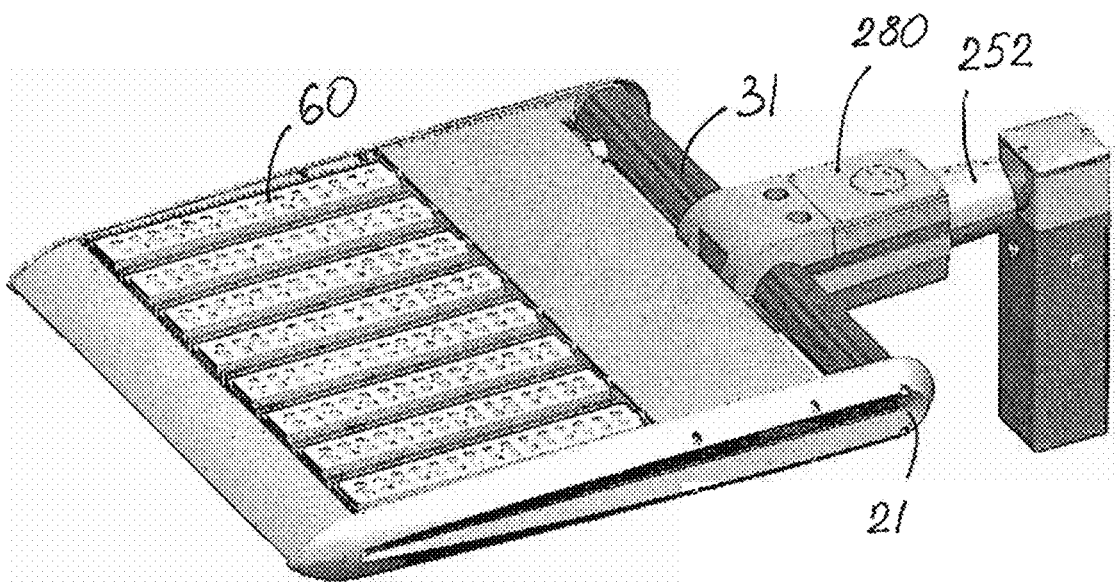
FIG. 31 is a top perspective view of the horizontally-oriented light fixture with the mounting assembly of FIG. 27 secured to a horizontal arm of a pole, the light fixture being positioned for upward illumination.
Figure 32:
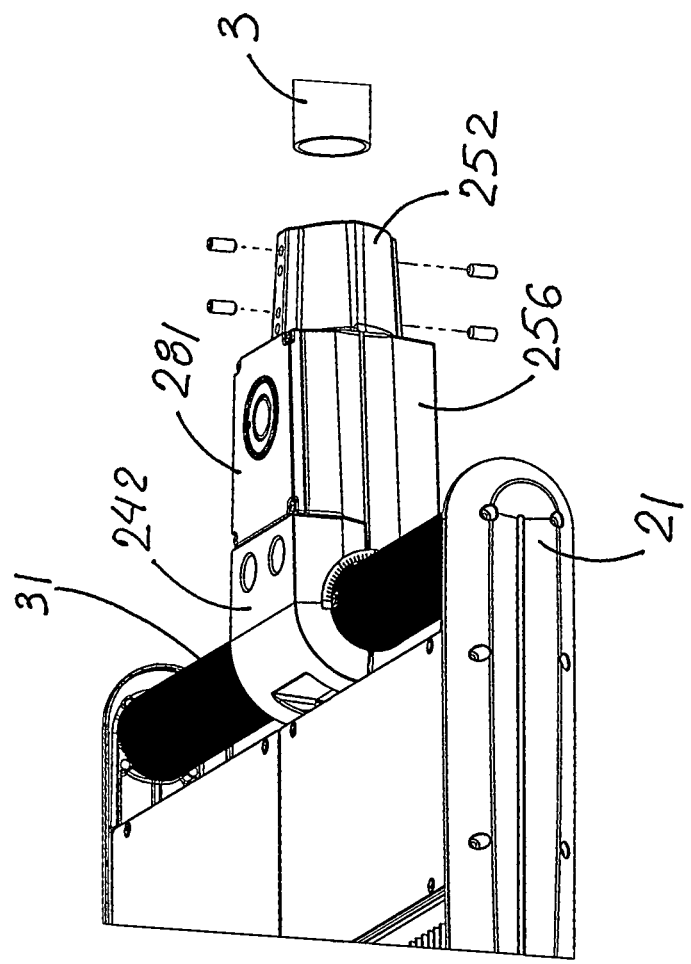
FIG. 32 is a fragmentary exploded view showing securement of mounting assembly to the horizontal arm of the pole as seen in FIGS. 30 and 31.
Figure 33:
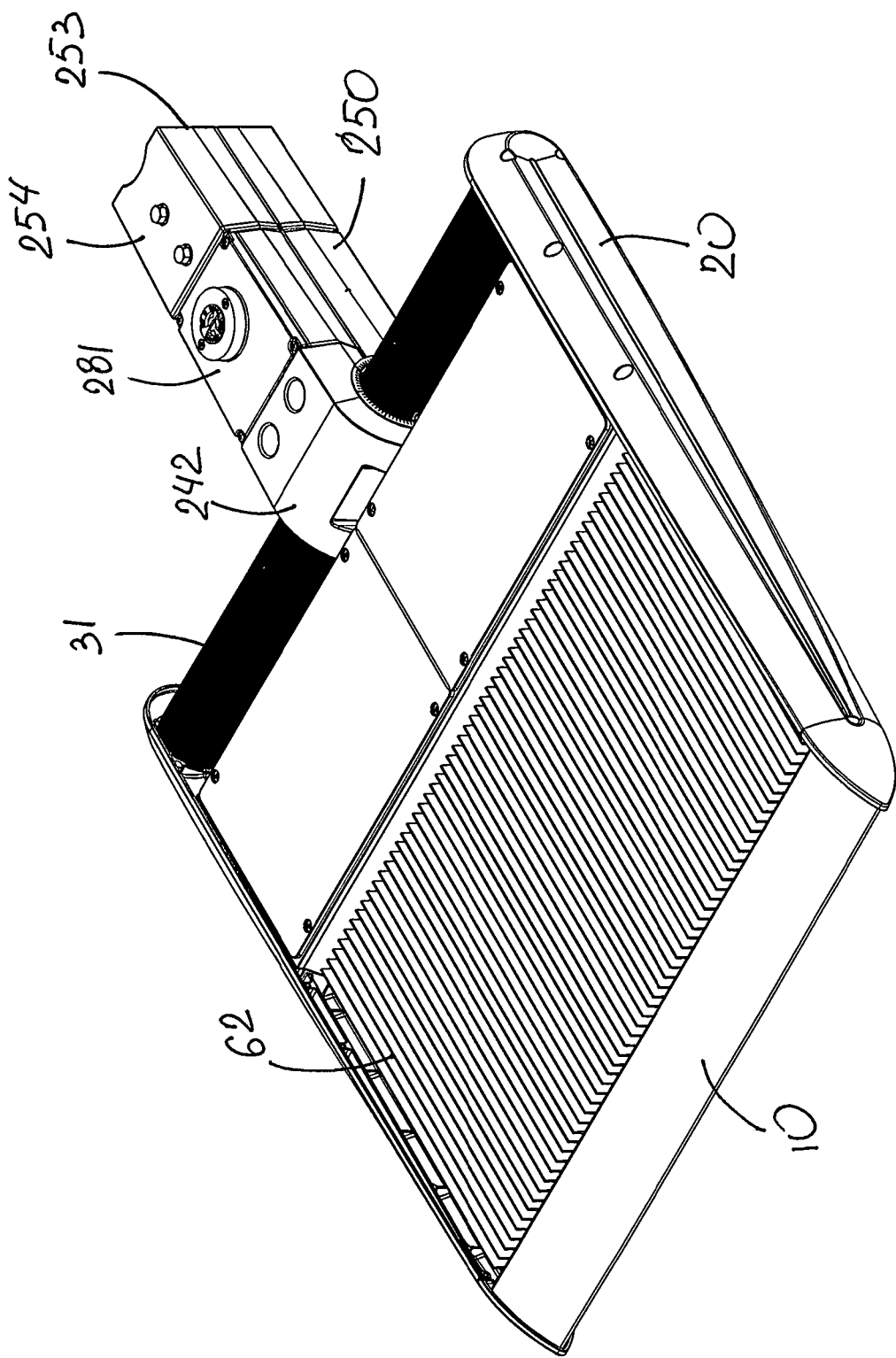
FIG. 33 is a top perspective view of the LED light fixture secured to yet another embodiment of the mounting assembly in accordance with the present invention including a fitter enclosing the sleeve of FIG. 27.
Figure 34:
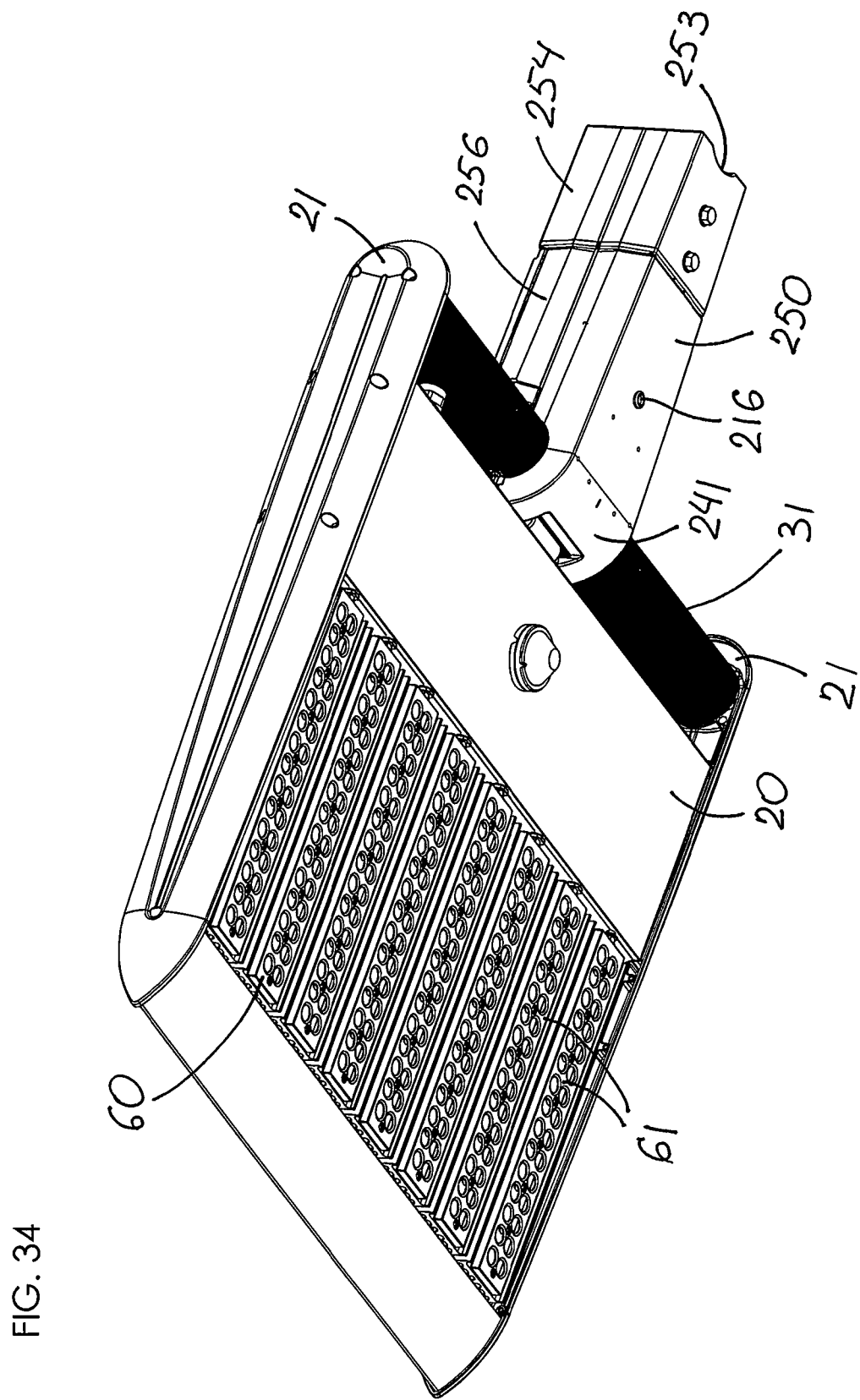
FIG. 34 is a bottom perspective view of the LED light fixture secured to the mounting assembly of FIG. 33.

FIGS. 27-32 and 50, 51, 54, 55, 58, 59, 62 and 63 show arm portion 250 being shaped for attachment to substantially cylindrical static structures such as a pole 2 and a horizontal cylindrical tenon 3 such as those used in high mast applications. FIGS. 27-32, 37-39 and 43 show that arm portion 250 has a sleeve 252 dimensioned for receiving therewithin a lesser-diameter cylindrical tenon 3. Tenon 3 may extend from a pole of different shape such as pole 2A of a square cross-sectional configuration. FIGS. 27 and 30-32 show sleeve 252 engaging horizontal tenon 3. FIGS. 28 and 29 show sleeve 252 engaging vertical tenon 3.

FIGS. 33-43 show that arm portion has a distal end surface 253 shaped for abutting attachment to the exterior surface 4 of a cylindrical static structure such as pole 2A, as seen in FIGS. 50, 51, 54, 55, 58, 58, 62 and 63. FIGS. 33-43 also show distal end surface 253 being shaped for abutting attachment to a substantially planar surface 5, as seen at least in FIG. 48.

Figure 42:
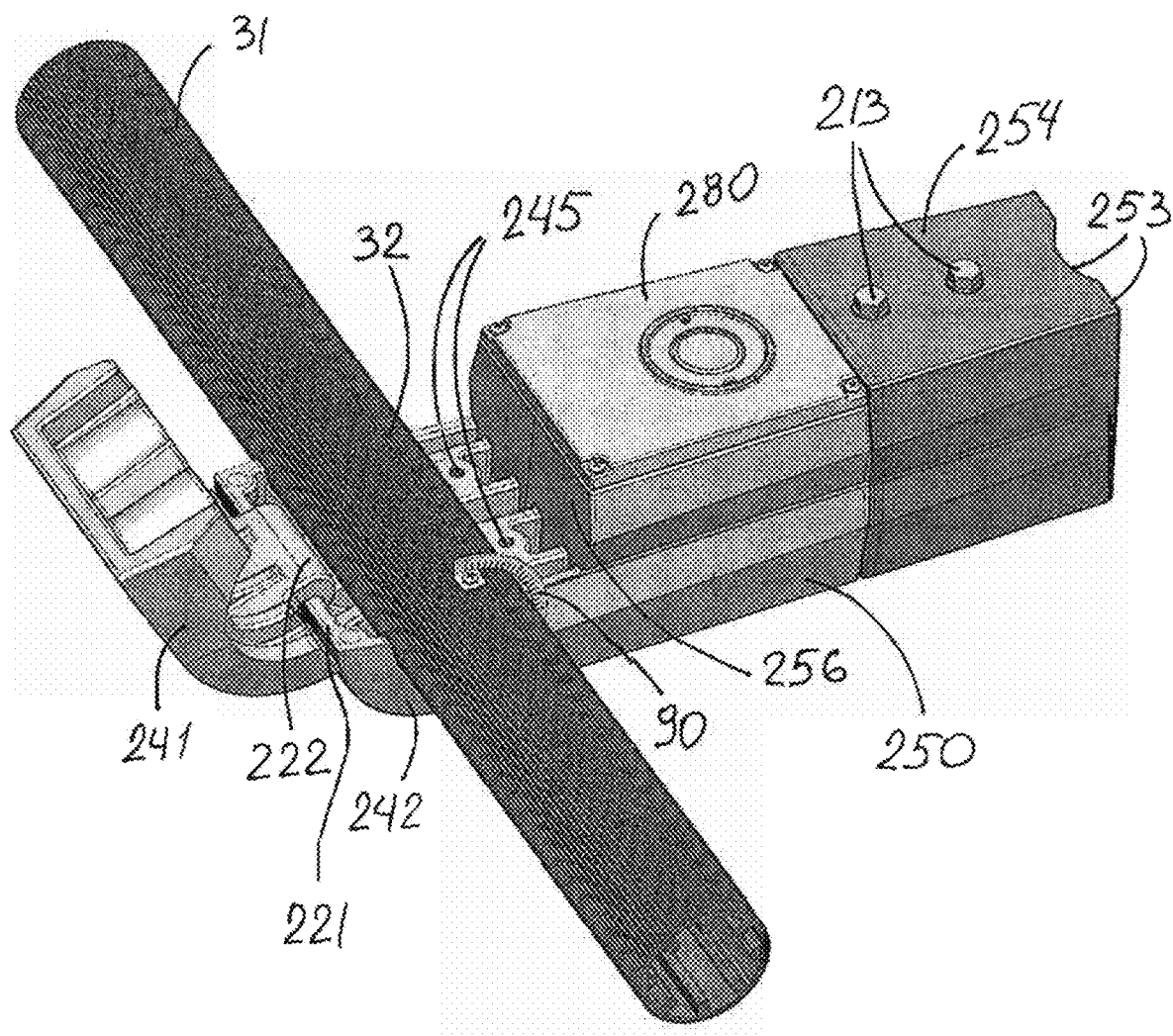
FIG. 42 is a top perspective view of the mounting assembly of FIG. 40 showing a second bar gripper pivoted forward for disengagement from the bar.
Figure 43:
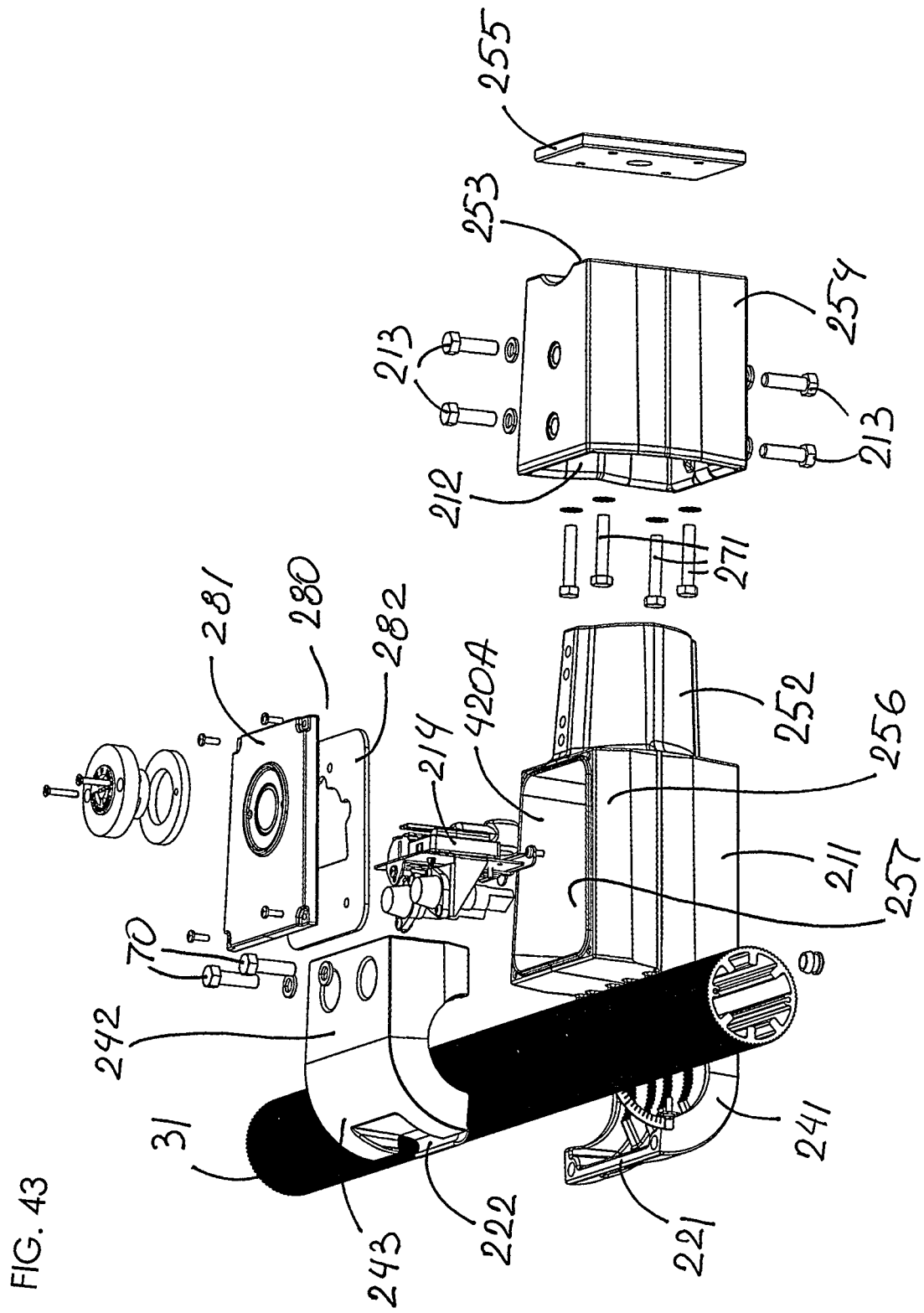
FIG. 43 is an exploded perspective view of the mounting assembly of FIG. 40 and including a mounting plate.
Figure 44:
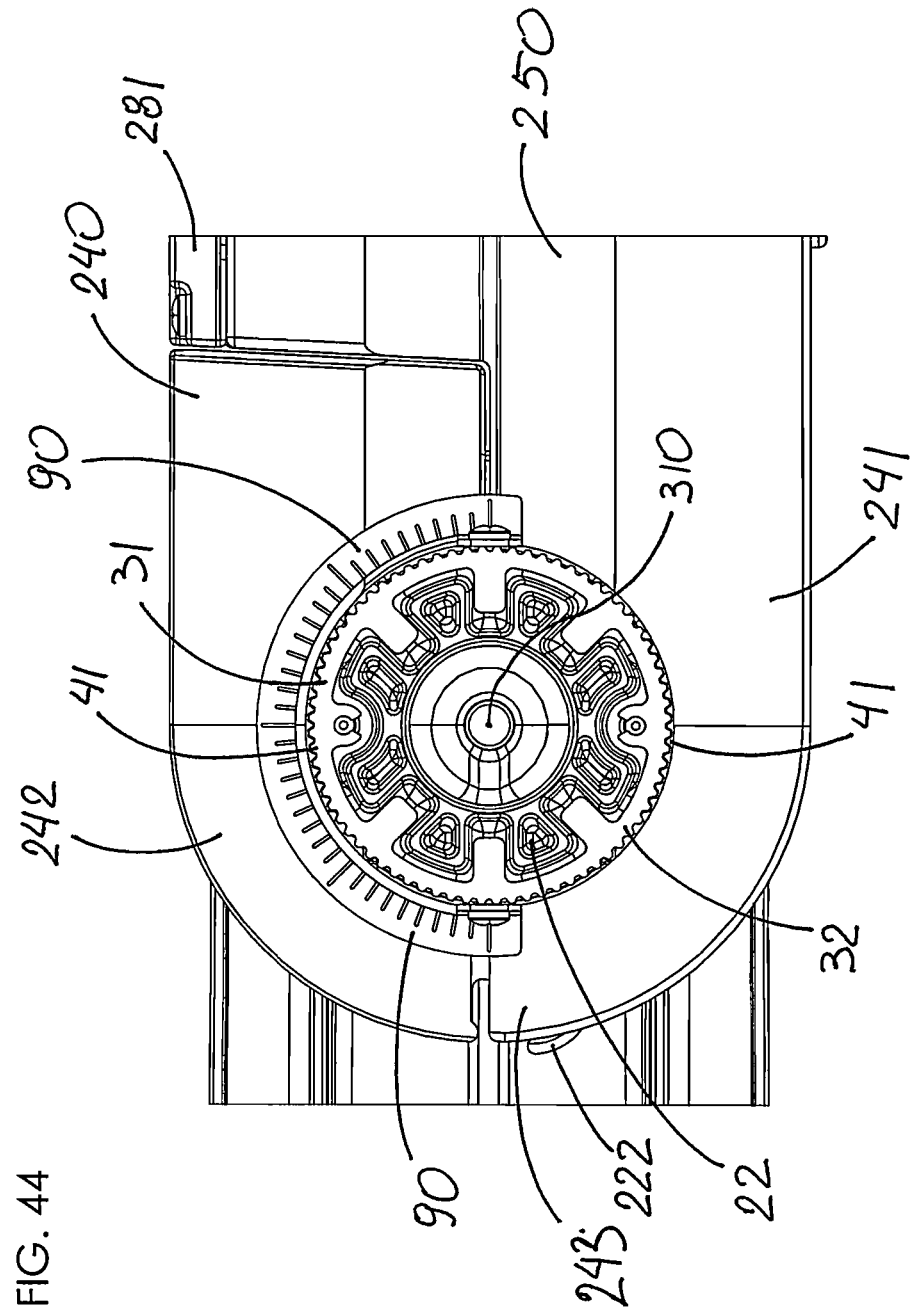
FIG. 44 is a fragmentary side view of the mounting assembly of FIG. 40 illustrating the securing member engagement with the bar and anti-rotational features therebetween.
Figure 45:
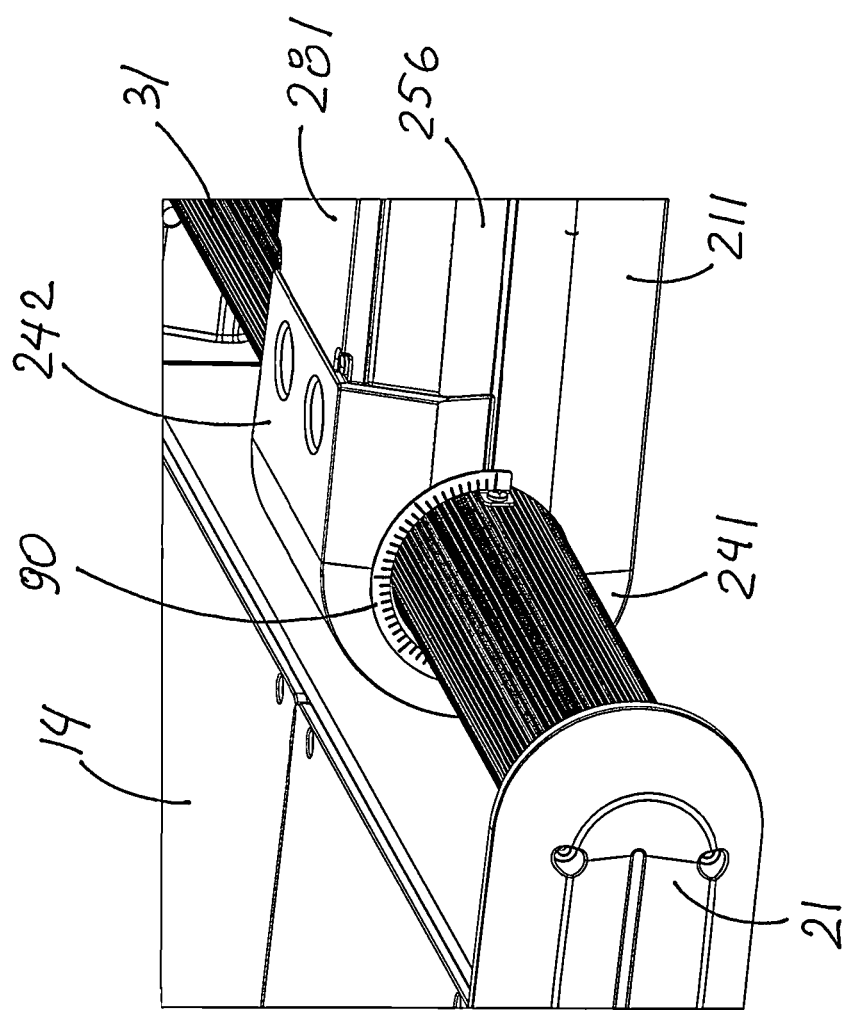
FIG. 45 is a fragmentary perspective view of the mounting assembly of FIG. 40 showing a bracket indicating angular orientation of the light fixture.

As further seen in FIGS. 42 and 43, arm portion 250 includes a fitter 254 at least partially enclosing sleeve 252, as shown in FIG. 39. Fitter 254 has distal end surface 253.

Figure 48:
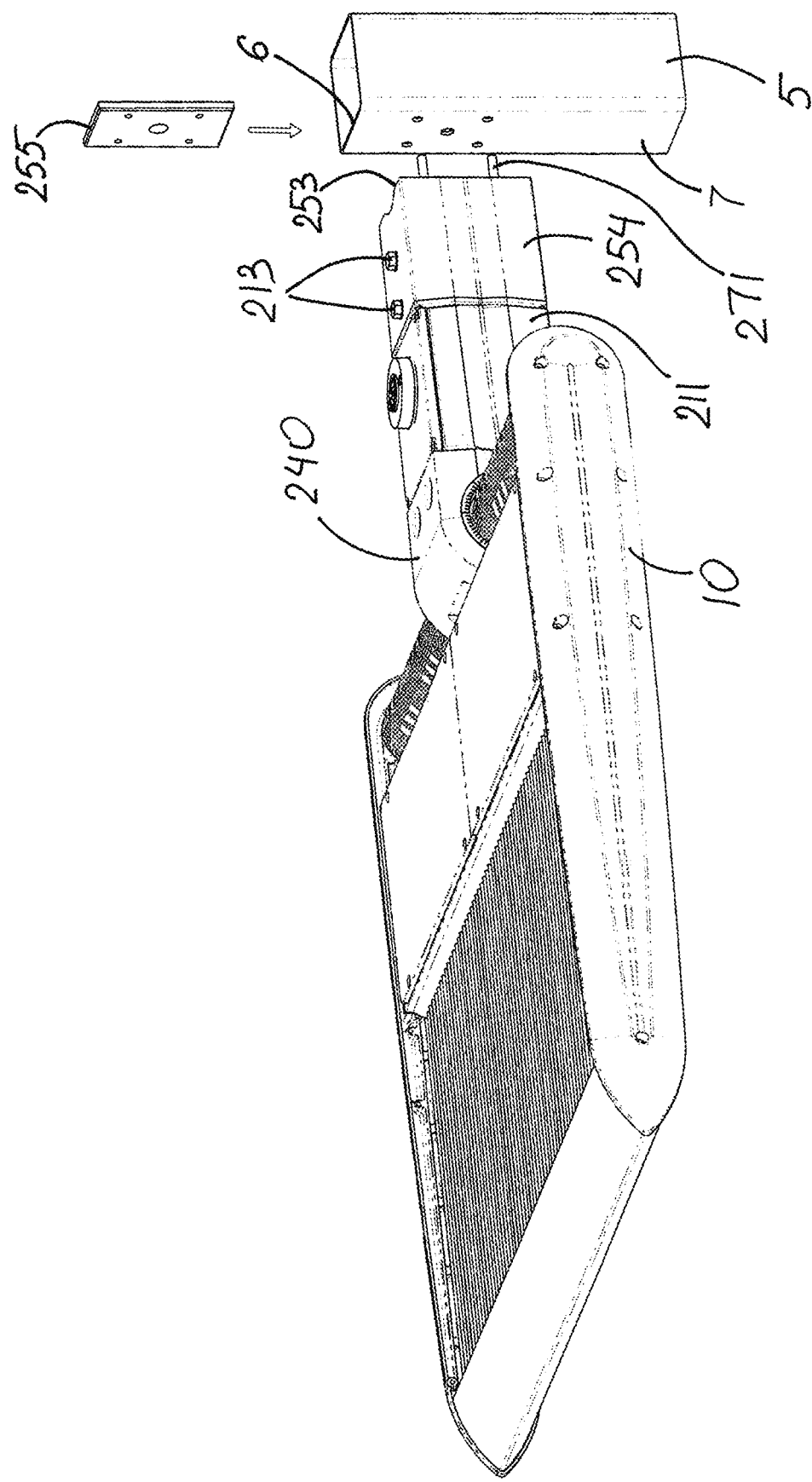
FIG. 48 is a perspective view of the LED light fixture as in FIGS. 33-36 showing an exploded view illustrating abutting attachment of the mounting assembly of FIG. 43 to a vertical rectangular pole.

It is seen in FIGS. 43 and 48 that, for abutting attachment to a substantially planar surface 5 of a static-structure wall 7, arm portion 250 has a mounting plate 255 positioned against an interior static-structure surface 6 opposite planar surface 5 such that static-structure wall 7 is sandwiched between the mounting plate 255 and distal end surface 253 of fitter 254. Mounting plate is secured to the fitter with fasteners 271 which extend from fitter 254 through static-structure wall 7 and into mounting plate 255, as best seen in FIG. 69.

FIGS. 40-43 show that bar-gripping portion 240 includes a first bar-gripper 241 and a second bar-gripper 242 facing one another with bar 31 therebetween. FIG. 43 best shows first bar-gripper 241 and sleeve 252 as parts of a single-piece structure 211. It is seen in FIGS. 42 and 43 that second bar-gripper 242 is removably attached to first bar-gripper 241. FIG. 43 also shows that fitter 254 is a separate piece forming a fitter cavity 212 which receives sleeve 252. FIGS. 38, 39, 68 and 69 show that fitter 254 is secured to sleeve 252 with fasteners 213 extending through fitter 254 into sleeve 252.

Figure 49:
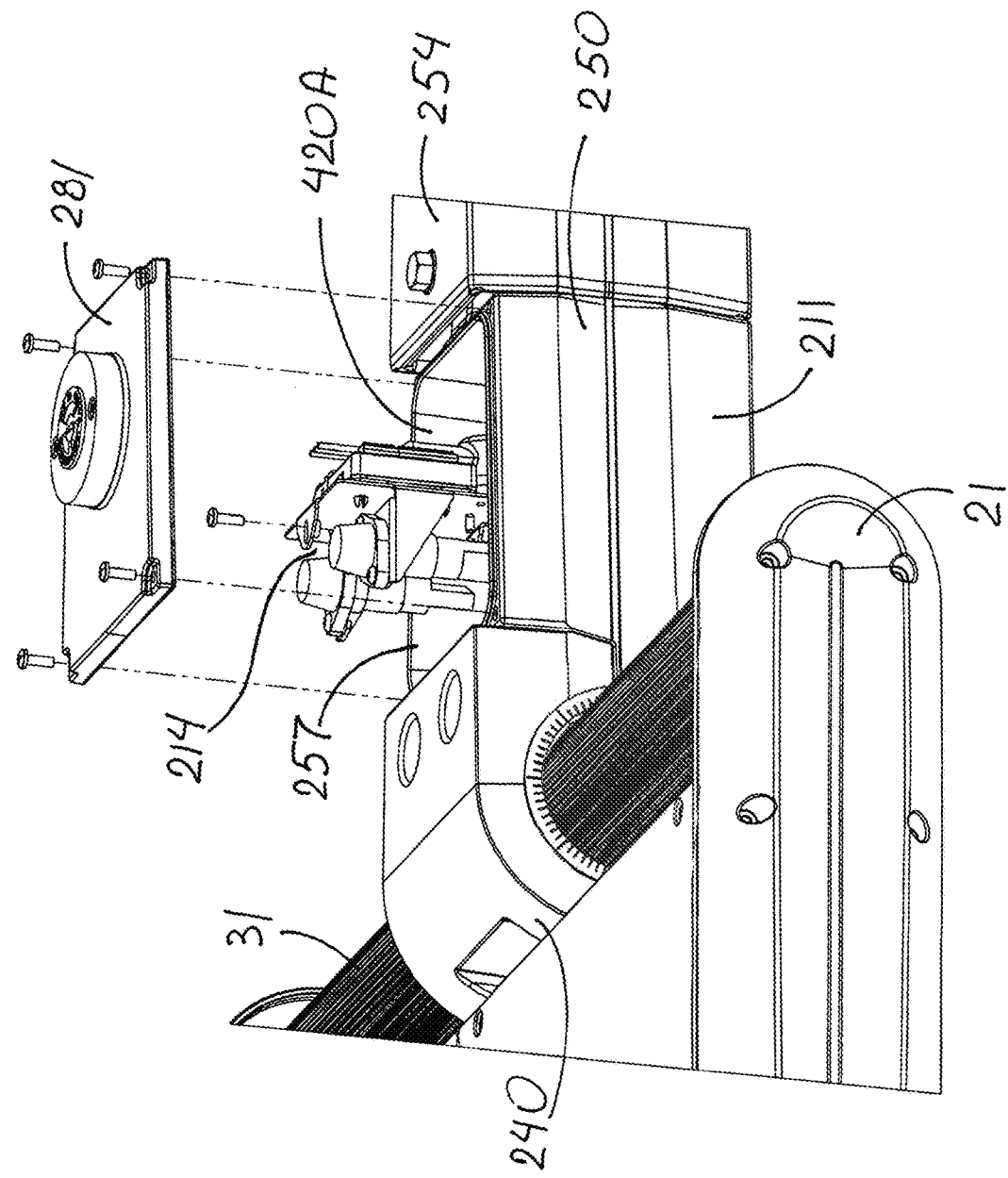
FIG. 49 is a fragmentary perspective view of the light fixture of FIG. 33 showing an exploded view of an arm-portion enclosure and a cover assembly thereover.
Figure 50:
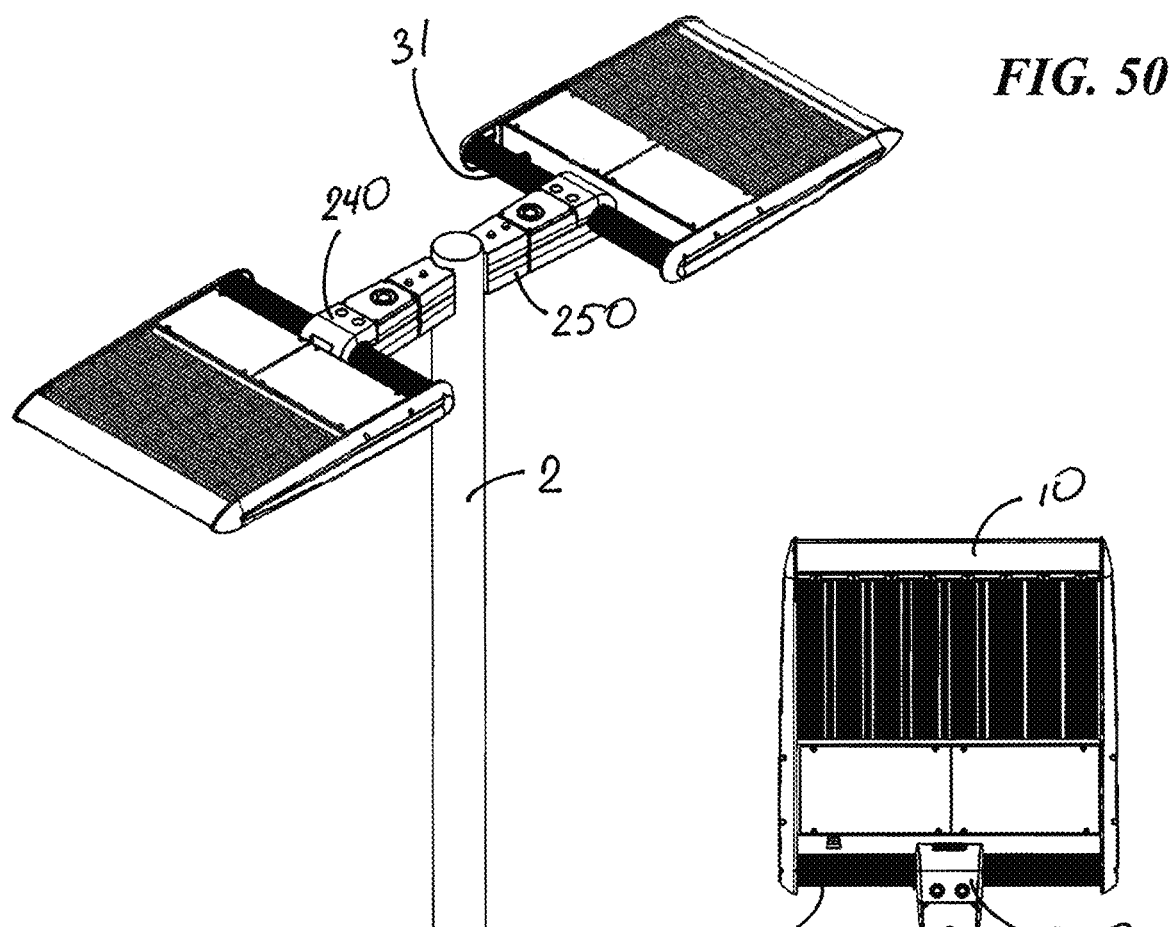
FIG. 50 is a perspective view of two light fixtures each with the mounting assembly as in FIG. 33 in abutting attachment to a vertical cylindrical pole with the fixtures being at 180° to each other.
Figure 51:
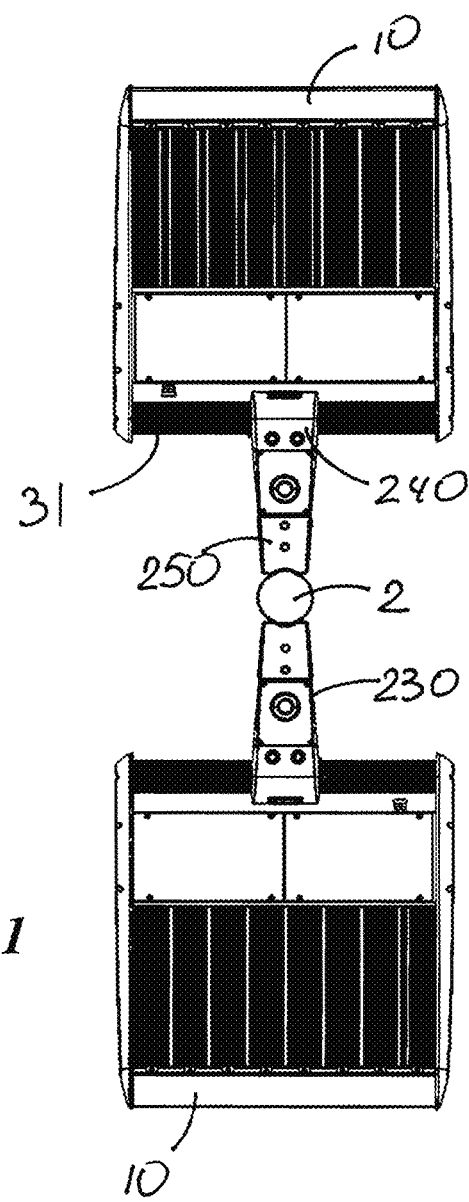
FIG. 51 is top plan view of the light fixtures of FIG. 50.
Figure 52:
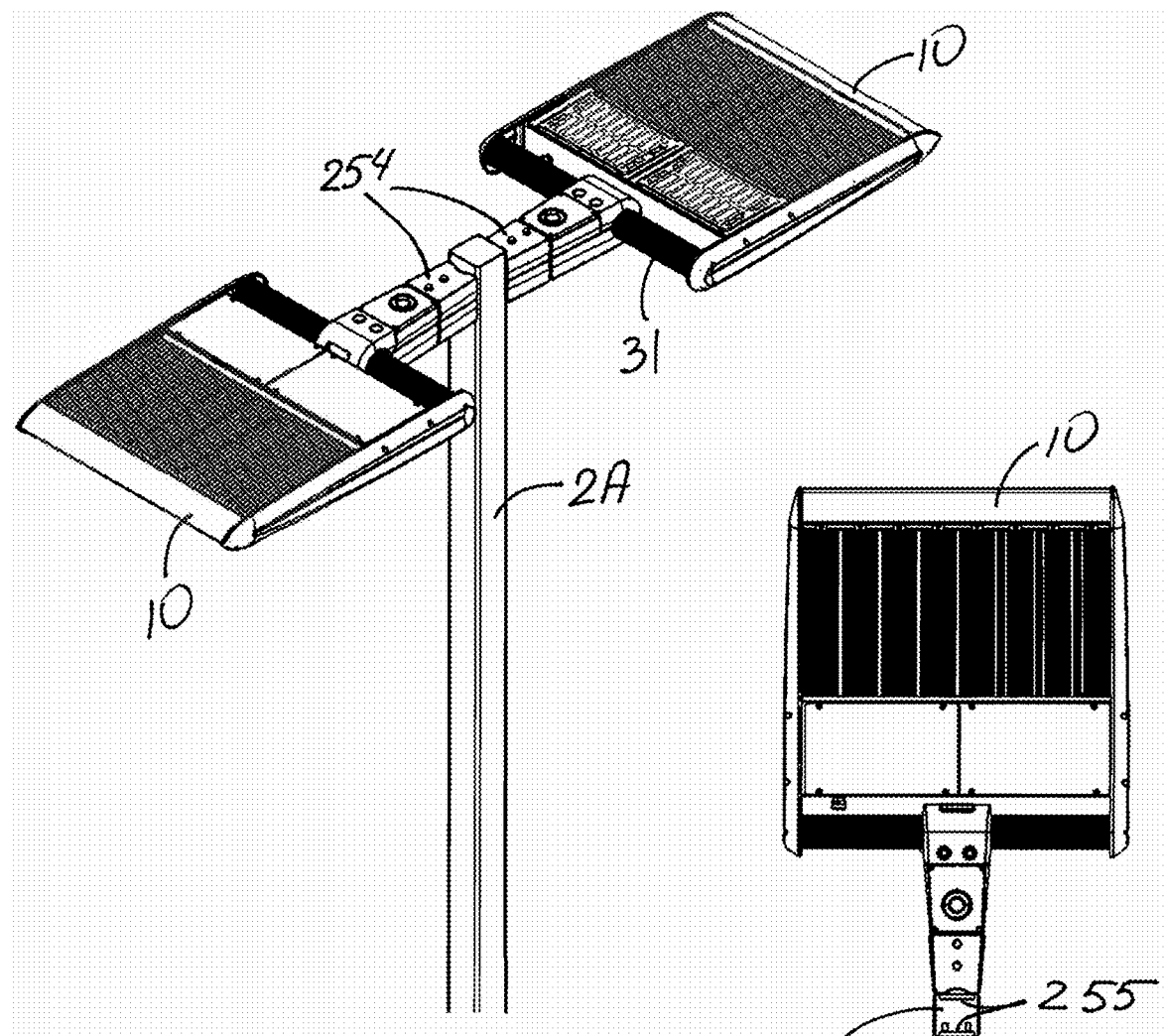
FIG. 52 is a perspective view of two light fixtures each with the mounting assembly as in FIG. 33 in abutting attachment to a vertical rectangular pole with the fixtures being at 180° to each other.
Figure 53:
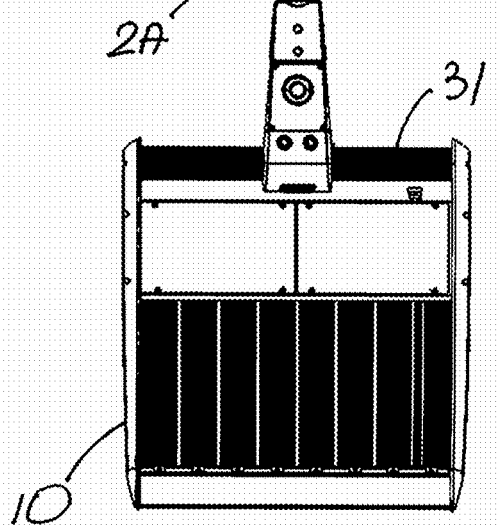
FIG. 53 is top plan view of the light fixtures of FIG. 52.
Figure 54:
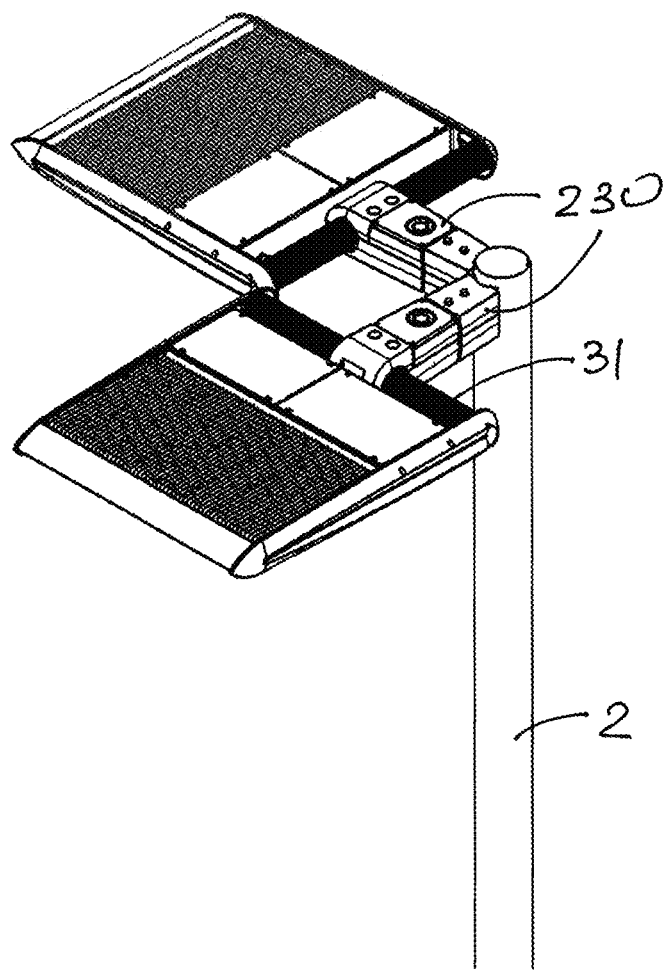
FIG. 54 is a perspective view of two light fixtures each with the mounting assembly as in FIG. 33 in abutting attachment to a vertical cylindrical pole with the fixtures being at 90° to each other.
Figure 55:
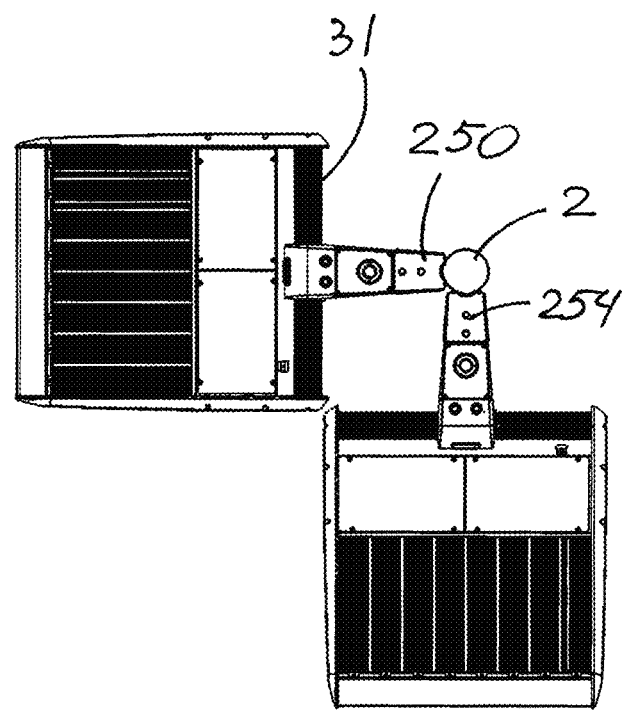
FIG. 55 is top plan view of the light fixtures of FIG. 54.
Figure 56:
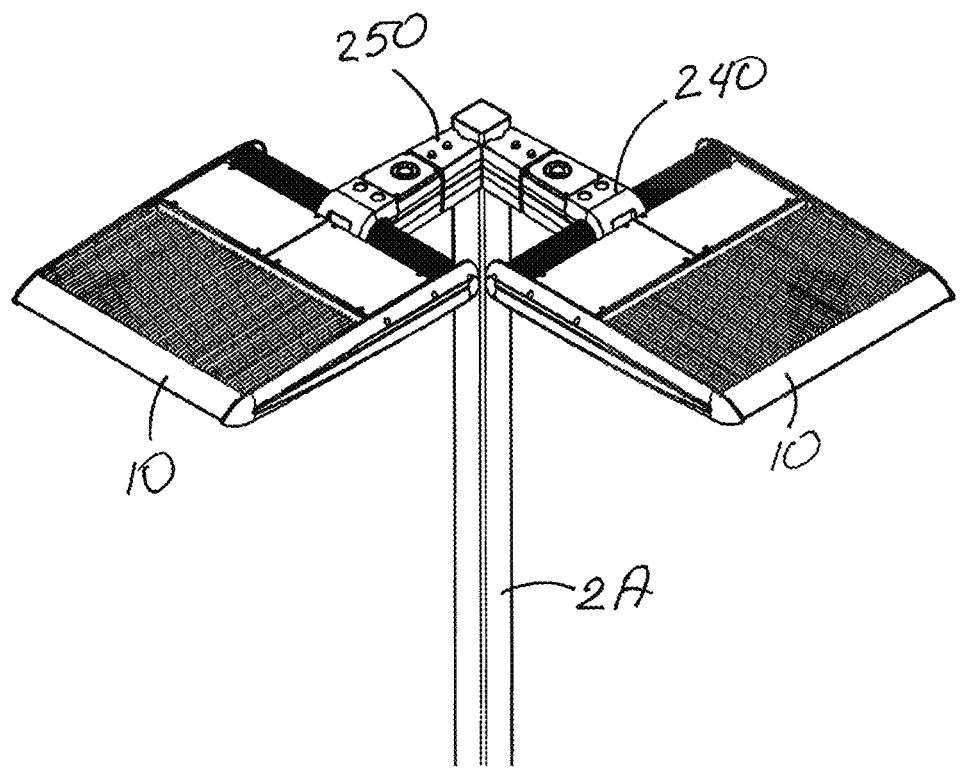
FIG. 56 is a perspective view of two light fixtures each with the mounting assembly as in FIG. 33 in abutting attachment to a vertical rectangular pole with the fixtures being at 90° to each other.
Figure 57:
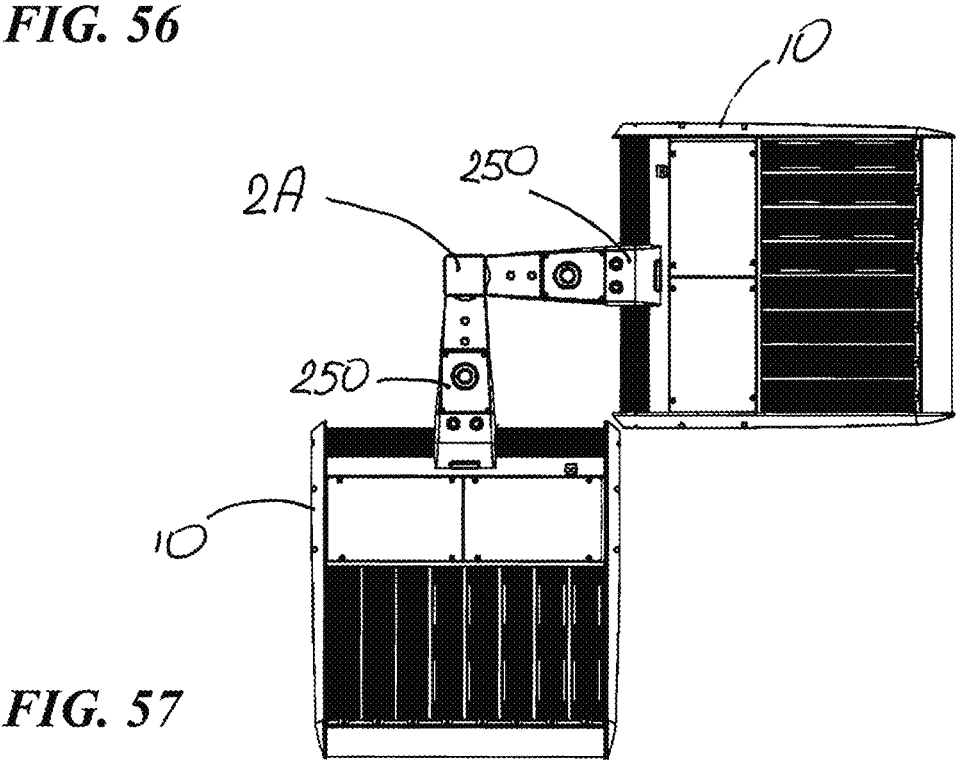
FIG. 57 is top plan view of the light fixtures of FIG. 56.
Figure 58:
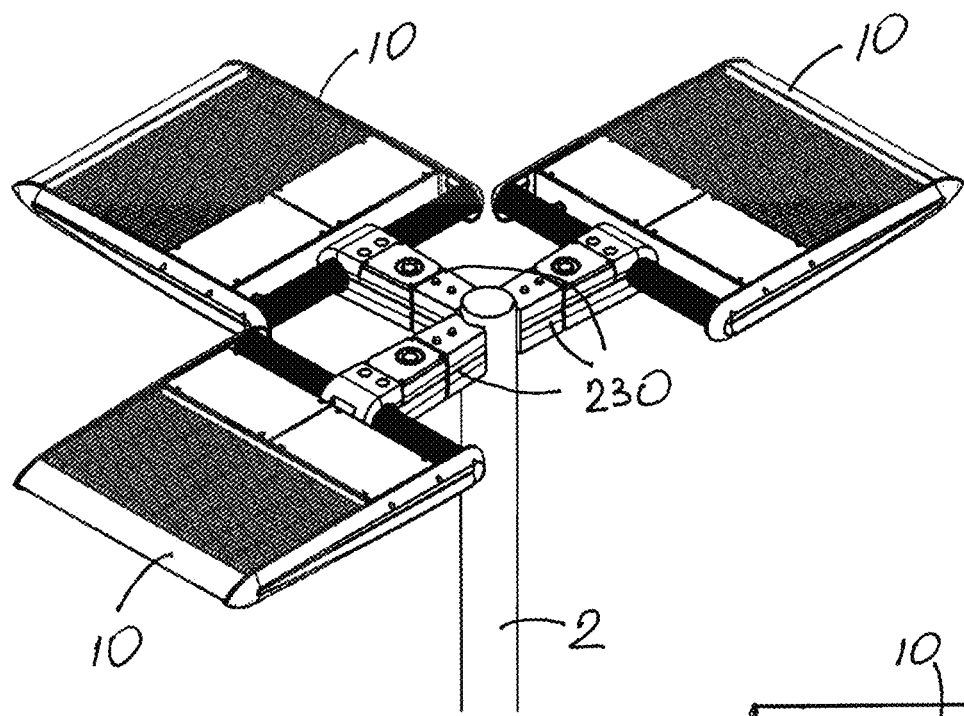
FIG. 58 is a perspective view of three light fixtures each with the mounting assembly as in FIG. 33 in abutting attachment to a vertical cylindrical pole.
Figure 59:
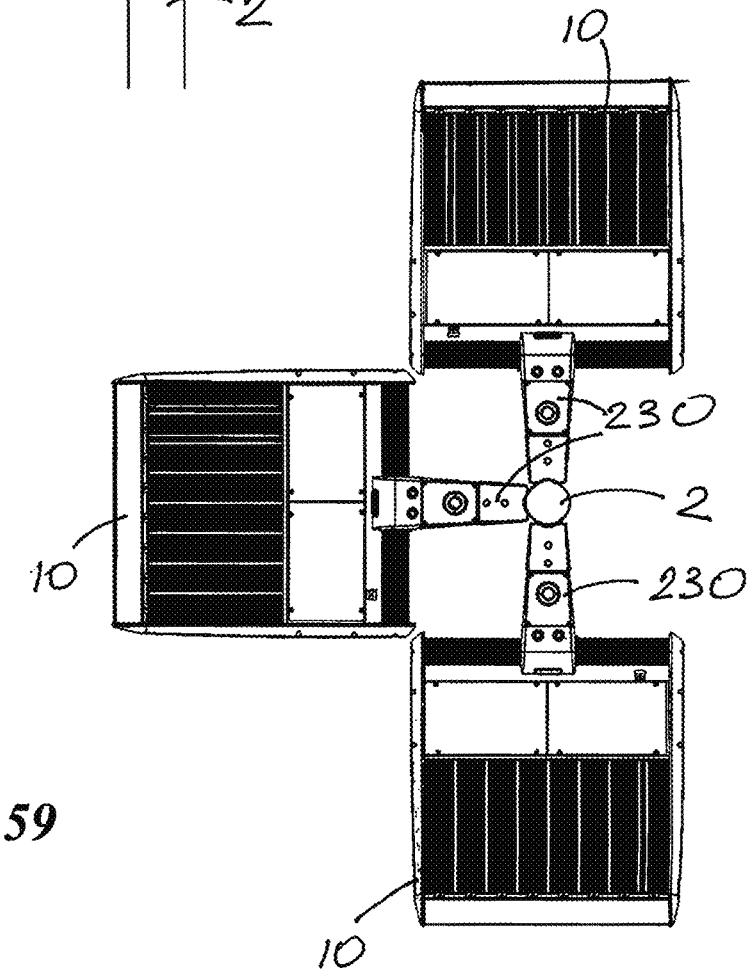
FIG. 59 is top plan view of the light fixtures of FIG. 58.
Figure 60:
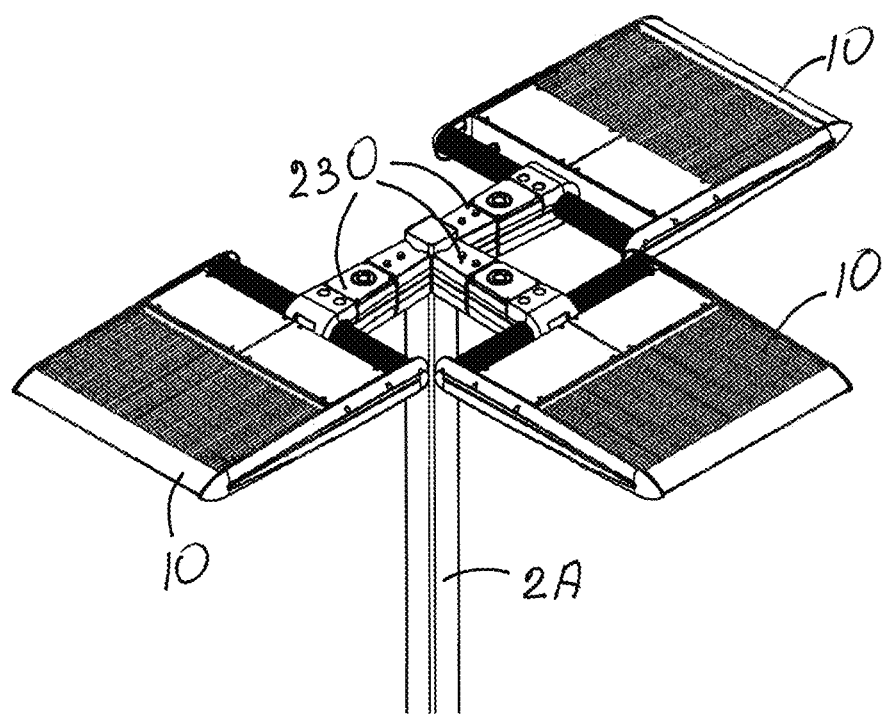
FIG. 60 is a perspective view of three light fixtures each with the mounting assembly as in FIG. 33 in abutting attachment to a vertical rectangular pole.
Figure 61:
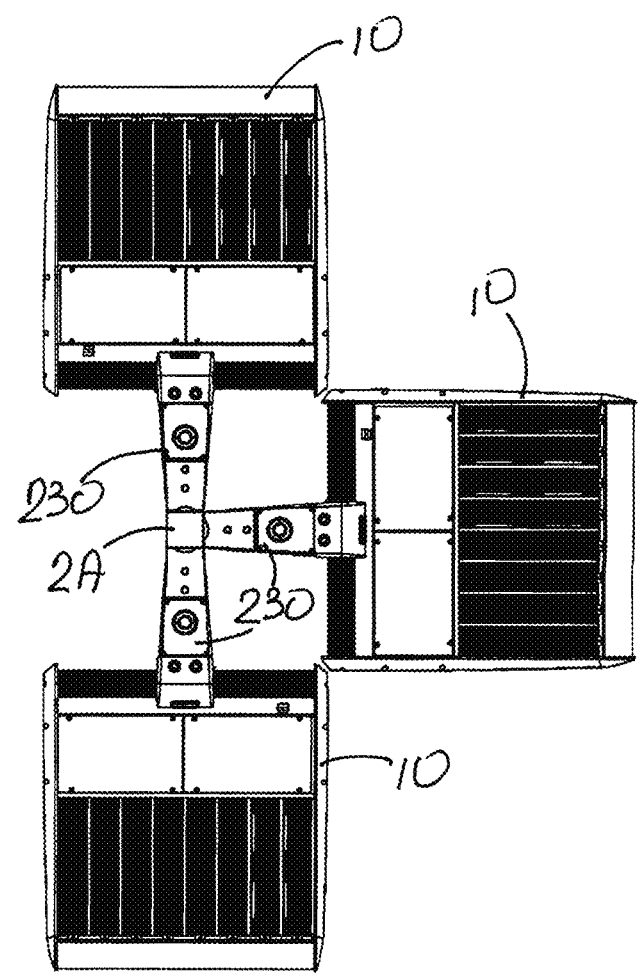
FIG. 61 is top plan view of the light fixtures of FIG. 60.
Figure 62:
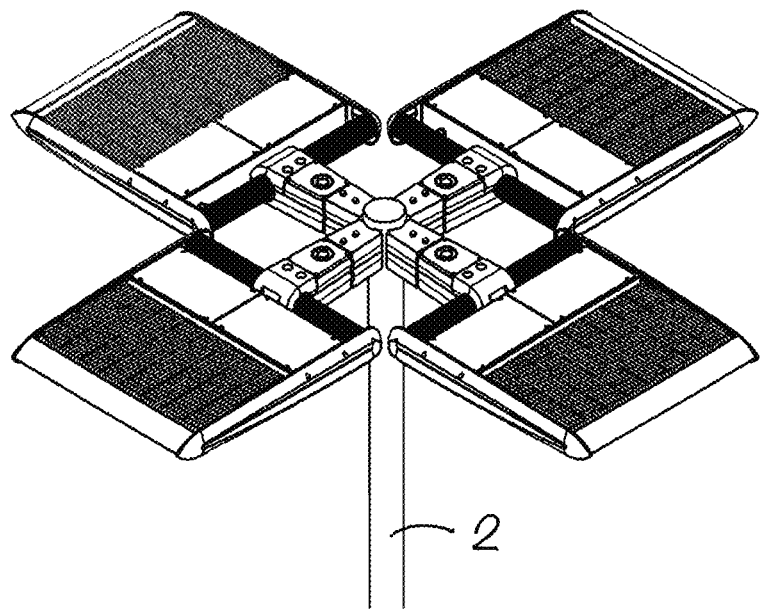
FIG. 62 is a perspective view of four light fixtures each with the mounting assembly as in FIG. 33 in abutting attachment to a vertical cylindrical pole.
Figure 63:
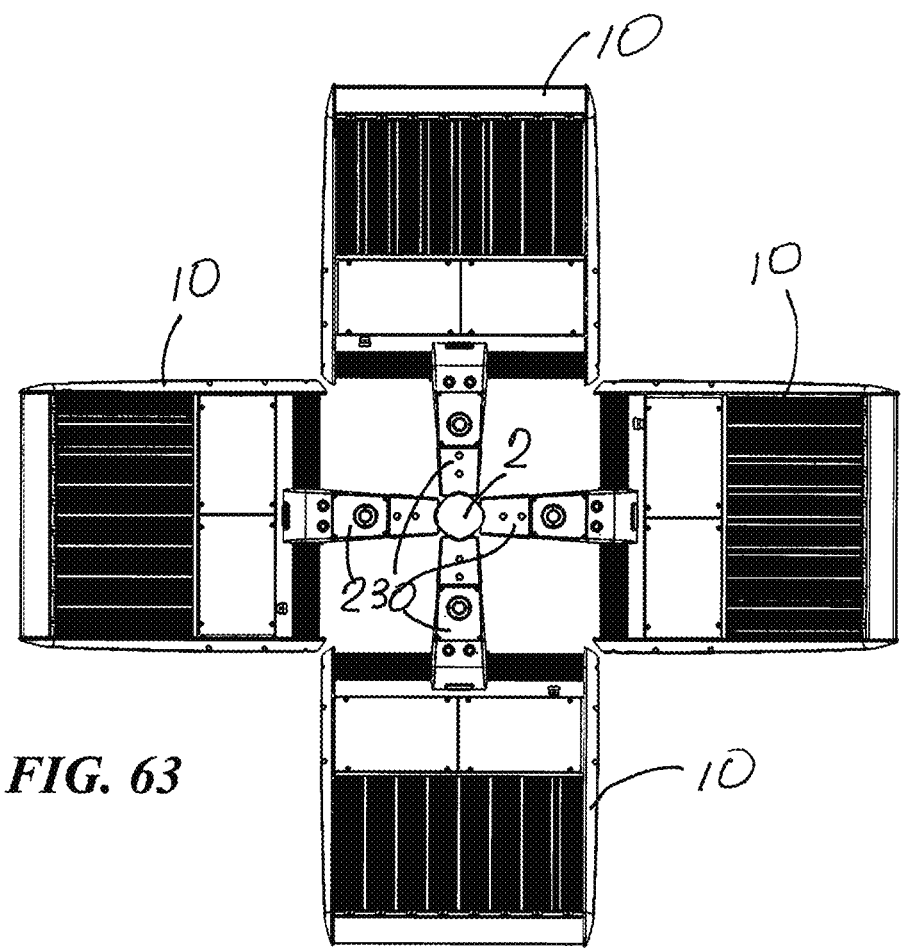
FIG. 63 is top plan view of the light fixtures of FIG. 62.
Figure 64:
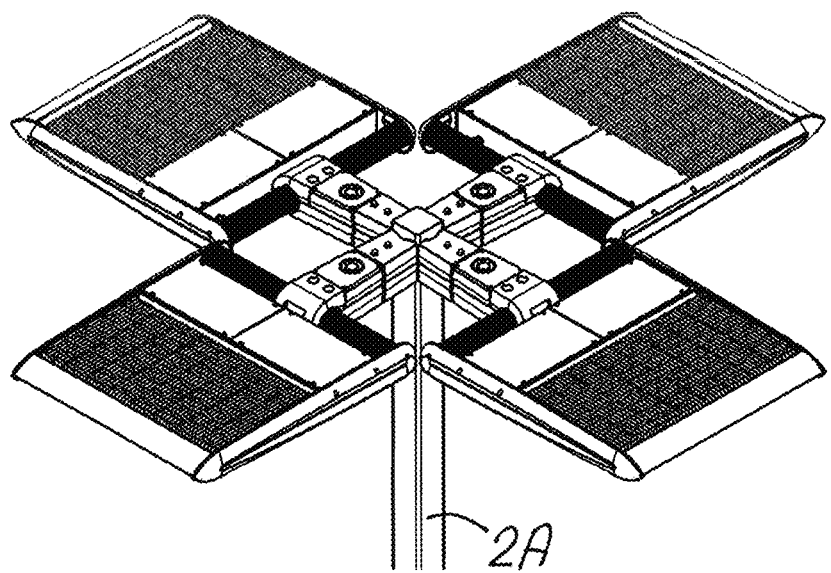
FIG. 64 is a perspective view of four light fixtures each with the mounting assembly as in FIG. 33 in abutting attachment to a vertical rectangular pole.
Figure 65:
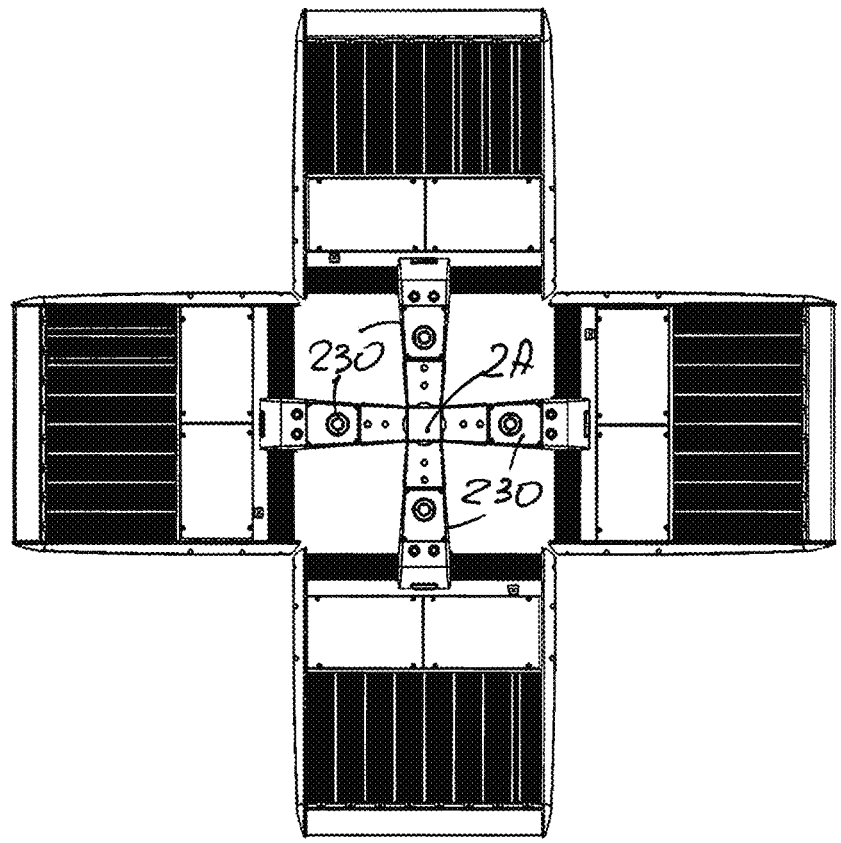
FIG. 65 is top plan view of the light fixtures of FIG. 64.
Figure 69:
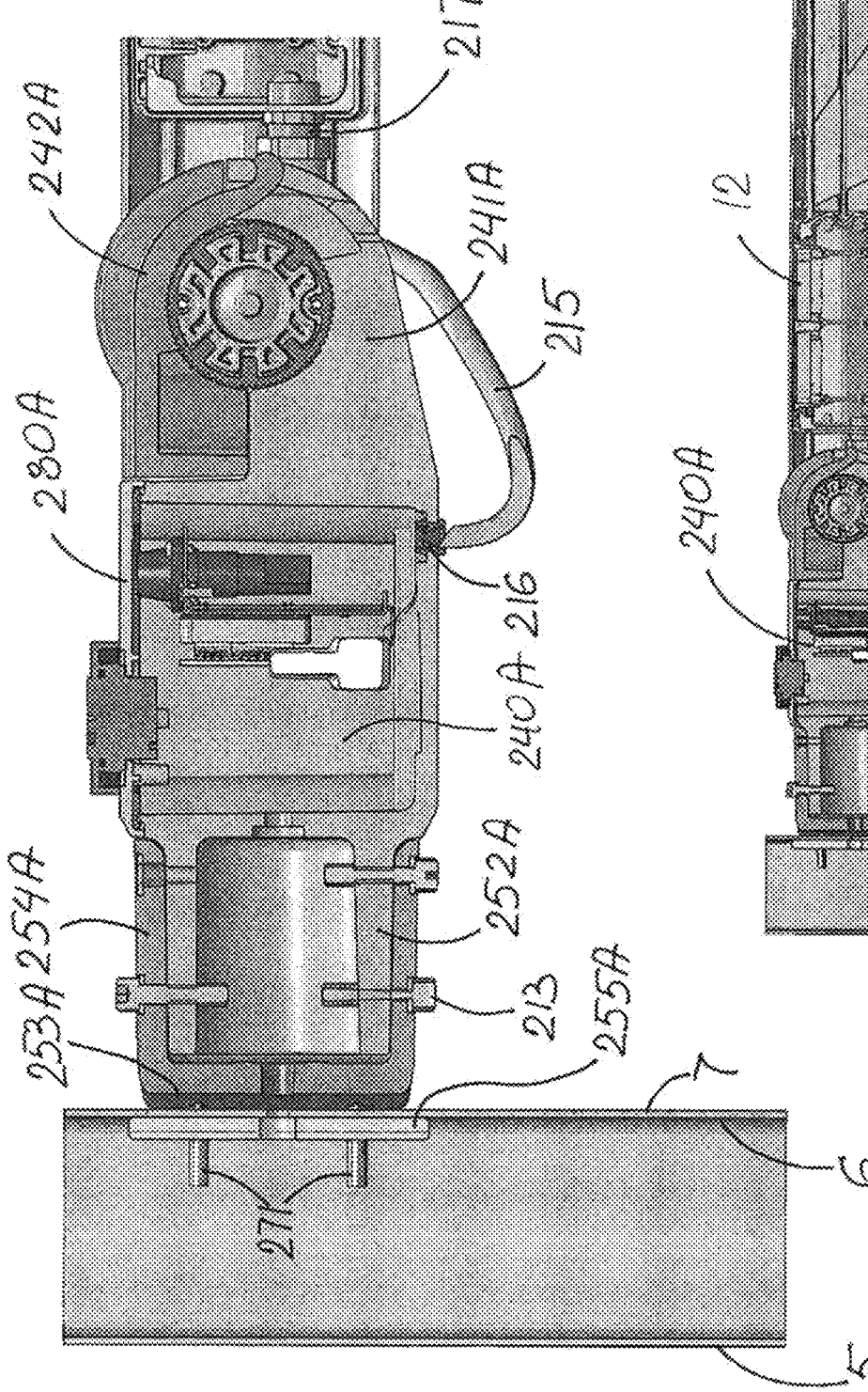
FIG. 69 is a fragment of FIG. 68 better showing the details of the mounting arrangement.
Figure 68:
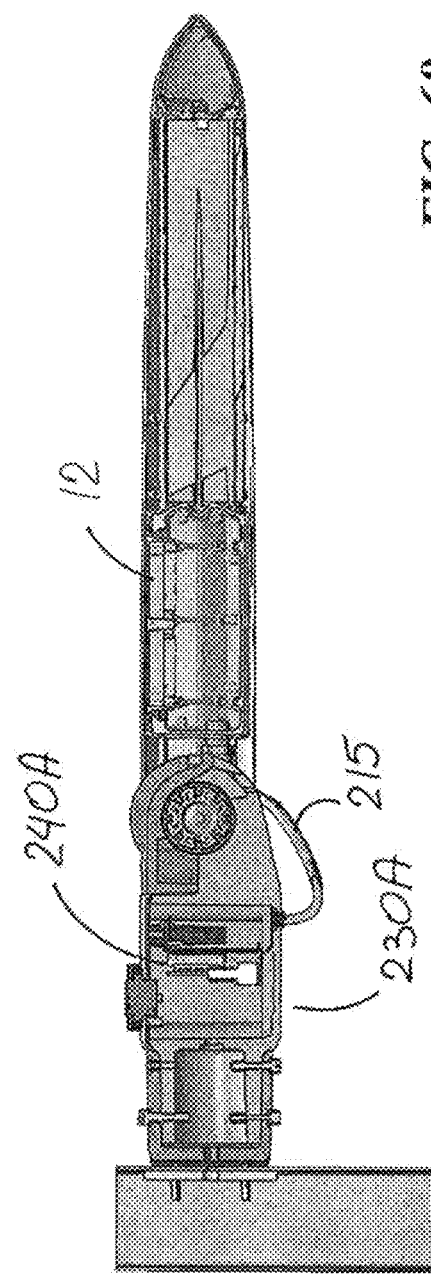
FIG. 68 is a side cross-section view of taken along lines 68-68 shown in FIG. 66.
Figure 71:
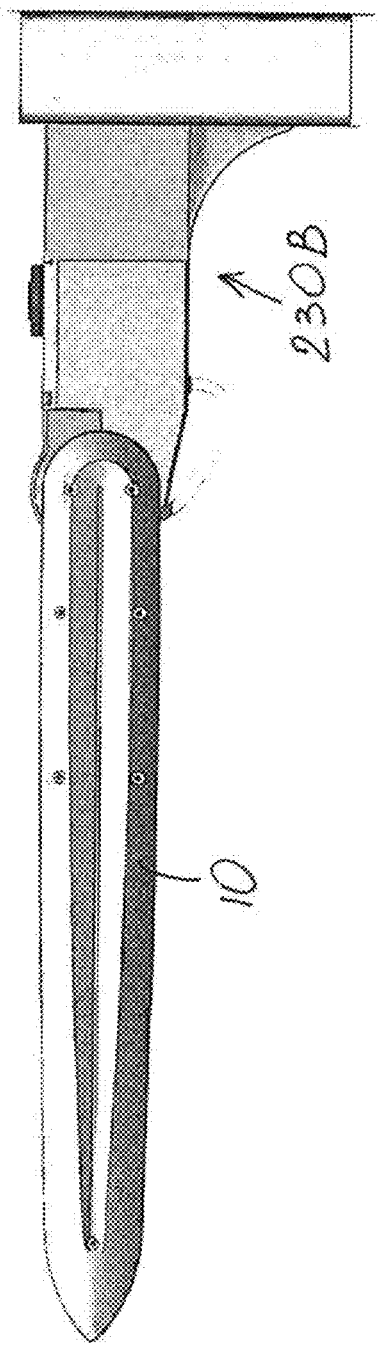
FIG. 71 is a side elevation of the fixture and the mounting arrangement of FIG. 70.
Figure 70:
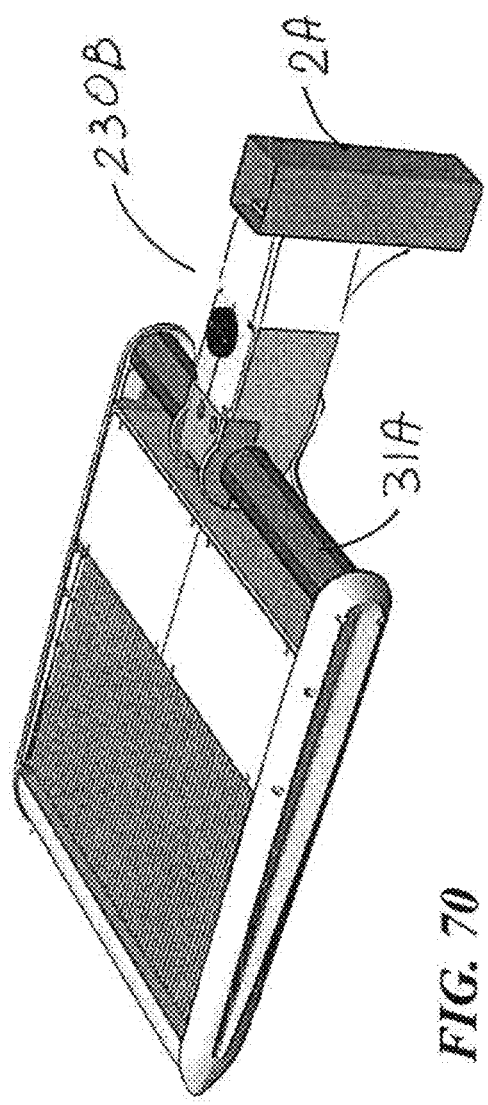
FIG. 70 is a perspective view of the light fixture with yet another version of the mounting assembly according to the present invention.

It is best seen in FIGS. 38, 39, 43, 49, 68 and 69 that arm portion 250 has an enclosure wall 256 defining an enclosure 420A for electrical elements 214 and wiring for electrical connection to light fixture 10. FIG. 49 best shows that enclosure 420A is accessible through an enclosure opening 257. It is best seen in FIGS. 39 and 43 best show that arm portion 250 has a cover assembly 280 sealing enclosure opening 257 with a cover plate 281 pressing a gasket 282 against enclosure wall 256. It is best seen FIGS. 34-36, 39 and 69 that enclosure wall 256 defines an aperture receiving a wireway mount-connector 216. FIGS. 68 and 69 best show a wireway 215 connected to mounting arrangement 230 with mount-connector 216 and to fixture 10 with includes wireway fixture-connector 217 which extends from driver housing 12.

FIGS. 38, 39, 43, 68 and 69 show that enclosure wall 256 is part of single-piece structure 211 with sleeve 252 extending from enclosure wall 256 along arm axis 251 in the direction away from first bar-gripper 241.

FIGS. 38, 39, 41-43, 68 and 69 show bar-gripping portion having a retaining feature 220 holding second bar-gripper 242 with respect to the rest of securing member 210 when second bar-gripper 242 is moved from facing first bar-gripper 241. FIGS. 38, 39, 41-43, 68 and 69 also best illustrate that bar-gripping portion 240 has a front region 243 which is opposite arm portion 250 and forms retaining feature 220. Retaining feature 220 includes a cross member 221 and a hook 222 hingedly engaging cross member 221. FIG. 43 shows cross member 221 formed by first bar-gripper 241 and hook 222 formed by second bar-gripper 242. As seen in FIG. 42, retaining feature 220 permits forward rotation of second bar-gripper 242 about front region 243 of second bar-gripper 242 for engagement or disengagement of securing member 210 with/from bar 31 to allow adjustment of light fixture orientation.

Figure 40:
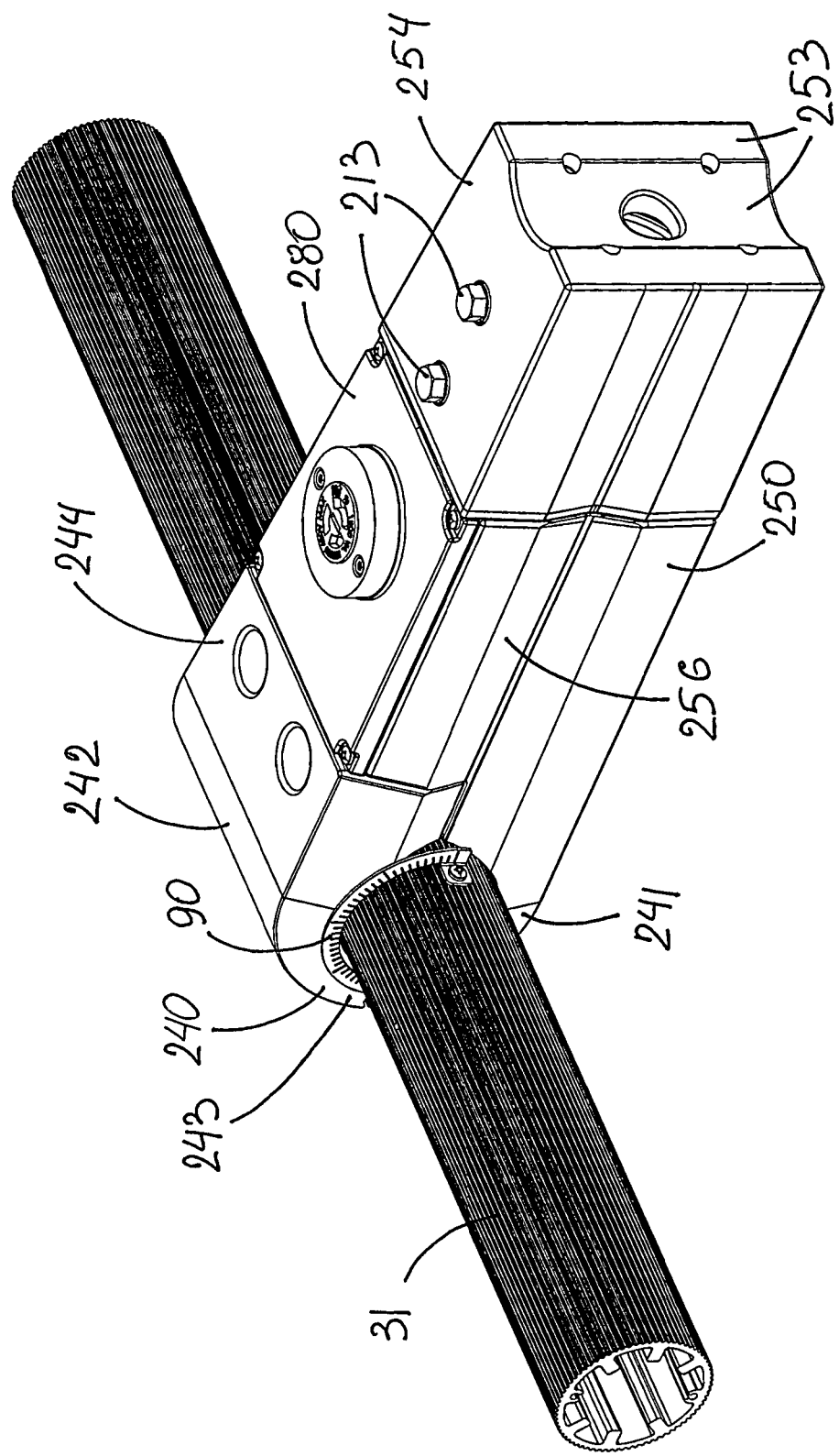
FIG. 40 is a top perspective view of the mounting assembly seen in FIGS. 33-39.
Figure 41:
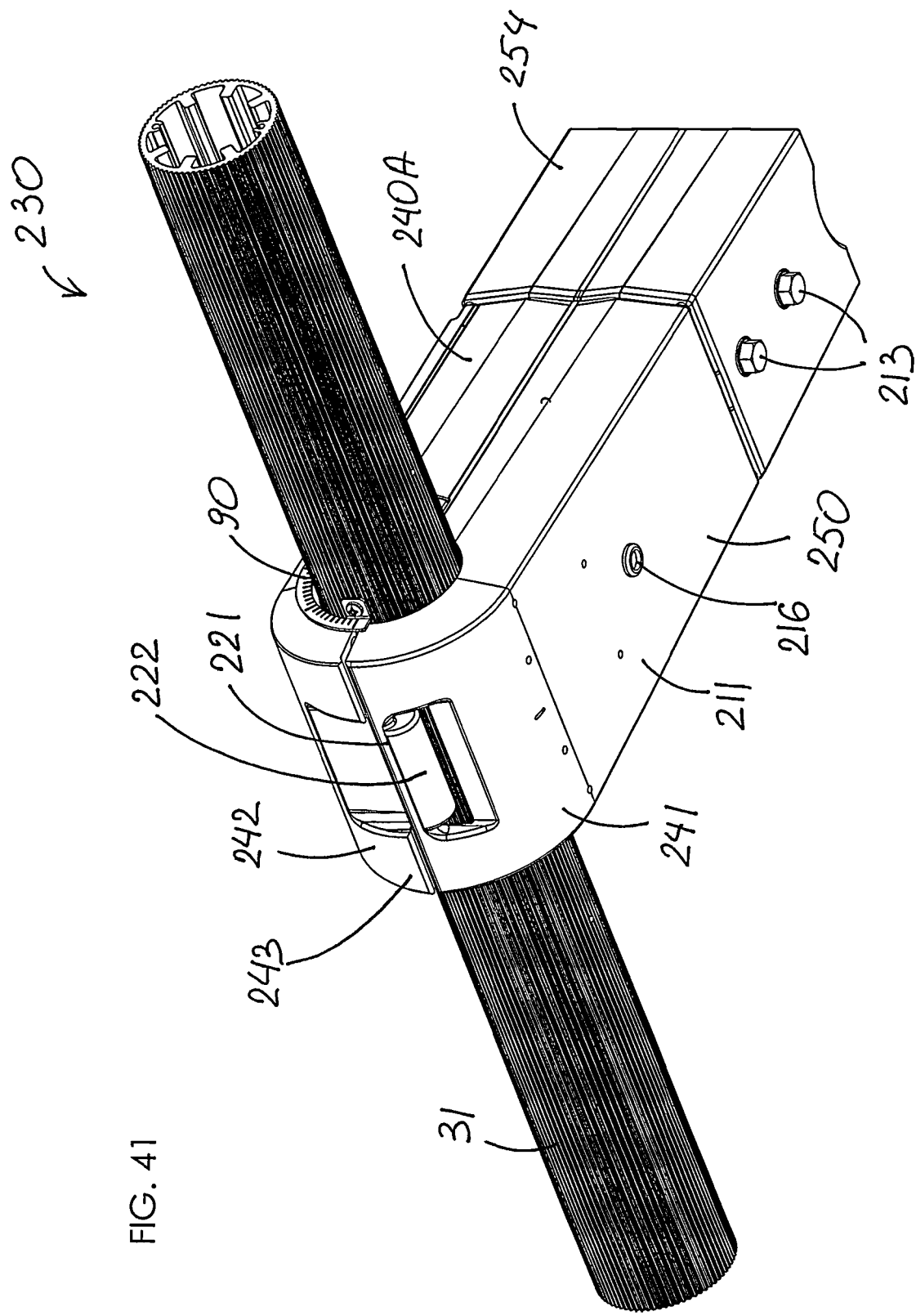
FIG. 41 is a bottom perspective view of the mounting assembly of FIG. 40.

FIGS. 40, 42 and 43 show that bar-gripping portion 240 has an arm-adjacent region 244 which defines mounting cavities 245 in second bar-gripper 242. Mounting cavities 245 are configured for accepting fasteners 70 which extend through first bar-gripper 241, thereby securing bar-grippers 241 and 242 together.

FIGS. 38, 39, 44, 68 and 69 show that gripping region 32 of bar 31 is engaged by bar-grippers 241 and 242 and that gripping region 32 and bar-grippers 241 and 242 have anti-rotational features complementary to one another. These Figures also best show that bar 31 is substantially cylindrical and that bar-grippers 241 and 242 have semi-cylindrical bar-engaging surfaces together encircling and engaging bar 31. Anti-rotational features include parallel inter-engaged flutes and grooves along gripping region 32 of bar 31 and bar-gripping portion 250.

FIGS. 50-65 illustrate that the elongate configuration of arm portion 250 positions light fixture 10 at sufficient distance from pole 2 or 2A to provide sufficient clearance between adjacent fixtures even of large widths in an array mounted on the pole. Such elongation is provided by enclosure 420A and sleeve 252 with or without fitter 254 all extending along common axis 251 of arm portion 520 which is substantially orthogonal to axis 310 of bar 31.

Figure 72:
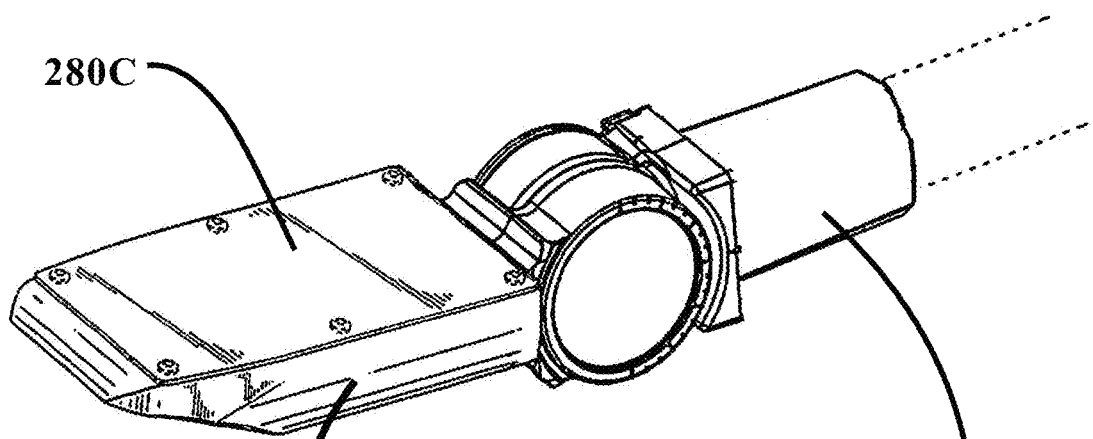
FIG. 72 is a perspective view from above of still another alternative embodiment of the mounting assembly according to the present invention.
Figure 73:
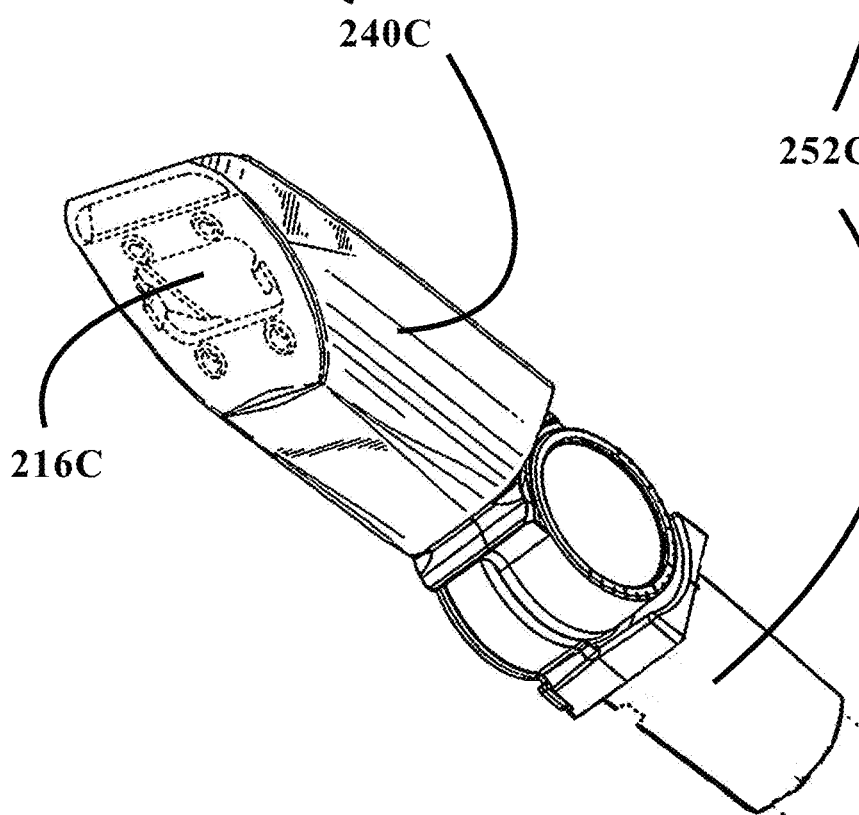
FIG. 73 is a perspective view from below of the mounting assembly of FIG. 72.

FIGS. 72 and 73 illustrate still another alternative embodiment of the mounting assembly according to the present invention. Such embodiment has a sleeve 252C and another version of a fixture-holding portion configured for direct attachment to a light fixture. Sleeve 252C is configured for receiving a smaller-diameter tenon therewithin. The fixture-holding portion forms an enclosure 240C with a mount-connecting opening 216C and a cover assembly 280C. The embodiment of mounting arrangement shown in FIGS. 72 and 73 also includes an adjustment portion between sleeve 252C and the fixture-holding portion for light-fixture adjustment to a selected one of a plurality of possible orientations.

Figure 74:
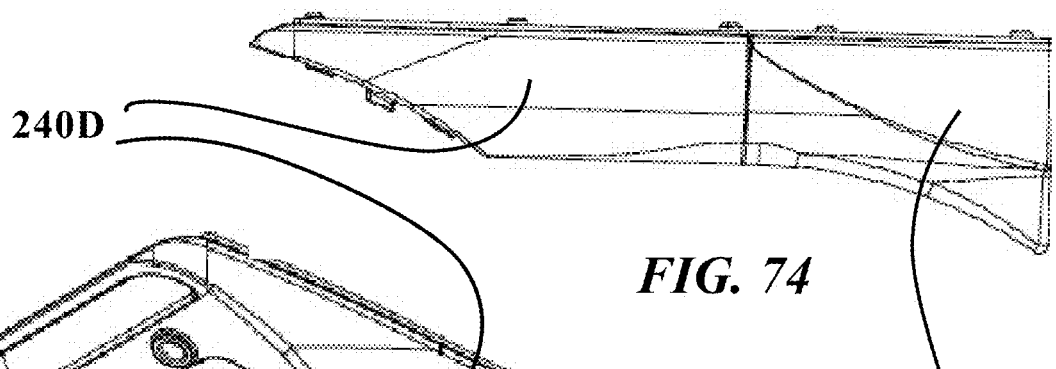
FIG. 74 is a side elevation of another embodiment of the mounting assembly according to the present invention.
Figure 75:
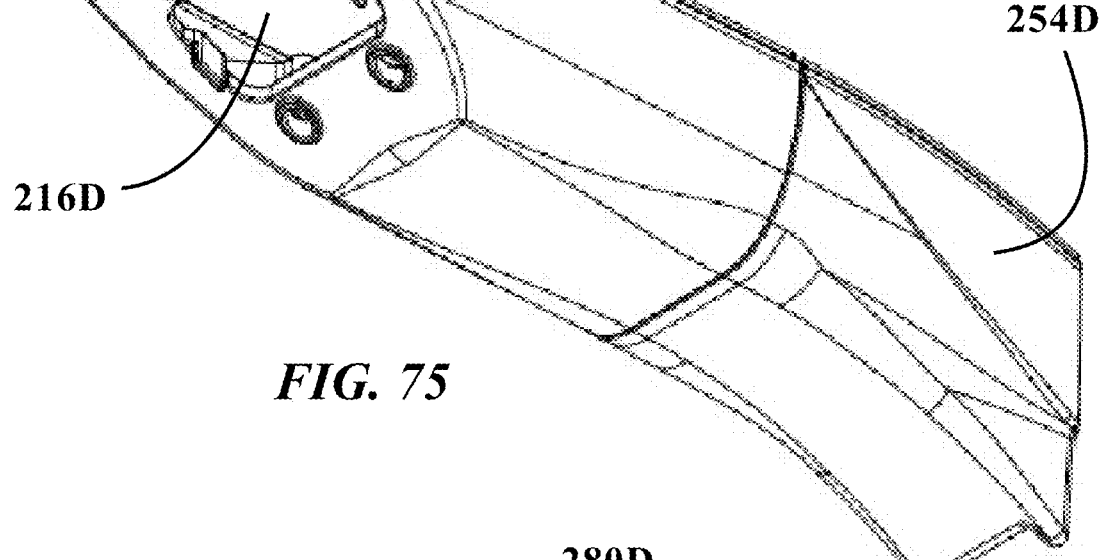
FIG. 75 is a perspective view from below of the mounting assembly of FIG. 74.
Figure 76:
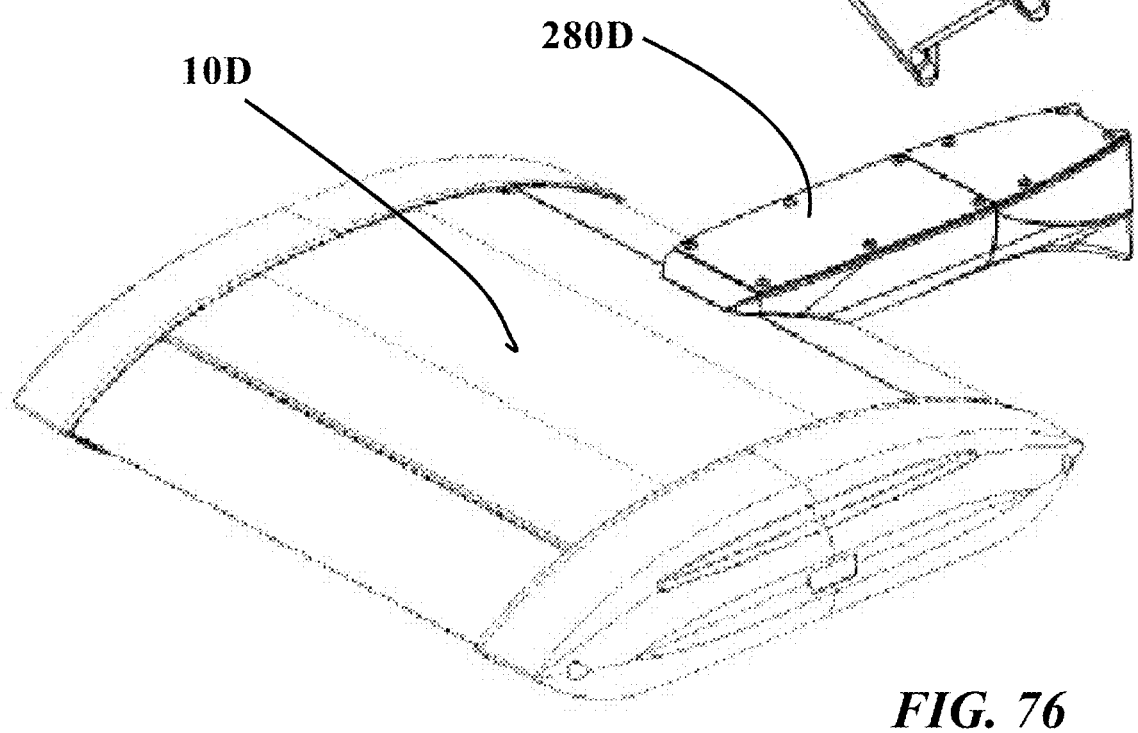
FIG. 76 is a perspective view from above of the mounting assembly of FIG. 74 shown attached to a light fixture.

FIGS. 74-76 illustrate yet another embodiment of the mounting assembly according to the present invention. As in the embodiments of FIGS. 72 and 73 just described, the embodiment of FIGS. 74-76 has a fixture-holding portion configured for direct attachment to a light fixture 10D and forming an enclosure 240D with a mount-connecting opening 216D and a cover assembly 280D. In the embodiment of FIGS. 74-76 a sleeve-enclosing fitter 254D extends directly from the fixture-holding portion for abutting attachment to a static structure. Such embodiment is an example of the inventive mounting assembly which does not allow adjustment of the orientation of light fixture 10D.

While the principles of the invention have been shown and described in connection with specific embodiments, it is to be understood that such embodiments are by way of example and are not limiting.

The invention claimed is:

1. A light-fixture mounting assembly comprising:
a bar having opposite bar ends and extending therebetween, each of the opposite bar ends being secured to respective bar supports extending from with a main body portion of a light fixture, the bar comprising exterior anti-rotational surface features including parallel flutes and grooves along a gripping region between the opposite bar ends, the bar spaced from the main body portion of the light fixture; and
a bar-gripping portion including first and second bar-grippers removably attached to one another and fully encircling and interlocking with the gripping region of the bar between the first and second bar-grippers, each of the bar-grippers having a bar-engaging surface with anti-rotational features including parallel flutes and grooves inter-engaged with and complementary to the exterior anti-rotational surface features along the gripping region of the bar; and an arm portion extending from the bar-gripping portion and comprising a sleeve and a fitter at least partially enclosing the sleeve, the fitter having a distal end surface configured for abutting attachment to a substantially planar surface of a static-structure wall.

2. The mounting assembly of claim 1 wherein the sleeve is substantially cylindrical.

3. The mounting assembly of claim 1 wherein the arm portion has a mounting plate configured to be positioned against another surface of the static-structure wall, such surface being opposite the planar surface such that the static-structure wall is sandwiched between the mounting plate and the distal end surface.

4. The mounting assembly of claim 3 wherein the first bar-gripper holds the second bar-gripper when the second bar-gripper is moved from facing the first bar-gripper.

5. The mounting assembly of claim 4 wherein the bar-gripping portion has a front region forming a retaining feature which comprises a cross member and a hook hingedly engaging the cross member, each of which is formed by one of the first and second bar-grippers, the retaining feature permitting forward rotation of the second bar-gripper about the front region of the bar-gripping portion for engagement/disengagement of the securing member with/from the bar.

6. The mounting assembly of claim 5 wherein the bar-gripping portion has an arm-adjacent region defining mounting cavities in one of the first and second bar-grippers, the mounting cavities accepting fasteners which extend through the other of the first and second bar-grippers, thereby securing the bar-grippers together.

7. The mounting assembly of claim 3 wherein the bar-gripping portion holds the bar such that the light fixture is positionable to a selected one of a plurality of possible orientations.

8. The mounting assembly of claim 7 wherein:
the bar is substantially cylindrical; and
each of the bar-grippers has a semi-cylindrical bar-engaging surface, the semi-cylindrical bar-grippers surfaces together encircling and engaging the bar.

9. The mounting assembly of claim 1 wherein the distal end surface of the fitter has a flat surface portion for abutting attachment to the substantially planar surface of the static-structure wall.

10. The mounting assembly of claim 1 wherein the distal end surface of the fitter has a concave portion bordered by a pair of flat portions.

11. The mounting assembly of claim 1 being configured for adjustment of the light fixture to a selected one of a plurality of possible orientations.

12. A light-fixture mounting assembly comprising:
a bar secured with respect to a main body portion of a light fixture, the bar having opposite bar ends and extending therebetween, each of the opposite bar ends being supported between spaced supports extending from the main body portion of the light fixture, the bar comprising a gripping region between the opposite bar ends of the bar, the bar spaced from the main body portion, an exterior surface of the gripping region comprising exterior anti-rotational surface features; and a securing member comprising a bar-gripping portion and an arm portion extending from the bar-gripping portion, the bar-gripping portion including first and second bar-grippers facing one another with the bar therebetween, each of the grippers comprising a semi-cylindrical bar-engaging surface with anti-rotational features including parallel flutes and grooves inter-engaged with and complementary to the exterior anti-rotational surface features along the gripping region of the bar, the second bar-gripper being removably attached to the first bar-gripper together fully encircling and interlocking with the gripping region of the bar, the arm portion comprising a sleeve and a fitter at least partially enclosing the sleeve, the fitter being a separate piece forming a fitter cavity receiving the sleeve and being secured thereto with fasteners extending through the fitter into the sleeve, the fitter having a distal end surface configured for abutting attachment to an exterior surface of a wall of a static structure.

13. The mounting assembly of claim 12 wherein the distal end surface has a concave portion for abutting attachment to the exterior surface which is substantially cylindrical.

14. The mounting assembly of claim 13 wherein the distal end surface also has flat portions bordering the concave portion for abutting attachment to a substantially planar exterior static-structure surface.

15. The mounting assembly of claim 12 wherein the distal end surface of the fitter has a flat surface portion for abutting attachment to the exterior surface which is substantially planar.

16. The mounting assembly of claim 12 wherein the arm portion has an enclosure wall defining an enclosure for electrical elements and wiring, the enclosure being accessible through an enclosure opening closed by a cover assembly.

17. The mounting assembly of claim 12 wherein the bar-gripping portion adjustably holds the bar such that the light fixture is positionable to a selected one of a plurality of possible orientations.

18. The mounting assembly of claim 12 wherein the arm portion has a mounting plate configured to be positioned against a surface of the static structure which is opposite the exterior surface such that the wall of the static structure is sandwiched between the mounting plate and the distal end surface.

* * * * *